United States Patent [19]

Gordon

[11] 4,172,281
[45] Oct. 23, 1979

[54] MICROPROGRAMMABLE CONTROL PROCESSOR FOR A MINICOMPUTER OR THE LIKE

[75] Inventor: Philip Gordon, Boise, Id.

[73] Assignee: Hewlett-Packard Company, Palo Alto, Calif.

[21] Appl. No.: 829,038

[22] Filed: Aug. 30, 1977

[51] Int. Cl.² .......................... G06F 1/04; G06F 9/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,656,123 | 4/1972 | Carnevale et al. | 364/200 |
| 3,764,992 | 10/1973 | Milne | 364/200 |
| 3,771,144 | 11/1973 | Belady et al. | 364/200 |
| 3,809,884 | 5/1974 | Nibby et al. | 364/200 |
| 3,868,647 | 2/1975 | Zandveld | 364/200 |
| 3,972,023 | 7/1976 | Bodner et al. | 364/200 |
| 3,999,169 | 12/1976 | Perschy | 364/200 |
| 4,037,090 | 7/1977 | Raymond | 364/200 |
| 4,040,021 | 8/1977 | Birchall et al. | 364/200 |
| 4,058,851 | 11/1977 | Scheuneman | 364/200 |

OTHER PUBLICATIONS

Fangmeier et al., "Processor Control by Two Independent Phase-Locked Clocks", Apr., 1972, pp. 3394, 3395, IBM Tech. Disc. vol. 14, No. 11.

Primary Examiner—Mark E. Nusbaum
Attorney, Agent, or Firm—David A. Boone

[57] ABSTRACT

A minicomputer comprises a microprogrammable central processing unit wherein micro-instruction execution speed is optimized through the use of variable micro-instruction timing logic and by grouping micro-instruction according to execution time. Furthermore, data paths are arranged so that micro-routines that implement more complex operations, i.e., memory reference instructions, follow the fastest route possible. When micro-instructions requiring longer data paths are programmed, the computer dynamically varies the length of the microcycle to be a function of both the type of micro-instruction to be executed and the state of the minicomputer when the micro-instruction is to be executed. A microprogrammable processor port is provided to allow coupling of external hardware, e.g., I/O devices, other processors, etc., directly to the microprogrammed control processor. This capability is in addition to the standard input/output system of the minicomputer, thereby providing an alternate interface path for devices requiring very fast transfer rates. These devices interfaced through the microprogrammable processor port are directly coupled to the internal data busses of the minicomputer and addressed under direct microprogram control as if they were internal processor registers. Block transfers of data are provided via this microprogrammable port to allow transfers of large blocks of data without dependence on the I/O system timing of the minicomputer. A remote program load feature is provided whereby an I/O device or data communications interface can initiate a bootstrap operation in a remote computer, i.e., the computer can be halted, a preselected ROM loader program is transfer into memory, all input/output instructions in the loader are automatically configured to the proper select code of the I/O device, and the computer is restarted at the proper loader program starting address.

4 Claims, 71 Drawing Figures

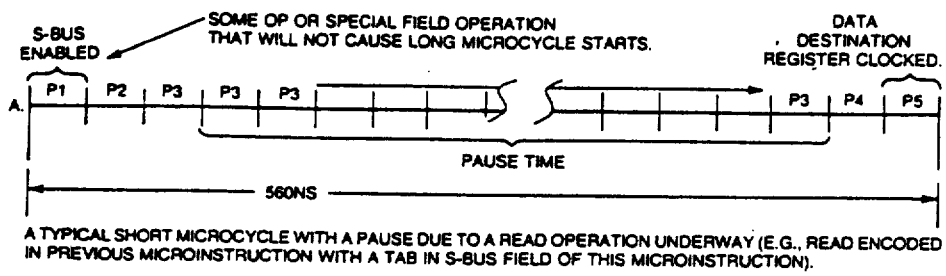

FIGURE 5A

A TYPICAL SHORT MICROCYCLE WITH A PAUSE DUE TO A READ OPERATION UNDERWAY (E.G., READ ENCODED IN PREVIOUS MICROINSTRUCTION WITH A TAB IN S-BUS FIELD OF THIS MICROINSTRUCTION).

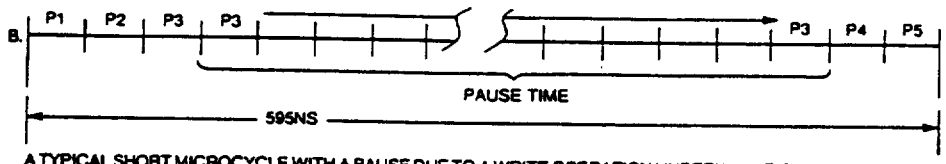

FIGURE 5B

A TYPICAL SHORT MICROCYCLE WITH A PAUSE DUE TO A WRITE OPERATION UNDERWAY (E.G., WRITE ENCODED IN PREVIOUS MICROINSTRUCTION WITH ANOTHER WRITE ATTEMPTED IMMEDIATELY IN THIS MICROINSTRUCTION).

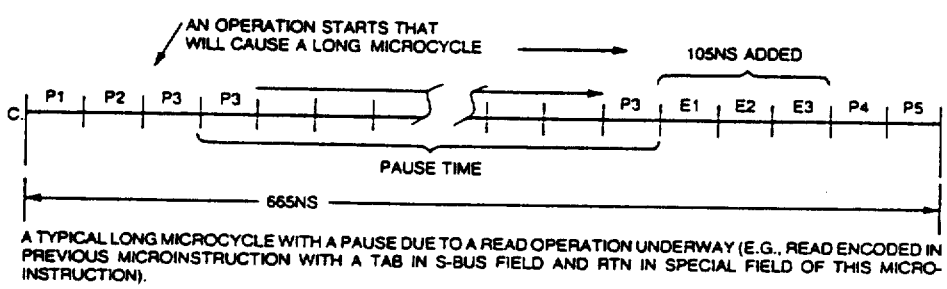

FIGURE 5C

A TYPICAL LONG MICROCYCLE WITH A PAUSE DUE TO A READ OPERATION UNDERWAY (E.G., READ ENCODED IN PREVIOUS MICROINSTRUCTION WITH A TAB IN S-BUS FIELD AND RTN IN SPECIAL FIELD OF THIS MICROINSTRUCTION).

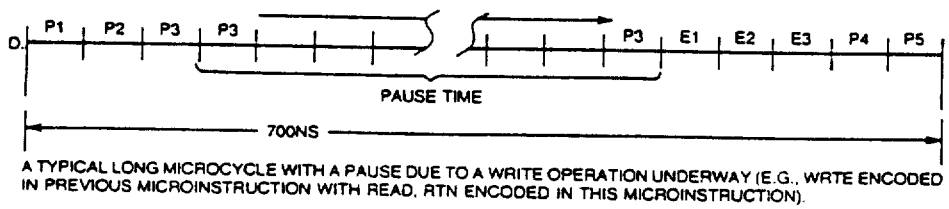

A TYPICAL LONG MICROCYCLE WITH A PAUSE DUE TO A WRITE OPERATION UNDERWAY (E.G., WRITE ENCODED IN PREVIOUS MICROINSTRUCTION WITH READ, RTN ENCODED IN THIS MICROINSTRUCTION).

NOTE: MEMORY READ AND WRITE TIME EXAMPLES ARE FOR ONE TYPE OF COMPUTER WITH A SPECIFIC MEMORY. FOR ACTUAL MEMORY CYCLE TIMES REFER TO YOUR COMPUTER DOCUMENTATION.

FIGURE 5D

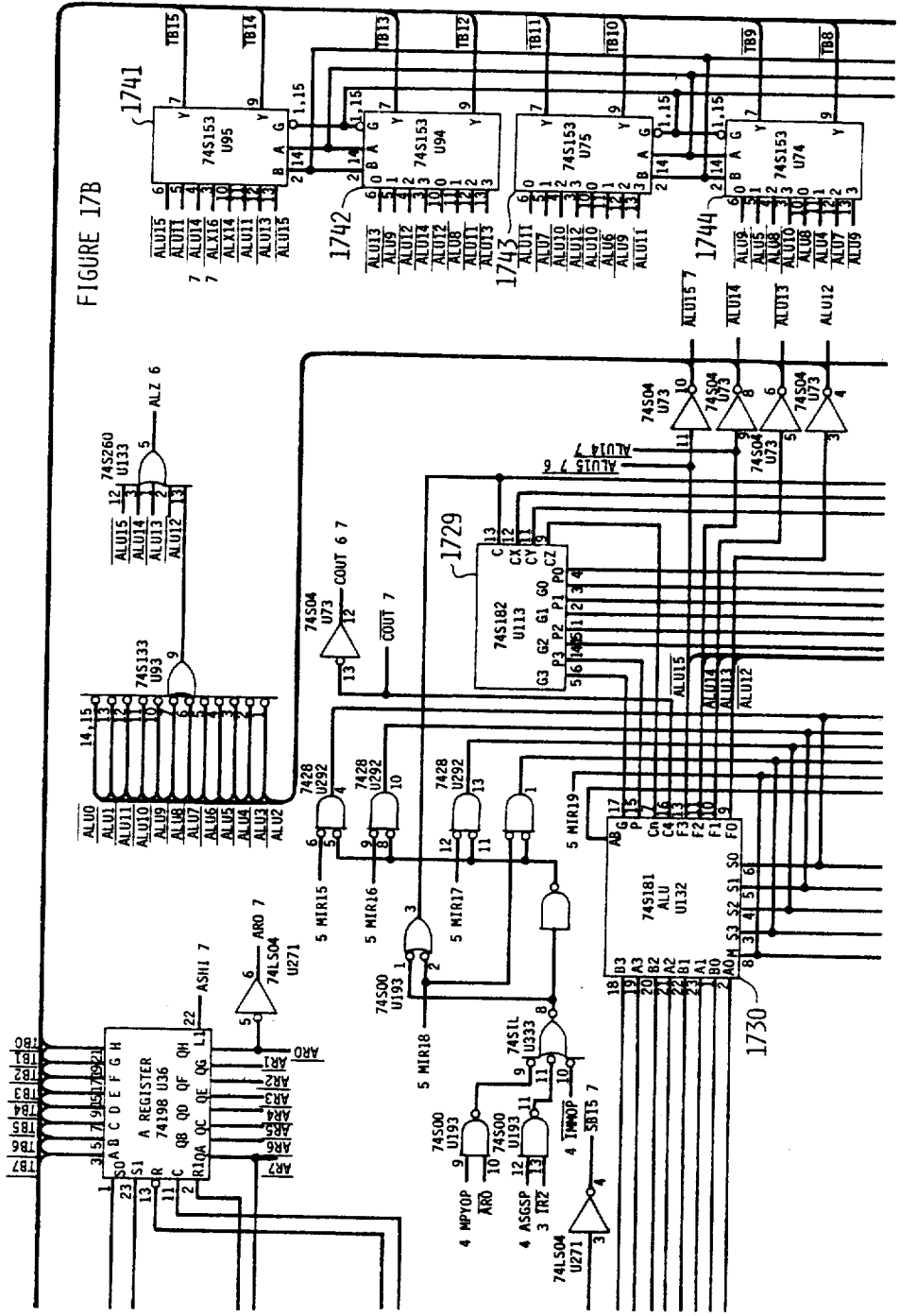

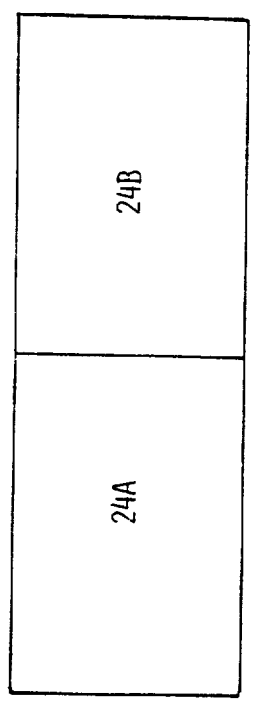

MICROPROGRAMMABLE CONTROL PROCESSOR FOR A MINICOMPUTER OR THE LIKE

BACKGROUND AND SUMMARY OF THE INVENTION

Some previous minicomputers have utilized a microprocessor in their control section. These machines generally use the microprocessor to execute the assembly language level instructions of the minicomputer by running predetermined series of microprograms. These microprogrammed minicomputers have had the advantages that they are versatile in providing expandable instructions and in providing powerful yet economical minicomputer architectures. They have had the disadvantages that they have generally been slower in execution of programs than computers having sequential gating control sections where the logic had been skillfully minimized. Since they have generally taken longer to execute the same instruction, there have been corresponding decreases in the rate of input/output transfers for throughput of data which could be handled by these machines. Also, since the microprogrammable control section typically operated as a separate computer of its own, many operations required synchronization of the internal timing for their microprocessor and that of other portions of the minicomputer, e.g., the memory and I/O sections.

Similarly, peripheral hardware such as ancillary processors, etc. suffered a great decrease in possible performance because they were interfaced via the standard I/O system with all the interfacing delays and synchronization required between the two units. This has been a critical limitation for many applications where custom arithmetic processing hardware is intended to be added to the computer to augment its performance in a particular area. In contrast, the preferred embodiment provides the ability to directly interface the microprocessor to ancillary peripherals and processors. Extremely fast transfers of large blocks of data as well as communications between the microprocessor and other processors is possible without any additional synchronization or overhead associated with the microcomputer architecture. Since the devices or processors are interfaced directly to the internal data busses of the computer and addressed under direct microprogram control as if they were internal processor registers, the maximum possible throughput is achieved.

Some previous computers had the ability to bootstrap or load predetermined programs into control memory via front panel controls or from an I/O device in response to a bootstrap loader control switch. Other computers also executed some form of bootstrap program when power was first turned on or when power was restored after some non-operating period. However, these previous bootstrap systems had the disadvantage that in the event that power was restored to the computer, but the program stored in memory had been destroyed, there was no way to request a bootstrap operation from a remote site. In contrast to this, the preferred embodiment provides remote program load capability which allows another processor or a data communication device to have control over the run/halt controls of the computer. The remote program load feature allows the user to initiate an automatic system bootstrap operation which may include a complete reloading of system software from a disc, a communication line, or any other user-defined device. The system is then restarted. This technique provides the advantage that the need for experienced operators can be greatly minimized, particularly for those systems with complex start up procedures or for distributive processing systems where automatic cold start may be required. Of course, this feature is essential for computer installations located at unattended, remote or inaccessible sites.

Furthermore, previous computers using a microprocessor have used fixed microcycle times. The time period selected was usually the sum of all the worst case timing delays throughout the processor for the most complex, i.e., lengthy micro-instruction. Therefore, the microprocessor control section was working well below the maximum possible speed, except when executing the worst case micro-instructions. In contrast, the preferred embodiment varies the length of the microcycle as a function of both the type of micro-instruction and the state of the minicomputer at the time that micro-instruction is to be executed. The microcycle timing generator then varies the cycle time in response to these conditions.

BRIEF DESCRIPTION OF THE DRAWINGS

FIGS. 5A, 5B, 5C and 5D are timing diagrams illustrating the variable microcycle technique of the preferred embodiment.

FIGS. 17A, 17B, 17C and 17D taken together comprise a detailed schematic diagram of the ALU circuitry.

FIG. 24 shows the relationship of FIGS. 24A, and 24B.

DESCRIPTION OF THE PREFERRED EMBODIMENT

Figure 1:
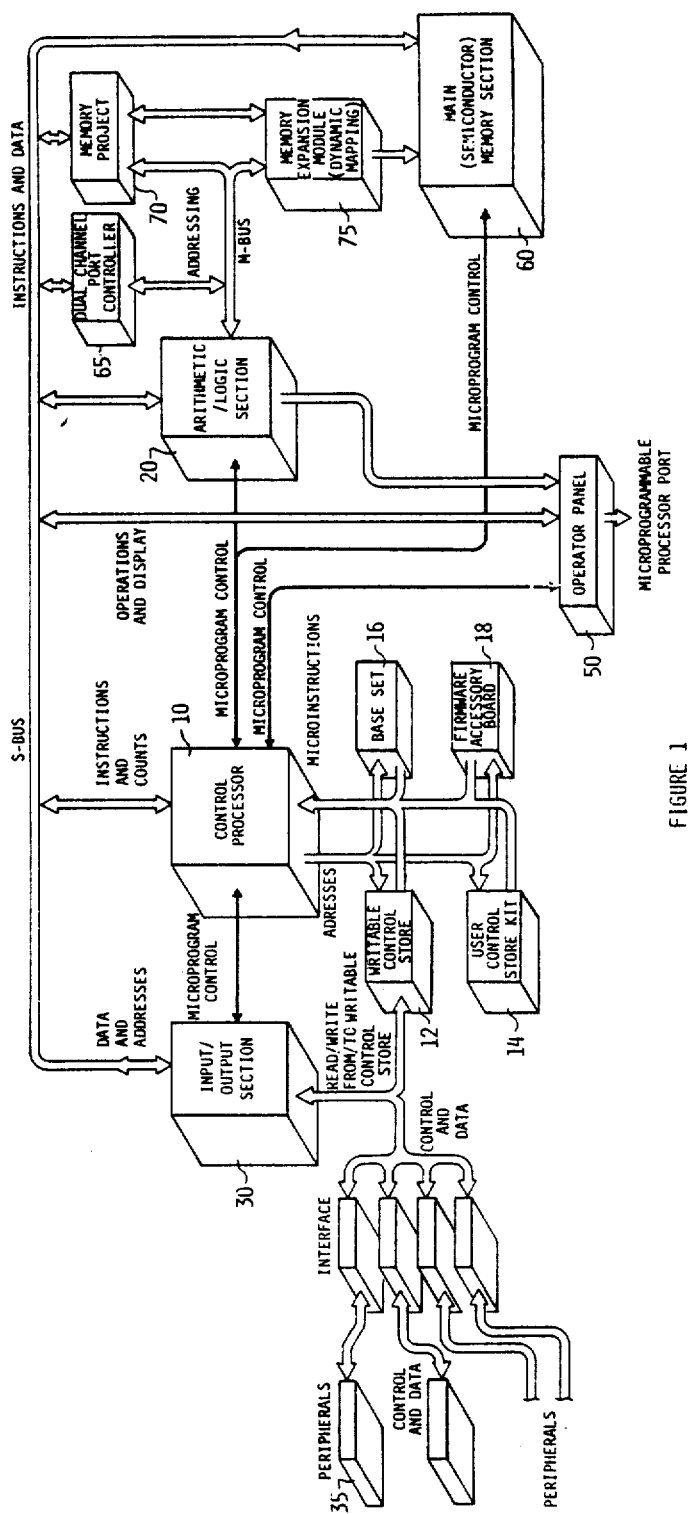
FIG. 1 is a block diagram of the preferred embodiment.

Referring now to FIG. 1 there is shown a block diagram of the preferred embodiment. Control processor 10 executes microprograms stored in RAMs 12 (random access memory) and 14 as well as ROMs (read only memory) 16 and 18. While these ROMs and RAMs may be implemented in slightly different ways, they all appear as one large microprogram storage facility to the control processor 10.

The circuit details of the control processor are described in more detail with respect to FIGS. 16–24.

An arithmetic and a logic section 20 includes most of the hardware required to carry out the commands of the micro-instructions. It contains working registers and additional logic to perform arithmetical and logical operations on this stored data. The arithmetic/logic section detailed schematic diagrams are shown with greater detail in FIG. 17. Hereinafter, the collective control circuitry of the control processor 10 and the arithmetic and logic section 20 are collectively referred to sometimes as the CPU (central processing unit).

An input/output section 30 serves as an interface between the computer and external devices. Circuitry is provided to respond to both control processor initiated I/O transfers as well as those initiated by a peripheral device, e.g., peripheral device 35. The detailed schematic diagram of the input/output section is described with reference to FIGS. 23 and 24.

An operator panel 50 is provided to allow manual communication to the central processing unit.

Figure 2:
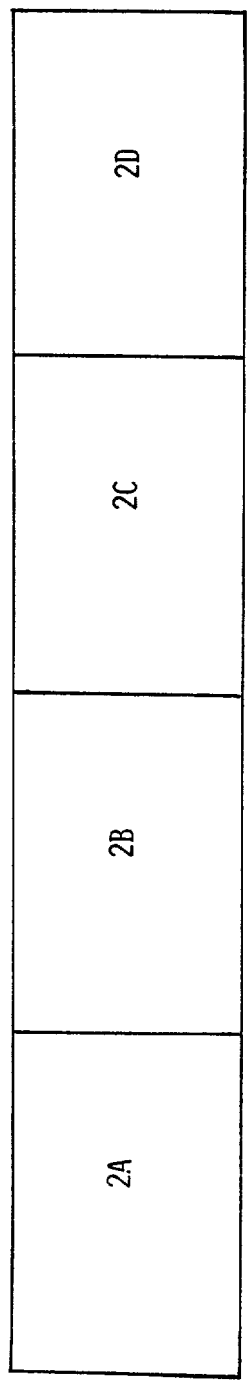
FIG. 2 shows the relationship of FIGS. 2A, 2B, 2C and 2D.
Figure 2A:
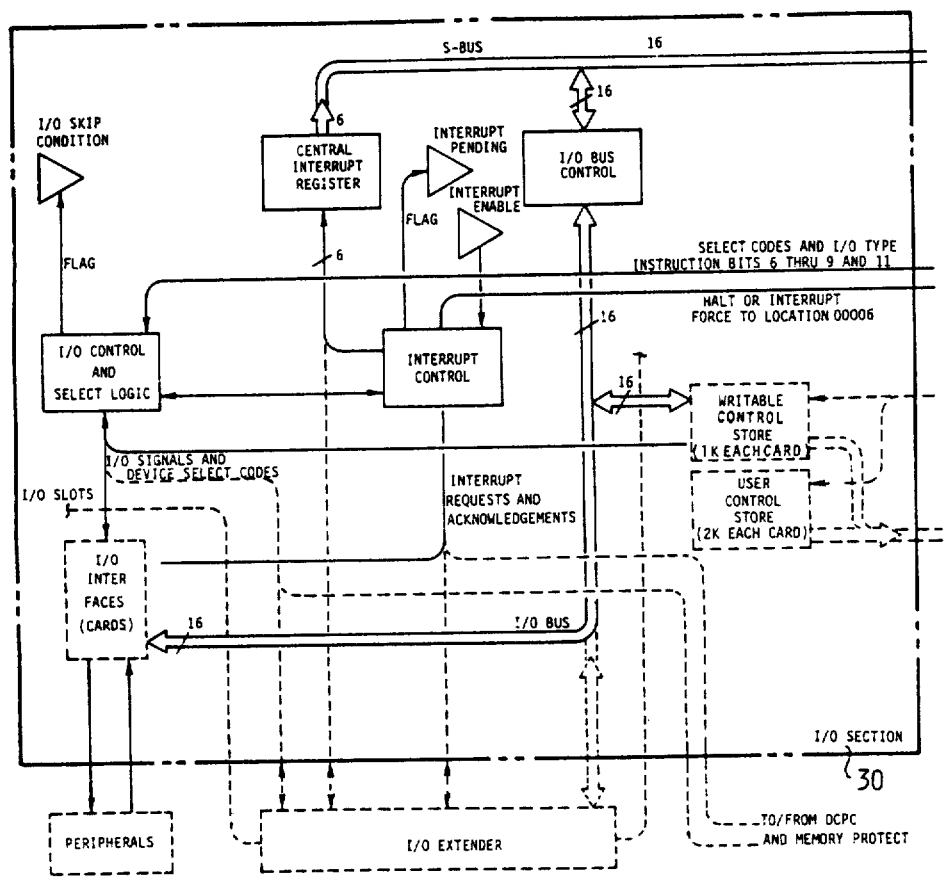
FIGS. 2A, 2B, 2C and 2D taken together comprise a detailed block diagram of the preferred embodiment.
Figure 2B:
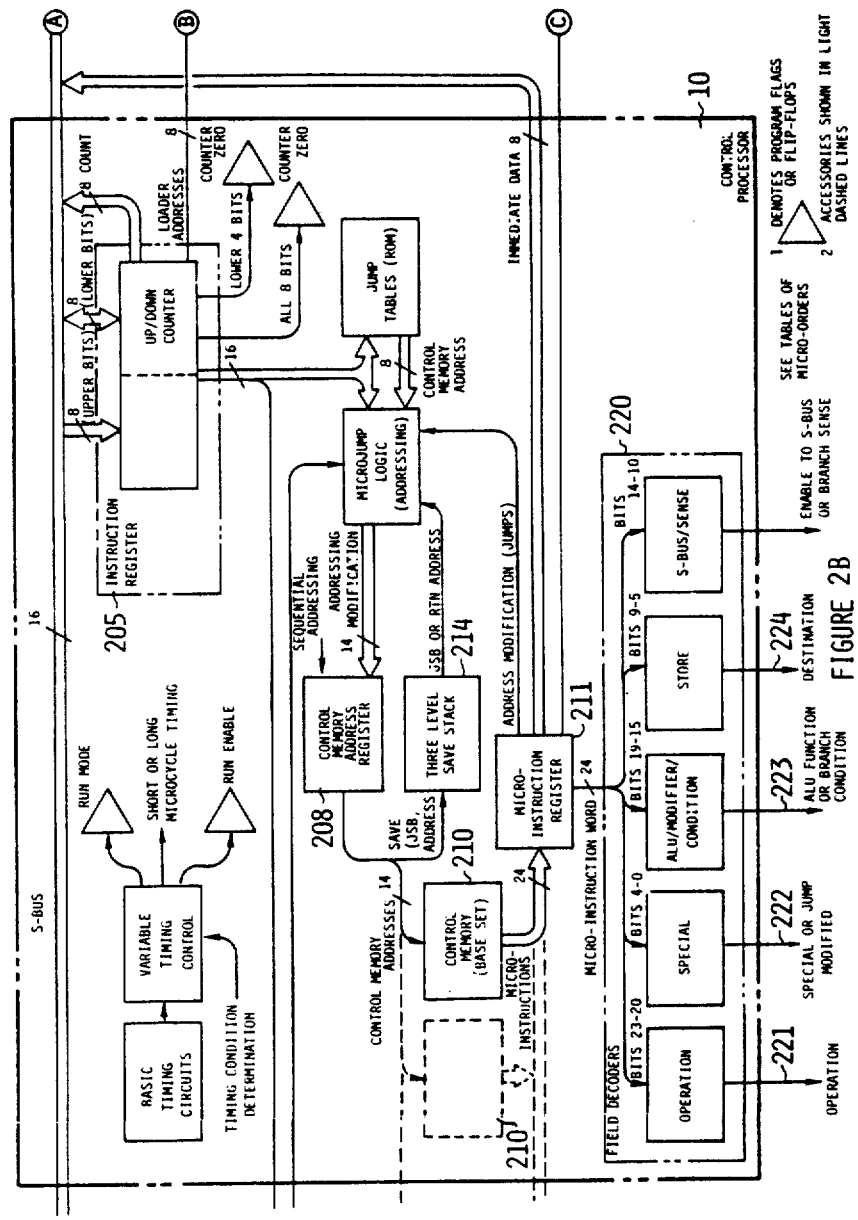
Figure 2C:
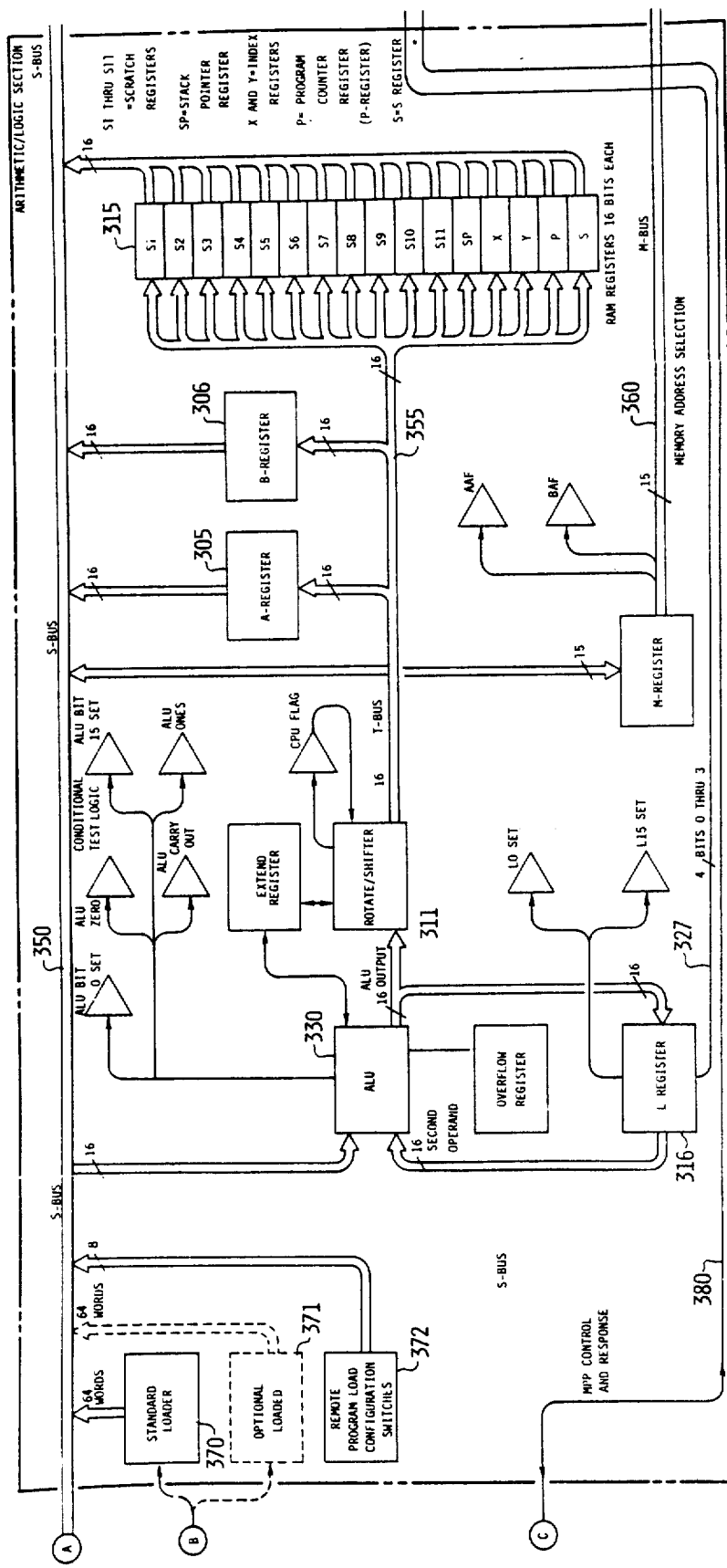
Figure 2D:
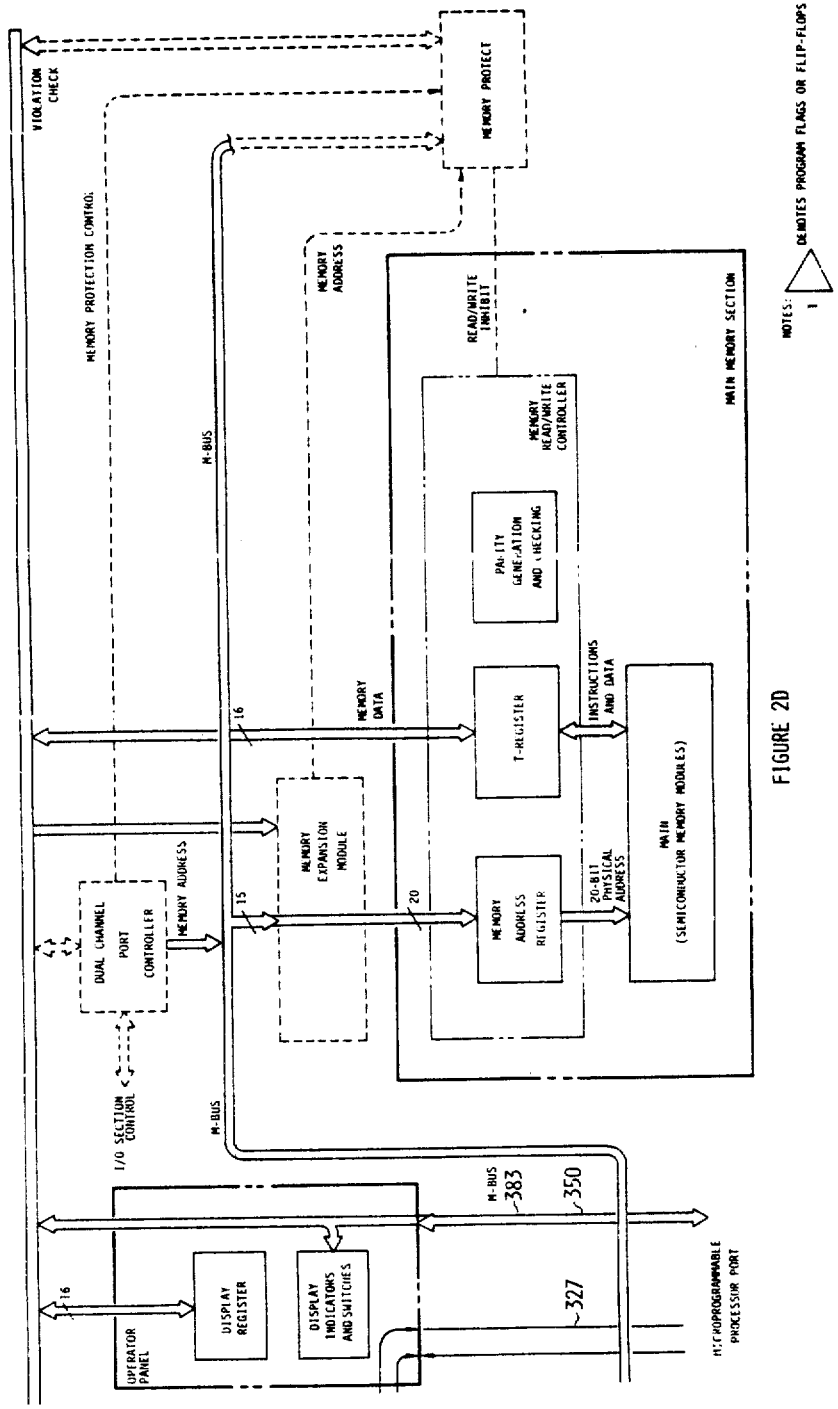

A more detailed block diagram is shown in FIGS. 2A, 2B and 2C.

Referring now to FIGS. 2A, 2B, 2C and 2D, there is shown the detailed block diagram of the preferred embodiment. FIG. 2A contains a detailed block diagram of the I/O section, while FIG. 2B contains a detailed block diagram of the control processor. FIG. 2C contains a detailed block diagram of the arithmetic and logic section, while FIG. 2D contains circuit details of the memory section.

Referring now to FIG. 2B, the instruction register 205 is a 16-bit register that contains the assembly, i.e., machine language instructions for execution. The lower eight bits of this register are also used as an up/down counter. The control memory 210 receives a 14-bit address from the control memory address register 208. The corresponding 24-bit micro-instruction is then loaded into the micro-instruction register 211. The control memory address register 208 is a 14-bit register which will progress sequentially through memory by being incremented at the beginning of every microcyle unless an instruction which specifically changes its contents such as a branch repeat or a jump instruction is executed. Field decoders 220 then provide the appropriate control signals on lines 221, 222, 223, 224 and 225 to execute the micro-instruction in micro-instruction register 211.

The actual coding of the micro-instructions is explained in more detail with reference to Appendix A which shows the binary codes and mnemonic symbols for the various micro-instructions and word types, and with reference to the micro-order definitions of Appendix B.

Also included in the control processor is a three-level micro-subroutine save register 214. The 14-bit control memory address register 208 contents is loaded into the stack, "pushed" at the beginning of every micro-subroutine branch, i.e., a jump subroutine(JSB) instruction. It is retrieved or "popped", i.e., the contents are loaded back into the control memory address register 208 when a micro-subroutine return (RTN) instruction is executed.

Referring now to FIG. 2C, there is shown a detailed block diagram of the arithmetic logic unit (ALU) section of the preferred embodiment. The ALU implements all arithmetic and logic operations in the CPU under the direction of the control processor. The S-bus 350 is the main data bus of the CPU. A register 305 and B register 306 are the main 16-bit accumulators of the preferred embodiment. Additional register storage capability is provided by registers 315. Under microprogram control, data from the S-bus, the A and B registers, registers 315, etc. may have various logical or arithmetic functions performed on them by ALU circuit 330 and rotate shifter circuit 311. The various possible operations are described in more detail with respect to the aforementioned Appendix B.

Included within the CPU of the preferred embodiment is the capability for storing predetermined "loader" programs. In the preferred embodiment, blocks 370, 371 may contain up to four optional loaders. Each loader program contains 64-16 bit instructions. Remote program load switches 372 are associated with these loader ROMs, as more fully described below.

Figure 3:
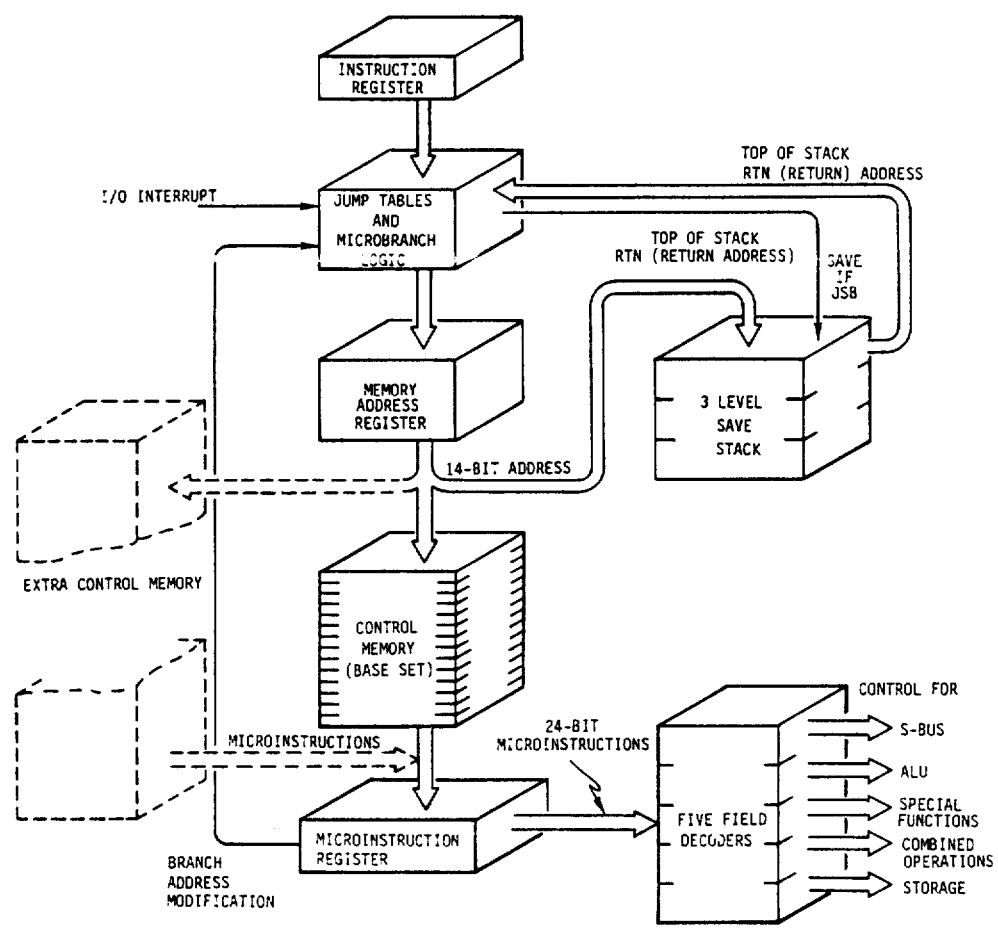
FIG. 3 is a simplified block diagram of the control processor of the preferred embodiment.

Also shown in FIG. 2C is a connection for the microprogrammable processor port of the preferred embodiment. Control lines 380 carry the signals generated from micro-instruction 211 and associated circuitry necessary to execute the microprogrammable processor port operations. Additional control bits are provided via line 327 which carry the four least significant bits of L register 310. Data may be input to or output from devices coupled to the microprogrammable processor port via S-bus 350 through the latch register. An alternative representation of the control processor is shown in FIG. 3.

Figure 4:
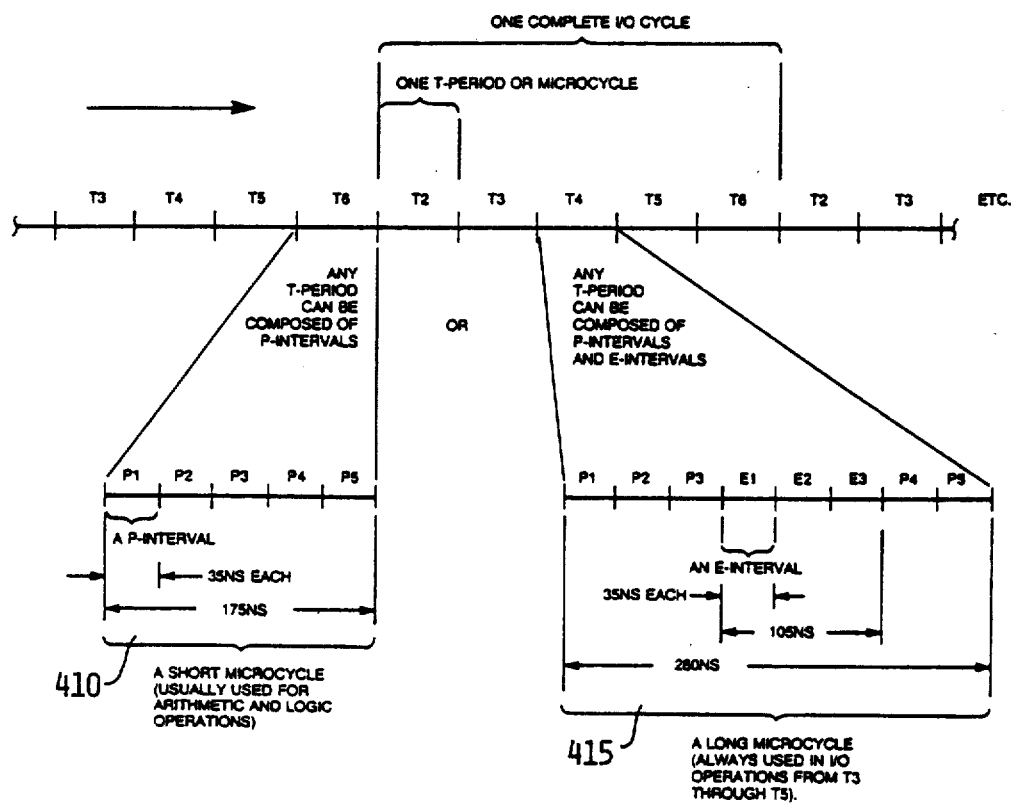
FIG. 4 illustrates the definitions of the basic timing intervals in the preferred embodiment.

Before proceeding with a more detailed description of the circuit diagrams of the preferred embodiment, a more detailed explanation of the timing definition in terms of the control processor will be explained. The control processor executes one micro-instruction during each microcycle. In the preferred embodiment, these microcycles, also designated as T-periods, are the time required to completely execute the micro-instruction, i.e., execute up to five micro-orders which make up the micro-instruction. In order to sequentially order the execution of the micro-orders in the various fields of any particular micro-instruction, it can be seen that another timing interval is needed. These subintervals are designated P1 through P5 as shown in FIG. 4. These T-periods or microcycles can either be short microcycles such as microcycle 410, or long microcycles such as microcycle 415. In a short microcycle of preferred embodiment, each T-period is 35 nanoseconds (ns) long, the total microcycle then being 175 nanoseconds long. In the case of a long microcycle, such as microcycle 415, additional time intervals called E-intervals, E1, E2 and E3 are inserted between P-periods P3 and P4. Each of the P-periods and E-periods is 35 nanoseconds long, but since there are now 5 P-periods and 3 E-periods during the execution of a long microcycle, the total microcycle time period is 280 nanoseconds. An exception to the above described timing occurs when a pause condition exists. Another condition which will cause variations in the above timing cycles is that of a freeze condition. The selection of the short or long microcycles and the generation of timing pauses and timing freezes is discussed in more detail below.

As discussed above, a short microcycle consists of 5-35 nanosecond intervals that run in sequence from P1 through P5. A long microcycle consists of 8-35 nanosecond intervals that always run in the sequence P1, P2, P3, E1, E2, E3, P4 and P5. The arithmetic logic section of the computer is designed to operate with a 175 nanosecond microcycle while other operations such as input/output operations require the longer (8-35 nanoseconds subintervals) microcycle. There are three basic reasons in the preferred embodiment for the control processor timing circuits to switch to the longer, i.e., 8-35 nanosecond subinterval microcycles. First, certain I/O interfaces may require the longer T-period to complete the execution of an operation. Therefore, if an I/O operation is indicated, long microcycles are generated during certain predetermined T-periods, e.g., T3 through T5. Also, when an extended memory package is used, such as described in U.S. Pat. No. 3,970,999 issued to John S. Elward, there is often difficulty in getting the data onto the S-bus fast enough to ensure integrity of the data. Also, the micro-instruction register is clocked at the beginning of each microcycle, approximately P1, and the control memory address register is conditionally loaded at P3 of each microcycle. However, if a microbranch instruction such as a jump or jump subroutine is to be executed, only two subintervals, P4 and P5 or 70 nanoseconds, would be left to access control memory and reload the control memory address register with the address of the new micro-instruction for the subsequent microcycle. Since this is not adequate, time is also extended for this condition. However, if a conditional jump or branch instruction is programmed and the branch condition is not met, the control processor will remain in a short microcycle mode.

Most microcycles will be of the shorter type to maximize throughput performance. However, a change to a long microcycle timing can occur based on the monitored conditions described more fully below during peak subinterval P3 of any microcycle. In other words, the conditions that determine a switch to long microcycles are monitored at every P3.

The control processor and main memory operate asynchronously until they must communicate to accomplish read or write operations. This communication is accomplished in a "handshake" manner. A "pause" in microcycle timing is used to interact with the asynchronous memory interface. This feature permits greater performance with existing systems and compatibility with various speed memories.

A pause operates in the following way: a read or write operation can be started with the appropriate micro-order in any microcycle. Memory then independently completes the operation under its own timing, asynchronously to the CPU. If the control processor should through another micro-instruction request another memory operation while memory has not completed the first task or some other operation, a conflict in timing occurs. This conflict is monitored at subinterval P3 of every microcycle before the control processor actually makes the request for the use of memory. If a conflict is detected, i.e., there is an attempt to use memory while it is busy, a pause state, i.e., the suspension of all timing clocks in the control processor will be initiated until memory is available.

In the preferred embodiment, a pause is accomplished by having the timing circuits "latch-back" into P3 over and over again so that P3 is repeated until the pending memory request can be processed. Pause time, therefore, is always an integer multiple of 35 nanoseconds in the preferred embodiment.

At the completion of a pause, the CPU timing will progress either to subinterval P4 or subinterval E1, depending upon whether the conditions for a short or a long microcycle exist.

Referring now to FIGS. 5A, 5B, 5C and 5D, there are shown four examples of microcycles with a pause. FIGS. 5A and 5B are both short microcycles, while FIGS. 5C and 5D are examples of long microcycles with a pause. FIG. 5A illustrates a short microcycle wherein subinterval P3 is repeated over and over again because there is a read operation underway, e.g., a read memory instruction was encoded in the previous micro-instruction with a TAB micro-instruction (read memory data onto the S-bus) coded in the S-bus field in this micro-instruction. FIG. 5B, a write into memory operation is underway, i.e., a WRTE micro-instruction was encoded in the previous micro-instruction and another write WRTE (write memory) instruction was attempted immediately following that micro-instruction.

FIG. 5C shows a long microcycle with a pause due to a read operation underway, similar to that shown in FIG. 5A. However, in this case, there is a TAB micro-order in the S-bus field and an RTN (return from subroutine) in the special field of this micro-instruction. Therefore, there is both a pause as well as the addition of subintervals E1, E2 and E3. FIG. 5D is similar to FIG. 5B except that once again an RTN instruction is encoded in the special field of the micro-instruction.

Freeze Operations

The CPU and I/O section operate asynchronously until an I/O instruction begins execution and communication between the two is needed. Although T-periods run sequentially from T2 through T6, and each T-period is initiated by subinterval P1 of a microcycle, I/O micro-instructions must begin at the appropriate part of the I/O cycle. Therefore, the freeze condition suspends micro-instruction execution, but continues T-period generation, until the appropriate T-period starts, that is the T-period which is required for execution of the I/O micro-instruction currently in micro-instruction register 211. In the preferred embodiment, the freeze synchronizes micro-instruction execution with either time period T2 or time period T6. The timing freeze can begin at the end of any microcycle and when the I/O instructions are to be executed, long microcycles will automatically occur in correspondence with time periods T3, T4 and T5.

In summary, the freeze or pause conditions occur when communication is required between the control processor and either the I/O section or the memory section. Generally, the freeze occurs to synchronize the control processor with the I/O section while a pause occurs to suspend control processor operations and wait for the completion of a memory operation, if it is necessary to use the memory before proceeding. Also, long or short microcycles may be selected depending on whether additional time is required to complete a task in a microcycle period.

Figure 6:
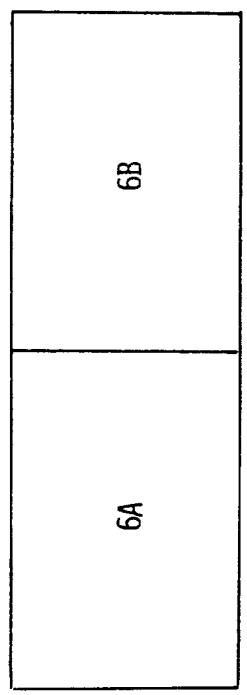
FIG. 6 shows the relationship of FIGS. 6A and 6B.
Figure 6A:
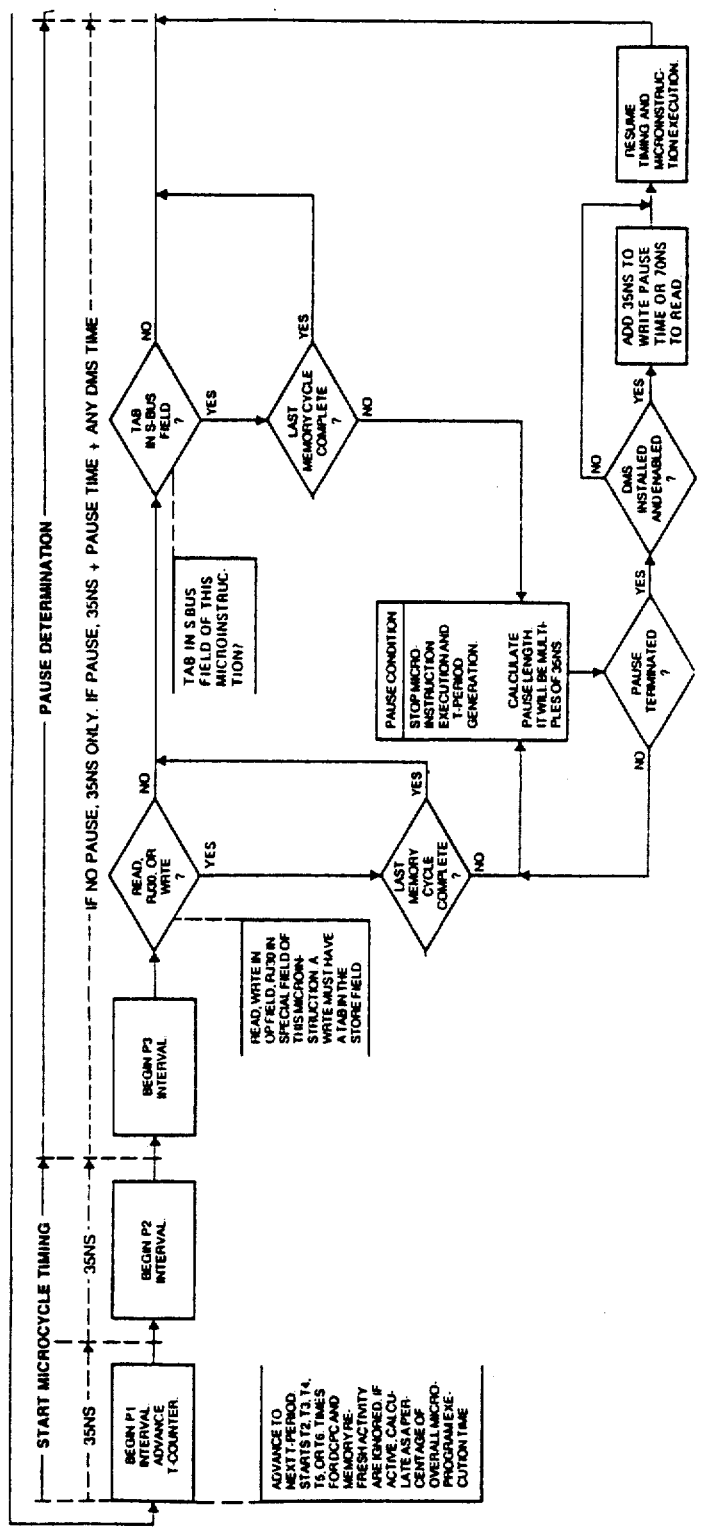
FIGS. 6A and 6B taken together are a flow chart for determining the time duration of a microcycle for the preferred embodiment.
Figure 6B:
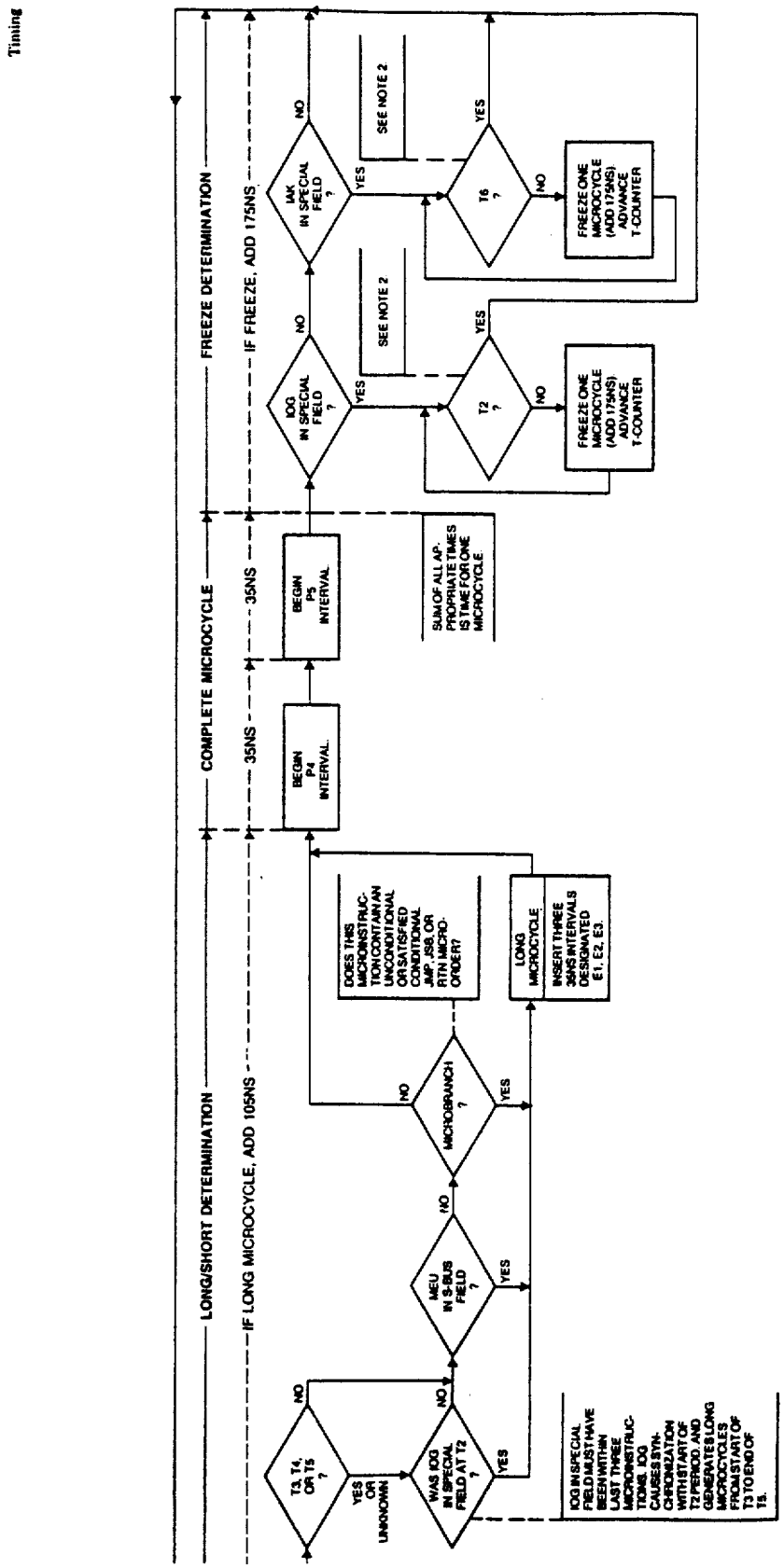

FIGS. 6A and 6B can be used to calculate the execution time for individual microcycles in the preferred embodiment. The flow chart formed by FIGS. 6A and 6B is to be read from left to right, once per each microcycle. All the conditions that change timing in the preferred embodiment during the microcycle are shown in FIGS. 6A and 6B along with their respective execution times in nanoseconds. These times are summed while proceeding through the microcycle. All instructions referred to are amply described in the coding and definitions present in Appendixes A and B respectively.

Figure 7:
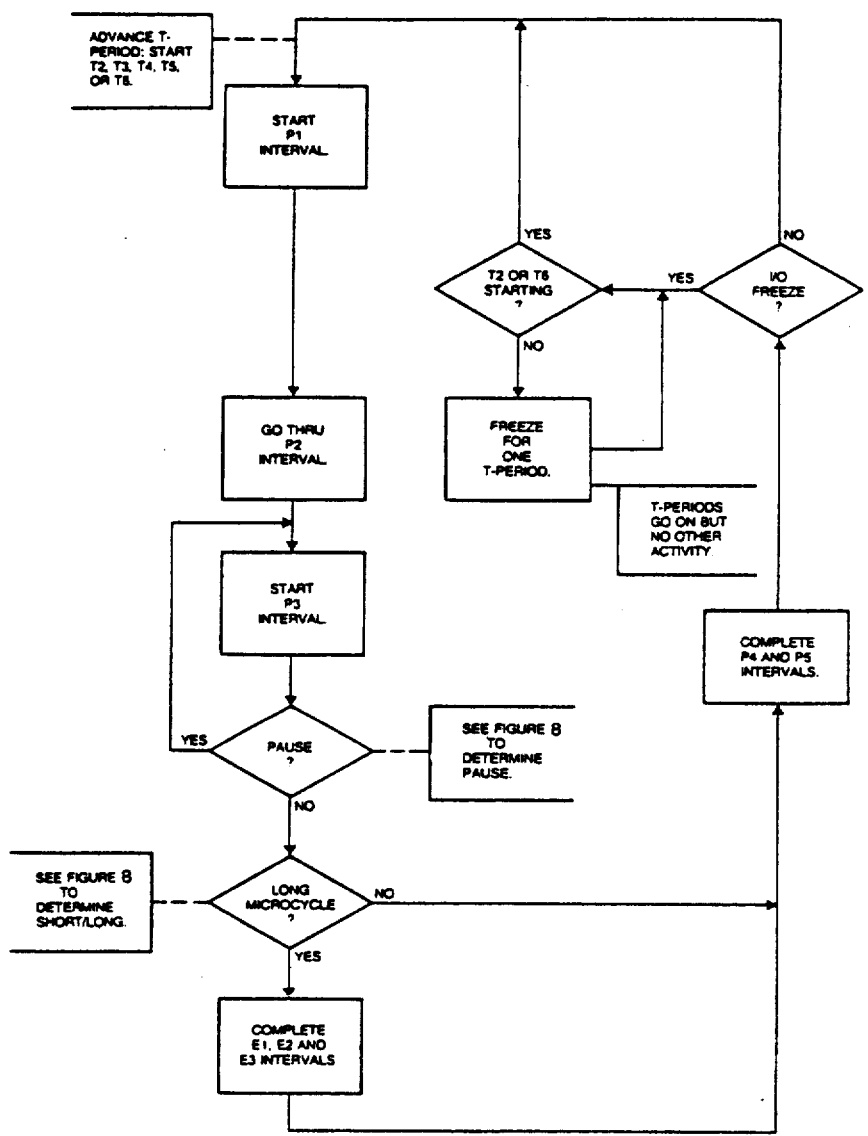
FIG. 7 is a flow chart showing the sequence of timing events occuring in any given microcycle.
Figure 8:
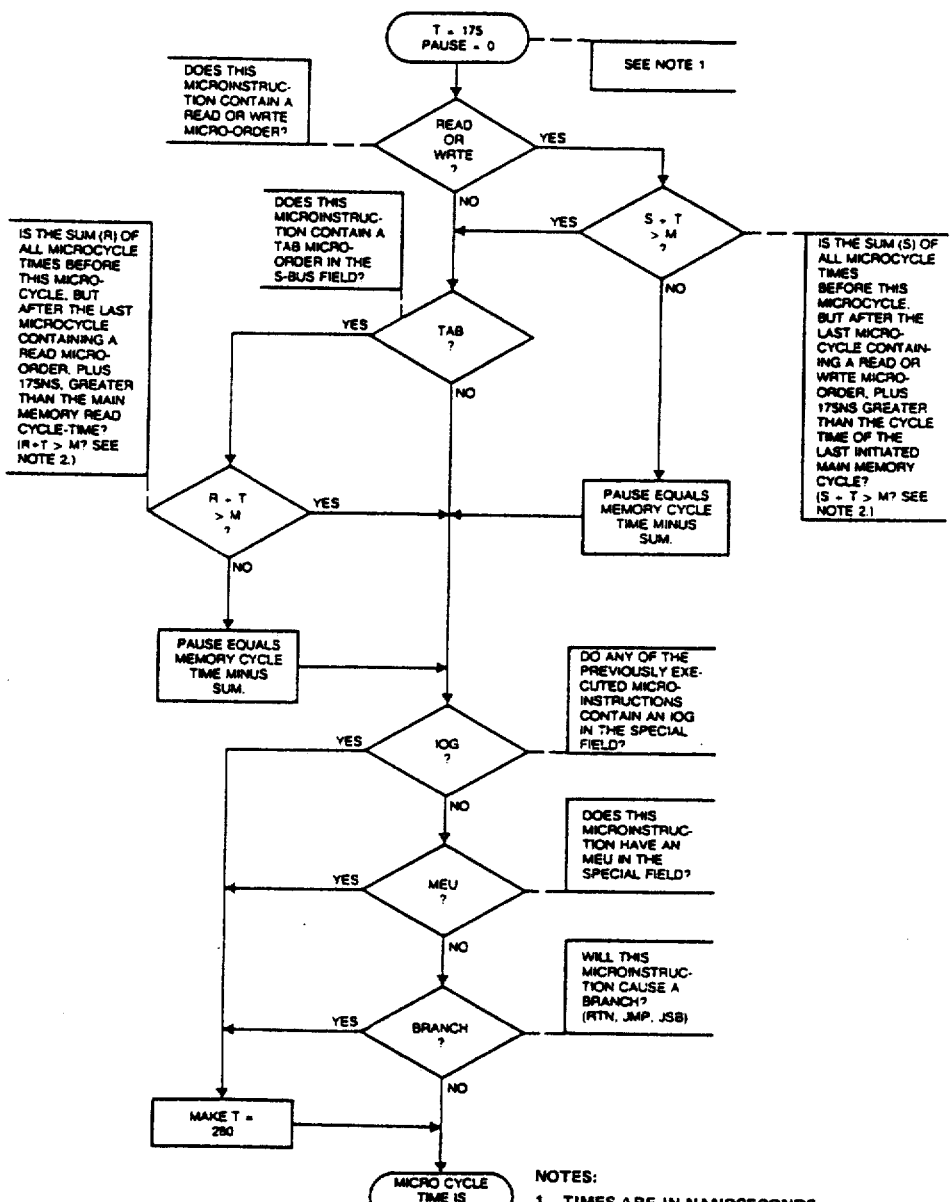
FIG. 8 is a consolidated microcycle estimating flow chart.

FIGS. 7 and 8 are additional flow charts showing the microcycle timing.

The following examples indicate how the technique used in the preferred embodiment provides the fastest possible micro-instruction execution time consistent with the input/output and memory systems selected.

Arithmetic/Logic Micro-instructions

The fastest microcycle timing is found when microprogrammed operations deal with the Arithmetic/Logic section registers. For example:

Table I

| Label | OP/BRCH | SPCL | ALU/MOD/COND | STR | S-BUS/ADDRESS | COMMENTS |
|---|---|---|---|---|---|---|
| FIRST |  | STFL | CMPS | B | B |  |

To determine the execution for the micro-instruction in Table I, read FIGS. 6A and 6B from left to right with the first micro-instruction in mind. The total time for the first two intervals (P1+P2) is 70 nanoseconds. The special field in the first micro-instruction does not contain an RJ30 and the OP field does not contain a READ or WRTE. Also, the S-bus field does not contain TAB. Thus, in following the timing line into P3, no pause condition exists.

Continuing in subinterval P3, since an I/O operation is not being performed, no synchronization with the T-periods is required. Also, a microbranch will not occur since there is no MEU in the S-bus field of this micro-instruction and no JSB, JMP or RTN micro-orders coded. Following the timing line in FIGS. 6A and 6B through the end of P3, time in this microcycle thus far is 105 nanoseconds. Intervals P4 through P5 are executed immediately, making the total time for execution of the micro-instruction labeled FIRST=175 nanoseconds. Assuming that no freeze conditions are in effect, the timing line can be followed back to the beginning of P1.

Control Memory Branch Micro-Instructions

The switch to long microcycles is made in P3 when any of the three conditions shown in FIGS. 6A and 6B can be answered affirmatively. For example, consider a control memory branch condition shown in the following portion of a microroutine. In the example of Table II, the microcycle times are included in the right-hand column.

Table II

| LABEL | OP/BRCH | SPCL | ALU/MOD/COND | STR | S-BUS/ADDRESS | COMMENTS | |
|---|---|---|---|---|---|---|---|
|  |  |  |  |  |  | TIME (NS) | |
|  |  |  |  |  |  | (IF BRANCH MET)/ | |
|  |  |  |  |  |  | (IF NOT MET) | |
| START |  |  | ADD | L | S3 | 175 | 175 |
| ONE | JMP | CNDX | L15 |  | CLEAR | 280 | 175 |
| TWO |  |  | INC | S3 | L |  | 175 |
| THREE | RTN | CLFL |  | A | S3 |  | 280 |
| CLEAR | IMM | RTN | CMHI | L | 377B | 280 |  |
|  |  |  |  |  |  | 735 NS | 805 NS |

By using FIGS. 6A and 6B and checking the microroutine, it can be seen that the JSB and RTN micro-orders in the micro-instructions labeled ONE, THREE and CLEAR can cause long microcycles when the branch condition is met. By not extending the microcycle when the branch condition is not met, unnecessary time is present in the micro-instruction cycle.

assume no memory operation is in progress as the microroutine begins at label START.

Table IV

| LABEL | OP/ BRCH | SPCL | ALU/ MOD/ COND | STR | S-BUS/ ADDRESS | COMMENTS |
|---|---|---|---|---|---|---|
| | | | | | | TIME (NS) |
| START | | | PASS | S1 | P | 175  A |
| | | | | | | ↓ |
| FIRST | READ | | PASS | DSPL | S11 | 175 ——————— |
| SECOND | | | INC | PNM | P | 175 |
| THIRD | | | DEC | X | X | |
| | | | | | | ↘ |
| | | | | | | 175←—B ≧ 560←—C |
| | | | | | | ↓ |
| DATA | | | PASS | S2 | TAB | 210←—D——— |
| END | | RTN | | IRCM | S2 | 280←—E |

For this example, assume the T-period is T4 and the Control Processor has just placed the first micro-instruction of your microroutine in MIR. Suppose further that part of the microroutine is as shown in 211.

Table III

| LABEL | OP/ BRCH | SPCL | ALU/ MOD/ COND | STR | S-BUS/ ADDRESS | COMMENTS |
|---|---|---|---|---|---|---|
| | | | | | | TIME (NS) |
| XXX | | IOG | | IRCM | S4 | T4 175 |
| • | | | | | | T5 175 |
| • | | (SUSPENDED EXECUTION UNTIL T2) | | | | T6 175 |
| • | | (NOW EXECUTION CONTINUES) | | | | T2 175 |
| | | NOP | | | | T3 280 |
| | | NOP | | | | T4 280 |
| | | | | S5 | IOI | T5 280 |
| | | INC | | S8 | S3 | T6 175 |
| | | | | | | T2 |

The micro-instruction at label XXX includes micro-orders in the S-bus and store fields as well as the IOG micro-order in the special field. As subintervals P1 and P2 occur, the S-bus and store field micro-orders will be executed but the effect of the IOG in the special field is not felt until the end of the microcycle (in following the timing line in FIGS. 6A and 6B, note that the freeze condition is not in effect until the micro-instruction labeled XXX completes execution). At the end of the microcycle, the IOG micro-order causes all micro-instruction execution to be suspended until T2 completes. The total waiting time in the freeze condition in this case is 525 nanoseconds. Note that with a freeze condition present, T-periods will be short microcycles until synchronization occurs. Time T3 starts the I/O cycle and each micro-instruction is executed in the appropriate long microcycle (T-periods). If T6 is short (as shown in the example), the total time for the I/O cycle will be 1.120 microseconds. If T6 had been long (e.g., a RTN coded), the total time for the I/O cycle would be 1.225 microseconds. This example microroutine is used only to illustrate the freeze until T2 starts.

Read From Memory Example

First consider a read from main memory with a TAB micro-order in the S-bus field two micro-instructions after the micro-instruction containing the READ micro-order. In the example microroutine in Table IV, Using FIGS. 6A and 6B, note that START executes in 175 nanoseconds. In FIRST, note that although there is a READ in the OP field in this micro-instruction (which begins a memory operation) there is not a memory operation already in progress; thus, FIRST also executes in 175 nanoseconds. Point A shows where the main memory read cycle timing starts (the request for memory is made at the end of the microcycle). No delays occur for execution of the micro-instructions labeled SECOND and THIRD; they each execute in 175 nanoseconds as shown at point B, while main memory is still busy executing the read request. (Note that these two micro-instructions do not contain micro-orders that would cause a freeze.)

Figure 9:
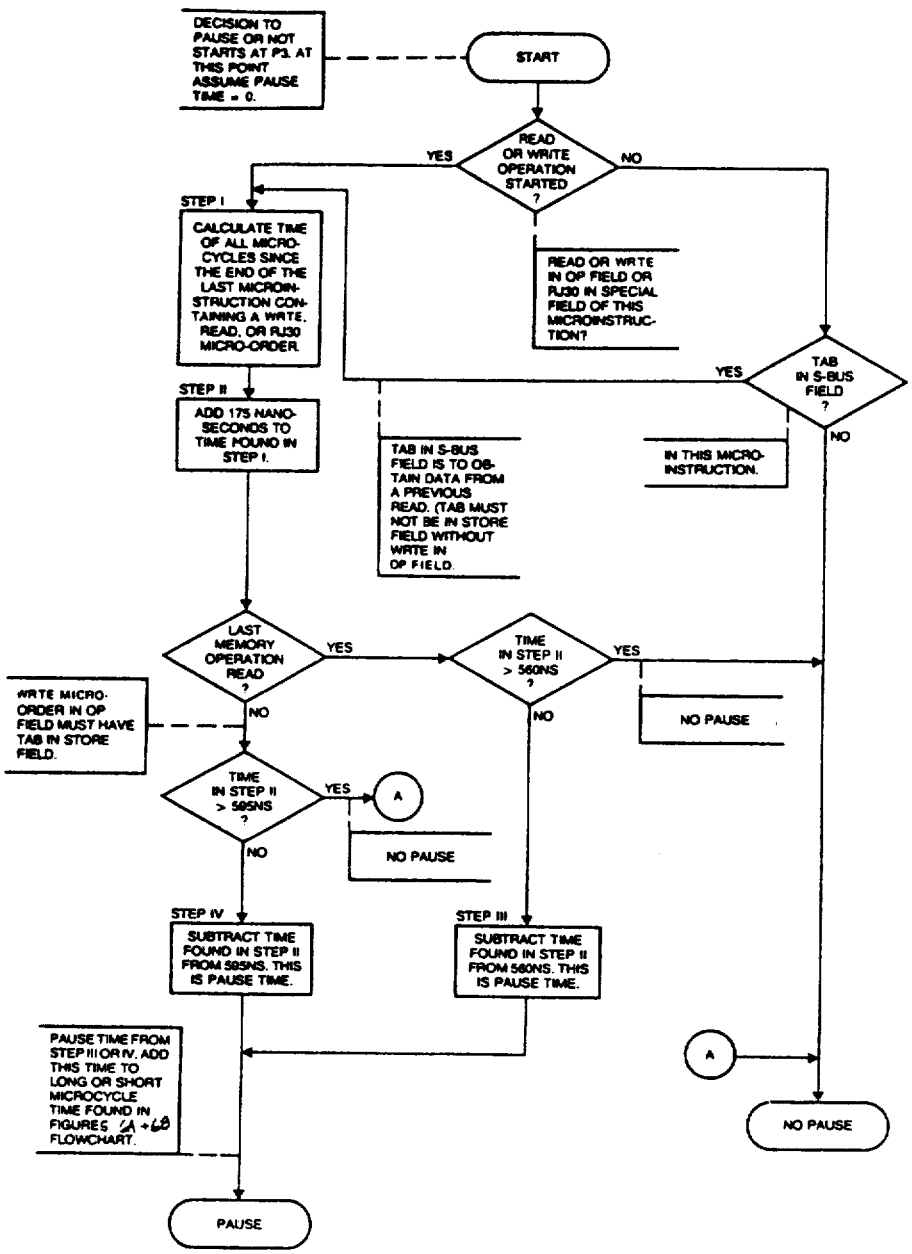
FIG. 9 is a detailed pause time calculation flow chart.

Now the micro-instruction labeled DATA begins to execute. FIGS. 6A and 6B show that if there is a TAB in the S-bus field while memory is busy, there will be a pause time added to the microcycle. FIG. 9 can be used to calculate the time as follows. At the first decision point in the flow chart, no READ, or WRTE, or RJ30 micro-order is encoded in this micro-instruction. Entry is made at Step I (FIG. 9) because there is a TAB micro-order encoded in the S-bus of the micro-instruction under consideration.

In Step I, add the execution times for micro-instructions labeled SECOND and THIRD which =350 nanoseconds (point B). In step II the result =525 nanoseconds. Since the last operation (in the micro-instruction labeled FIRST) was a READ, the flow chart in FIG. 9 directs you to step III which when completed, provides pause time =35 nanoseconds in this case. Returning to FIGS. 6A and 6B, the result through P3 =4×35 nanoseconds =140 nanoseconds. Since micro-instruction DATA will be short, P4 and P5 are entered immediately with a resulting total time for this micro-instruction =210 nanoseconds (point D). Micro-instruction END will be long (point E) because of the CM branch. One may look at the partial microroutine just illustrated and consider that one can simply subtract the time for all micro-instructions executed (before the micro-instruction labeled DATA but after the one labeled FIRST) from the memory cycle time and in this case obtain 210 nanoseconds; however, this procedure will not always yield correct results. The next microprogram example illustrates why this is so.

Write Into Memory Example

Consider a write operation to main memory using the following microroutine. For this example, assume the DMS is installed. Also, consider conditions for the microbranch (in micro-instruction CHECK) not met and no memory operation in progress as entry is made. Again, note that the microroutines in the examples shown are used only to show timing relationships and the use and advantages of the present invention.

TABLE V

| LABEL | OP/BRCH | SPCL | ALU/MOD/COND | STR | S-BUS/ADDRESS | COMMENTS |
|---|---|---|---|---|---|---|
| • | | | | | | TIME (NS) |
| . | | | | | | |
| . | | | | | | |
| . | | | | | | |
| ENTER | | | INC | X | X | 175 ←A    B |
| WRITE | WRITE | MPCK | PASS | TAB | X | ↓   ↓ |
| CHECK | JMP | CNDX | ALZ | RJS | **2 | 175 ——————— |
| | | | | | | |
| | | | | | | 175 ←C |
| GO | READ | RTN | INC | PNM | P | ≥ 630 |
| | | | | | | ↓ |
| | | | | | | 560 ←E——— |
| . | | | | | | |
| . | | | | | | |
| . | | | | | | |
| | | (ETC.) | | | | |

Micro-instructions labeled ENTER and WRITE (point A) both execute in 175 nanoseconds each and the main memory write cycle timing begins at point B. Micro-instruction CHECK executes in 175 ns (point C) since branch conditions are not met, then a read from main memory is next attempted. Using the flowcharts in FIG. 9, it can be seen that the calculation for the time shown at point E is made for micro-instruction GO as shown below. (The write time at point D is 630 nanoseconds because of the DMS factor.)

| | |
|---|---|
| 105 nanoseconds | time for P1, P2, P3 (from Figure 9) |
| 245 nanoseconds | add pause time (calculated in Figure 9) |
| 35 nanoseconds | add for DMS |
| 105 nanoseconds | add for E1, E2, E3 (RTN in SPCL field) |
| 70 nanoseconds | add for P4, P5 |
| 560 nanoseconds | total time spent in micro-instruction GO. |

Table VI

| ITEM | TIME |
|---|---|
| P period | 35 nanoseconds |
| P4 plus P5 | 70 nanoseconds |

Table VI-continued

| ITEM | TIME |
|---|---|
| E1 through E3 | 105 nanoseconds |
| Short microcycle | 175 nanoseconds |
| Long microcycle | 280 nanoseconds |
| Typical main memory read cycle | 560 nanoseconds |
| Typical main memory write cycle | 595 nanoseconds |
| DMS factor (WRTE) | 35 nanoseconds |
| DMS factor (READ) | 70 nanoseconds |

Remote Program Load

The remote program load feature allows users of the preferred embodiment to initiate automatic system bootstrap operations. These may include a complete reloading of system software from disc, communication line, or other user defined device and a restart of the particular software operating system selected. This feature is particularly useful for systems where experienced operators are not available or the computer is located at a remote or inaccessible location. The feature allows a central computer to issue commands to reboot or reload a remote or unattended satellite system.

Figure 10:
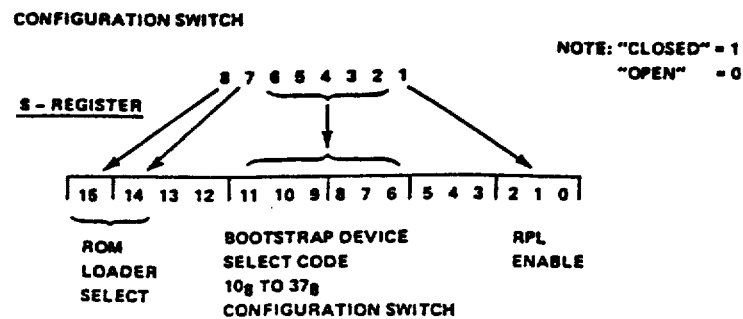
FIG. 10 shows the configuration switch settings for block transfers.

The remote program load allows a reloading procedure to occur automatically and unattended. Process can be triggered in a number of ways, but most commonly under one of the following three conditions; a special interface is connected to the hardware "run" line, a cold-start of the computer is initiated by the operator, and upon the execution of a HALT instruction. All of the above can be conditioned upon the happening of certain other preselected conditions. In the preferred embodiment some of these conditions may be set using the "configuration switch block" located in the CPU circuitry. The configuration codes for the preferred embodiment are shown in FIG. 10.

Figure 11:
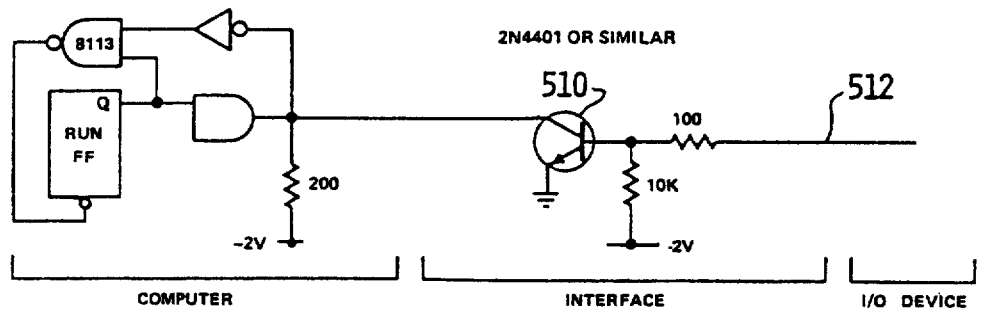
FIG. 11 is a diagram of an interface circuit for use with the remote program load feature of the preferred embodiment.
Figure 12:
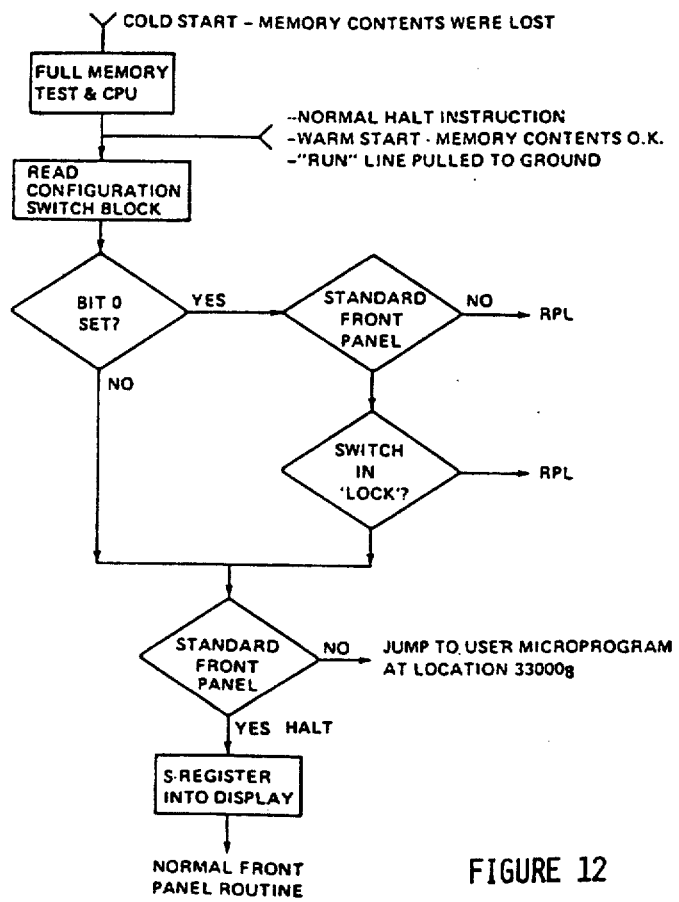
FIG. 12 is the flow chart of the HALT microprogram feature for use with the remote program load feature of the preferred embodiment.

The run line in the preferred embodiment is a two-way communication link with the processor. It is not only an indication of the RUN flip-flop status, high if the computer is running, low if it is not running, but through an appropriate interface as shown in FIG. 11, it can be used to control the RUN state of the processor remotely. When the base of transistor 510 is driven, the collector must sink up the 250 milliamps from the driver which is driving the run line. (In the preferred embodiment, the driver is assumed to be an 8T13 or the like, manufactured by Signetics, Raytheon, and others.) The processor can detect the transition in typically less than one microsecond. The tolerance for duration of the hold-down of this line is very broad, but the line should generally not be held low for longer than a few milliseconds to avoid retriggering the HALT process period. The computer is then switched into the HALT microprogram where, in the preferred embodiment, it performs a sequence of operations as shown in FIG. 12. In the preferred embodiment it is to be noted that the HALT microprogram includes full memory and CPU micro-diagnostics as well as a reconfiguration of the computer to the present settings. If the remote program load feature has been selected, the computer is not halted, but rather control is transferred to a predetermined user microprogram at location 33000₈.

Basically, to initiate externally triggered remote program load, the I/O device must drive the communication line 512 high to reset the run flip-flop as described above to begin the microprogrammed RPL procedure. For example, a CRT terminal could have this line hardwired to a special load button on its keyboard for initiating this sequence. Alternatively, a pair of data communication boards linking two minicomputer based systems together could have specific command decode logic on each board, which upon the detection of a certain predetermined command sequence, would raise line 512, clear the run flip-flop, thereby initiating the RPL procedure.

Microprogrammable Processor Port

The microprogrammable processor port (MPP) permits external hardware to be directly connected to the central processing unit and interfaced under fast and direct microprogram control. The physical connection to the microprogrammable processor port consists of two 50-pin connectors which carry the timing control and addressing signals as well as the internal S-bus lines from the computer to the external device. In the preferred embodiment, this high-speed direct link between the control processor and the external devices allows transfer rates up to 5.7 megawords per second in short bursts and up to 1.5 megawords per second for longer sustained synchronous transfers.

The processor port is a controlled processor programmed I/O method, different from direct memory accessed channels and the typical I/O bus schemes used for standard I/O. The processor port is particularly suited for data transfers to and from buffered interfaces, external high-speed random access memory devices, special external processors such as fast Fourier transform or floating point processors, as well as video displays and other high-speed synchronous devices where it is advantageous to couple them directly to the central processing unit.

Because the basic control of the processor port is provided through microprogramming, any hardware interface can be accommodated by simply writing a program to control it.

Figure 13:
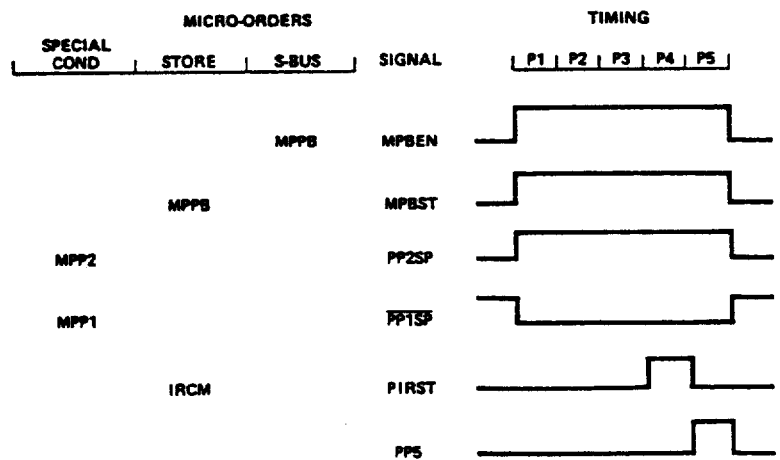
FIG. 13 shows the timing relationship of the microinstructions used with the microprogrammable processor port feature of the preferred embodiment.

The microprogrammable processor port interface signals are listed below in Table VII. Also, the microprogrammable processor instructions and their relative timing waveforms are shown in FIG. 13.

Table VII

| SIGNALS | DESCRIPTION |
| --- | --- |
| MPPIO 0 thru 15 | Two-way MPPIO signal lines that provide the main data link for the MPP to the computer (CPU) S-bus. Under control of micro-orders affecting the S-bus. |
| PP5 | Output timing line can be used to synchronize with the computer for data transfers. |
| PLRO | Output L-register signal line under control of L-register micro-orders. L-register bits 3 through 1 must be 0 to enable the MPP. Signal PLRO is used for an address line. |
| STOV | Input signal line. State can be tested by the word type III Conditional field OVFL micro-order. Possible use to designate overflow from a set Overflow register. |
| PIRST | Output signal line. Can be used to sense the IR (IRCM micro-order in Store field). |
| PP1SP | Output signal line activated by a MPP1 micro-order in the word type 1 Special field. Could be used to designate "first operand to follow". |
| PP2SP | Output signal line activated by a MPP2 micro-order in the word type 1 Special field. Could be used to designate "second operand to follow". |
| MPBST | Output signal line activated by a MPPB micro-order in the word type 1 Store field. Could be used to generate a store (e.g., repeated four times to store in a 64-bit group of data, where data is being output on the S-bus). |
| MPAST | Similar MPBST except initiated by a MPPA micro-order. |
| MPBEN | Output signal line activated by a MPPB micro-order in the word type 1 S-bus field could be used to gate data into the computer on the S-bus (e.g., receive back computed data repeatedly). |
| MPAEN | Similar to MPBEN except activated by a MPPA micro-order. |
| MPP | Input signal line. State can be tested by the word type III conditional field MPP micro-order. Could be used to sense when device transfer is complete. |

The following sample applications below will illustrate the operation of the microprogrammable processor port. These examples are presented in order of increasing complexity.

Synchronous Data Burst Using The Microprogrammable Processor Port

Figure 14:
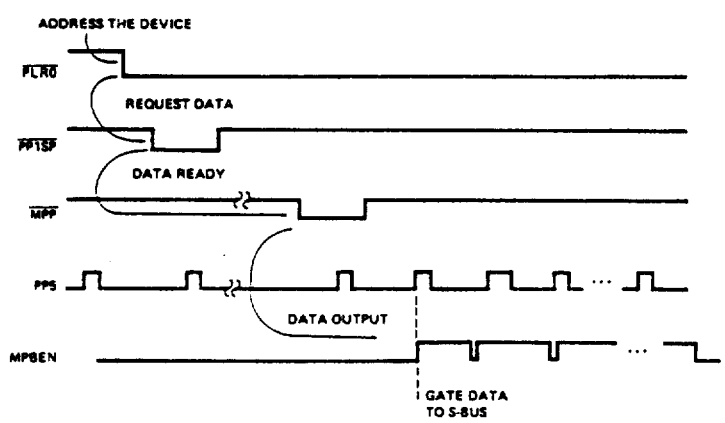
FIG. 14 illustrates the wave forms used during a synchronous burst data transfer through the microprogrammable processor port of the preferred embodiment.

Assuming a device will transfer 12 words of data (192 bits) at very high speed, it will use the P5 subinterval signal as a clock, passing one data word per cycle, thus running synchronously with the central processor. The signal PLRO is used to address the device. The data transfer is triggered by a handshaking sequence which uses signal PP1SP to indicate "processor-ready" and MPP to indicate "device-ready". Thus, when PLRO and PP1SP are both true, the device performs the required operation, i.e., obtains the data, presets the counters, etc. Then, the device indicates readiness by setting MPP true and clocking out 12 words of data to the S-bus connection. See FIG. 14 where the waveforms for this transfer are shown. Since this transfer is under microprogram control, the words can be directly loaded into scratch pad registers for further processing.

Device Selectable Synchronous Transfer Using MPP

For this example, it is assumed that the device allows the implementation of an addressing scheme and synchronous data transfers of varying lengths up to 255 words are possible. The external device's circuitry is modified so that the PP2SP-True signal can be used with PLRO-True to indicate "address mode" operation. In this mode, the lowest four bits of the S-bus output will be latched into an address register and compared against the specific address of the device. If the device-select code does not match, the device will clear itself and wait for another address mode pulse. If there is a match, the handshake sequence described in the synchronous burst example above will initiate and synchronous the device with the central processor.

Data will now be clocked out using the subinterval P5 signal. A microprogram using this technique is shown in Table VIII below.

the P register and scratch pad 2 and using CNTR as a counter, the microprogram achieves the maximum data throughput to memory that is possible (point A in Table VIII). Also, the routine minimizes loop time by incrementing the buffer address (kept in the P register) and decrementing the word count (in CNTR) in one instruction. (See point B in Table VIII.

Interruptable, Asynchronous Transfers Using The MPP

In this example, we use a scratch pad register 2 as a word counter to allow greater than 255 word transfers

TABLE VIII

```
START   IMM           LOW     L       φφ1B    SELECT MPP BRANCH 1
                              S1      TAB     GET ADDRESS OF BUFFER INTO S1
                MPP2          MPPB    CNTR    PULSE pp2, PUT MACRO ON S-BUS
GET BUFFER LOCATION AND WORD COUNT FROM MEMORY LOCATIONS
IMMEDIATELY FOLLOWING THE MACRO
        READ          INC     PNM     P       M=N+2, P=N+3, GET COUNT ADDRS
        READ                  M       TAB     GET VALUE OF WORD COUNT
                MPP1          CNTR    TAB     S2=WORD COUNT, START DEVICE
        JMP     CNDX  ALZ             EXIT
        A →                   S2      P       SAVE P-REGISTER FOR EXIT
                      INC     PNM     S1      GET BUFFER ADDRESS TO 'M'
WAIT UNTIL DEVICE IS READY, THEN CLOCK IN THE NUMBER OF WORDS
DEFINED BY CONTENTS OF 'CNTR'.
        JMP     CNDX  MPP     RJS     *       WAIT 'TILL DEVICE READY
LOOP    WRTE                  TAB     MPPB    WRITE S-BUS (=PORT) TO MEM
                DCNT  INC     PNM     P       INC BUFR PNTR, DEC COUNTER
B →     JMP     CNDX  CNT A   RJS     LOOP    GO BACK IF THERE'S MORE
SIGNIFY END-OF-TRANSFER TO DEVICE BY CLEARING WITH
'PP2' SIGNAL, ADDRESS = φ. RETURN
                MPP2          MPPB    CNTR    NOTE: CNTR = φ HERE
EXIT    READ    RTN   INC     PNM     S2      SET M=N+3, P=N+4, RETURN
        END
```

Figure 15:
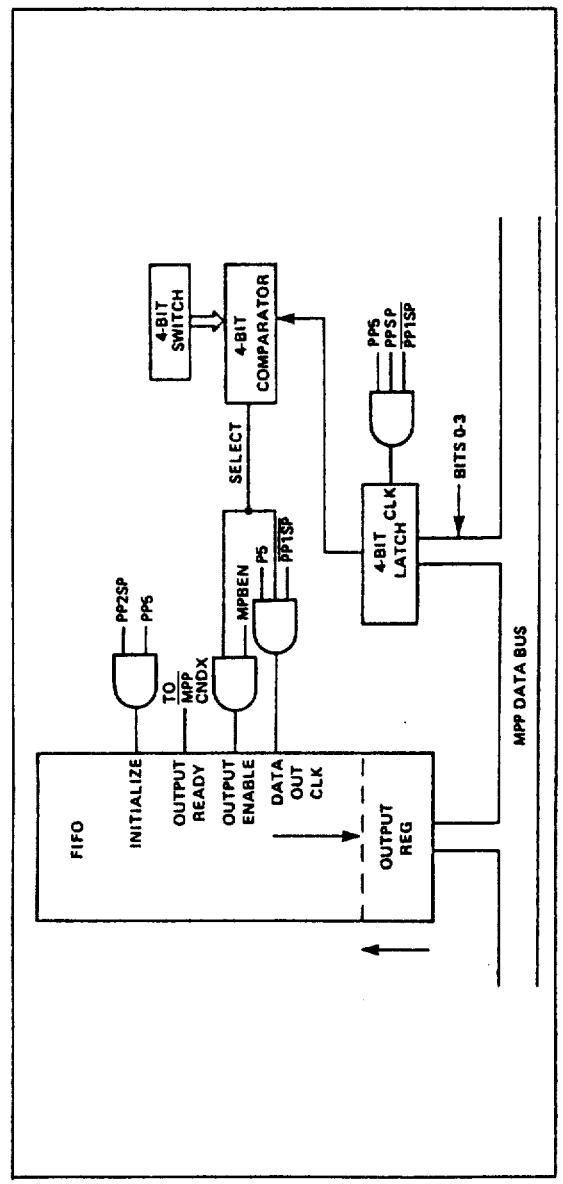
FIG. 15 shows a block diagram of a first in/first out (FIFO) buffer and control logic circuitry to interface this device to the microprogrammable processor port.

Note that the data transfer rate will typically be much lower than that which is possible because normally some microprogram steps are added to process and store the data. Also, the end of transfer is signalled by placing all devices in "address-mode" and sending device select code zero which corresponds to a nonexistent unit. This will clear and reset all devices. This program is initiated by a microinstruction which maps to the microcode shown in Table VIII. The four least significant bits of the microinstruction are used to specify the device-select code. The words in the two memory locations immediately after the microinstruction specify the address of the destination buffer and the address of the word count for the transfer. Also, for improved transfer speed, the microprogram illustrated in Table VIII uses an 8-bit dynamic word counter (CNTR) an approach that accounts for the 255 word transfer limitation in this preferred embodiment. Alternatively, a scratch pad register could be used as a counter with a range from 0 to 32,767. Also, by saving and permit asynchronous operation. Since the total transfer time may be very long depending on the word count and transfer rate, the microprogram must be interruptable by other I/O devices. FIG. 15 shows a block diagram of a circuit using a counter similar to the Fairchild 9403 or the like to form a FIFO (first-in-first-out) buffer and having control logic circuitry to interface this device to the microprogrammable processor port. A microprogram designed to communicate with this device shown in FIG. 15 in an interruptable asnychronous fashion is shown in Table IX.

As in the previous example, an address latch and comparator are used for device-select with PP2SP-True. The device/microprogram uses $\overline{PP1SP}$-True and $\overline{MPP}$-True to "handshake" on the transfer of each data word. At each loop of the handshake, the microprogram checks for pending interrupts. If interrupt processing is required, intermediate results (word count and current buffer pointer) are saved, and the microprogram jumps to an interrupt process routine.

Table IX

```
START   IMM           LOW     1       φφ1B    SELECT MPP BRANCH 1
                              S1      TAB     GET BUFFER ADDRESS FROM 'DEF'
                MPP2          MPPB    CNTR    PULSE PP2SP, SEND MACRO
•
•
•       PICK UP WORD COUNT FROM MEMORY LOCATION
•       LOCATED JUST AFTER THE MACRO AND BUFFER 'DEF'.
•
        READ          INC     PNM     P       M=N+2, P=N+3, GET COUNT
                                              ADDR
        READ                  M       TAB     GET COUNT VALUE
                              S4      M       SAVE ADDRESS OF COUNT
                      INC     PNM     P       PREPARE TO CHECK 'NOP'
        READ                  S2      TAB     S2 = WORD COUNT, READ N+3
        JMP     CNDX  ALZ             EXIT    CHECK FOR INITIAL ZERO WORD
                                              COUNT
```

Table IX-continued

IF THIS IS A RE-ENTRY AFTER INTERRPUT PROCESSING, THE 'NOP'(N+3)
WILL BE NON-ZERO. IF SO, DON'T ISSUE 'MPP1' BEFORE CHECKING
STATUS OF DEVICE ('MPP'). FURTHERMORE, THE VALUE IN N+3 IS NOW
THE CURRENT BUFFER POINTER.

|      |      |      | S3   | TAB    | SAVE CONTENTS OF N+3 IN S3 |
|------|------|------|------|--------|----------------------------|
|      | JMP  | CNDX | ALZ  | LOOP   | IF ZERO, IT'S A FRESH START |
|      |      |      | S1   | S3     | ELSE SET CURRENT BUF PNTR |
|      |      |      | M    | S1     | SET 'M' |
|      | JMP  |      |      | LOOP+1 | GO TO DATA TRANSFER LOOP |

DATA TRANSFER LOOP: CLOCK IN DATA WITH 'MPP1', WAIT FOR 'PP'
TO SIGNIFY DATA READY

TRANSFER REQUESTED NUMBER OF WORDS, THEN QUIT

| LOOP |       | MPP1 |      | M    | S1              | KICK DEVICE, SET M |
|------|-------|------|------|------|-----------------|--------------------|
|      | JMP   | CNDX | NINT | RJS  | INTPEND         | ANY INTERRUPTS?IF SO,GO PROCESS |
|      | IMP   | CNDX | MPP  | RJS  | *−2             | DEVICE READY?NO, LOOP |
|      | WRITE |      | TAB  | MPPB | YES, TRANSFER DATA TO MEMORY | |
|      |       |      | INC  | S1   | S1              | INCREMENT BUFFER ADDR |
|      |       |      | DEC  | S2   | S2              | DECREMENT WORD COUNT |
|      | JMP   | CNDX | ALZ  | RJS  | LOOP            | DONE? YES, EXIT. |

COME HERE WHEN DONE . . . RESET 'NOP' TO ZERO FOR NEXT TIME THROUGH

| EXIT |          |      | ZERO | S3  |    | CLEAR S3, PASS TO 'T' |
|------|----------|------|------|-----|----|------------------------|
|      | WRTE     |      |      | TAB | S3 | AND RE-WRITE THE 'NOP' |
|      | READ RTN |      | INC  | PNM | P  | RETURN |

PROCESSING FOR PENDING INTERRUPTS. IF GOT ONE, SAVE INTERMEDIATE
STATE OF THIS ROUTINE IN MEMORY LOCATIONS FOLLOWING MACRO.

| INTPEND |      |     | DEC | P   | P    | SET P=N+3 |
|---------|------|-----|-----|-----|------|-----------|
|         |      |     | DEC | PNM | P    | SET M=N+3, P=N+2 |
|         | WRTE |     |     | TAB | S1   | SAVE BUFR PNTR IN 'NOP' |
|         |      |     | DEC | P   | P    | SET P=N+1 for EXIT . . . |
|         |      |     |     | M   | S4   | GET ADDRESS OF WORD COUNT |
|         | WRTE |     |     | TAB | S2   | STORE PRESENT WORD COUNT |
|         | JMP  |     |     |     | HORI | GO TO INT PROCESSOR |
|         | END  |     |     |     |      | |

Note that with the microprogrammable processor port design an important element is to have a data buffer large enough to hold the entire burst of data. Thus, the elimination of "handshaking" during the data transfer is a prime advantage of the microprogrammable processor port of the preferred embodiment.

Detailed Description of the Schematics

Figure 16:
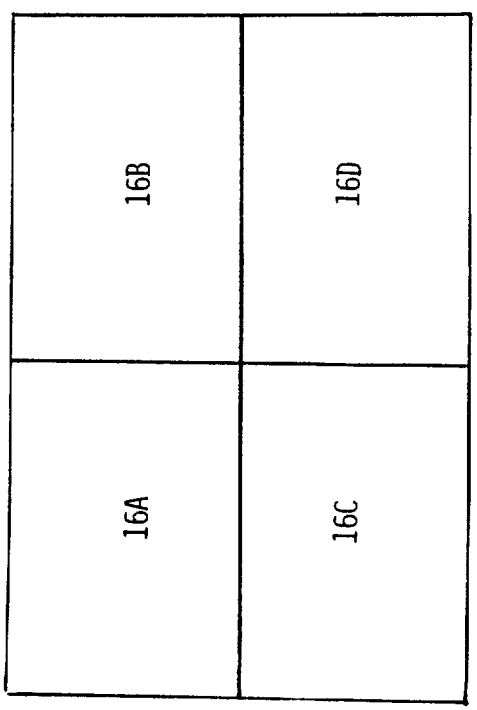
FIG. 16 shows the relationship of FIGS. 16A, 16B, 16C and 16D.

Referring now to FIG. 16, there is shown the timing circuitry of the preferred embodiment. Timing is generated from a third overtone 28.5 MHz crystal control master oscillator circuit 1610. The oscillator consists of two high-speed inverters 1611 and 1612 with negative feedback provided by two resistors 1614 and 1615. Selection of the resistors and the blocking capacitor 1617 determine where the crystal will "lock in" (i.e., the fundamental or desired overtone frequency).

The 28.5 MHz buffered output signal on line 1620 is passed through two NAND gates 1625 and 1630 to an eight-state counter 1640. The purpose of the two NAND gates 1625 and 1630 is to allow an external oscillator to be connected to the central processing unit.

Counter 1640 includes three flip-flops labeled PA, PB and PC. These three flip-flops define clock signals that are used in the central processing unit. They are sequenced by the steering logic 1638 which feeds the D inputs of these flip-flops. Assuming that both signals $\overline{SHORT}$ and $\overline{PAUSE}$ are high, an analysis of the circuit would show that flip-flops PA, PB and PC will sequence through the states as illustrated by the timing diagram 1641. The eight subintervals P1, P2, P3, E1, E2, E3, P4 and P5 are thus generated.

Figure 16A:
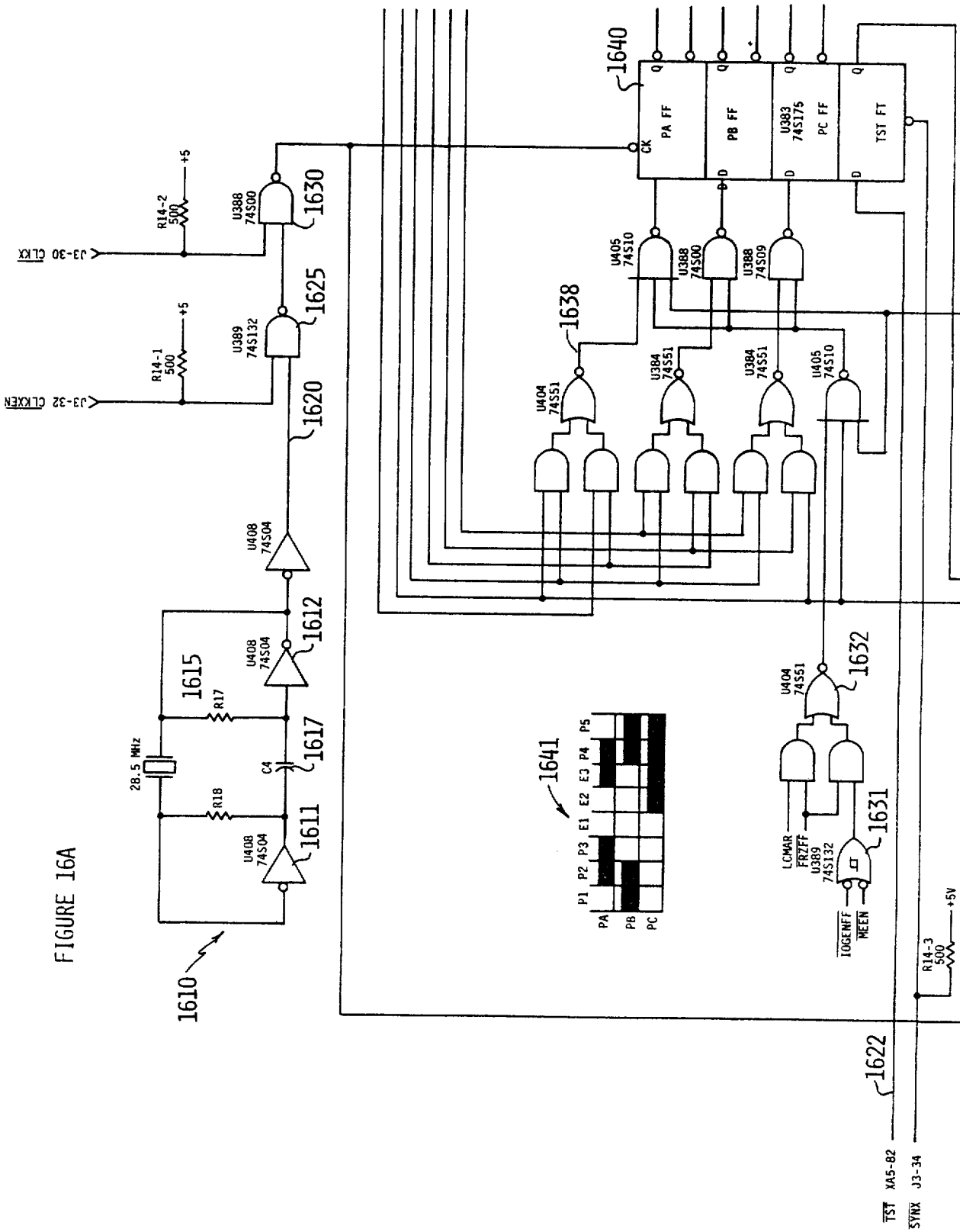
FIGS. 16A, 16B, 16C and 16D are a detailed schematic timing diagram of the preferred embodiment.
Figure 16B:
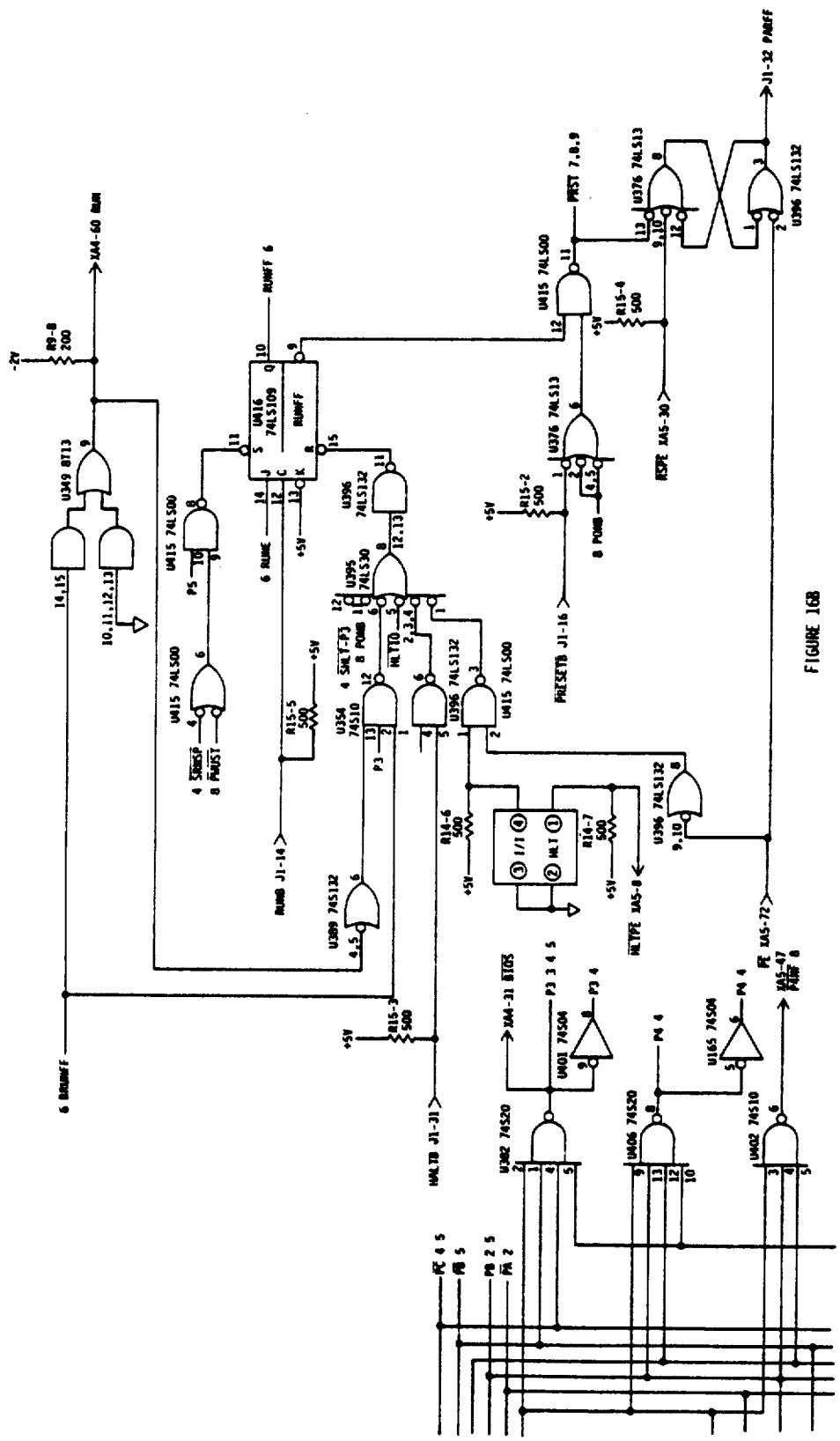

The individual P-period or P-periods are decoded from the flip-flops PA, PB and PC by combinational logic throughout the central processing unit. Also, many of these signals are decoded as shown in FIG. 16B for use throughout the machine. Note that the signal FRZFF is used as a qualifier for generation of these timing signals. Signals whose generation are not stopped during a freeze as hereinabove described include a suffix NF to indicate that they are "not freezable".

Figure 23:
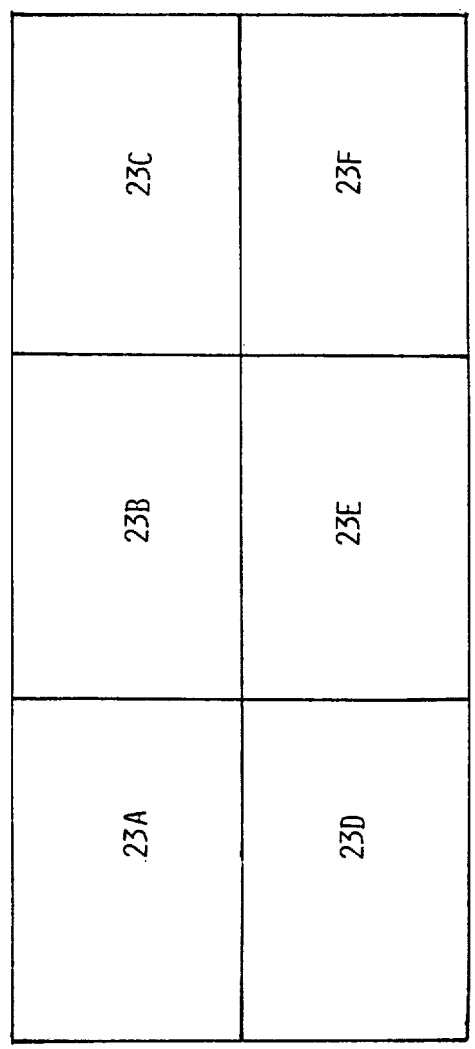
FIG. 23 shows the relationship of FIGS. 23A, 23B, 23C, 23D, 23E and 23F.
Figure 23A:
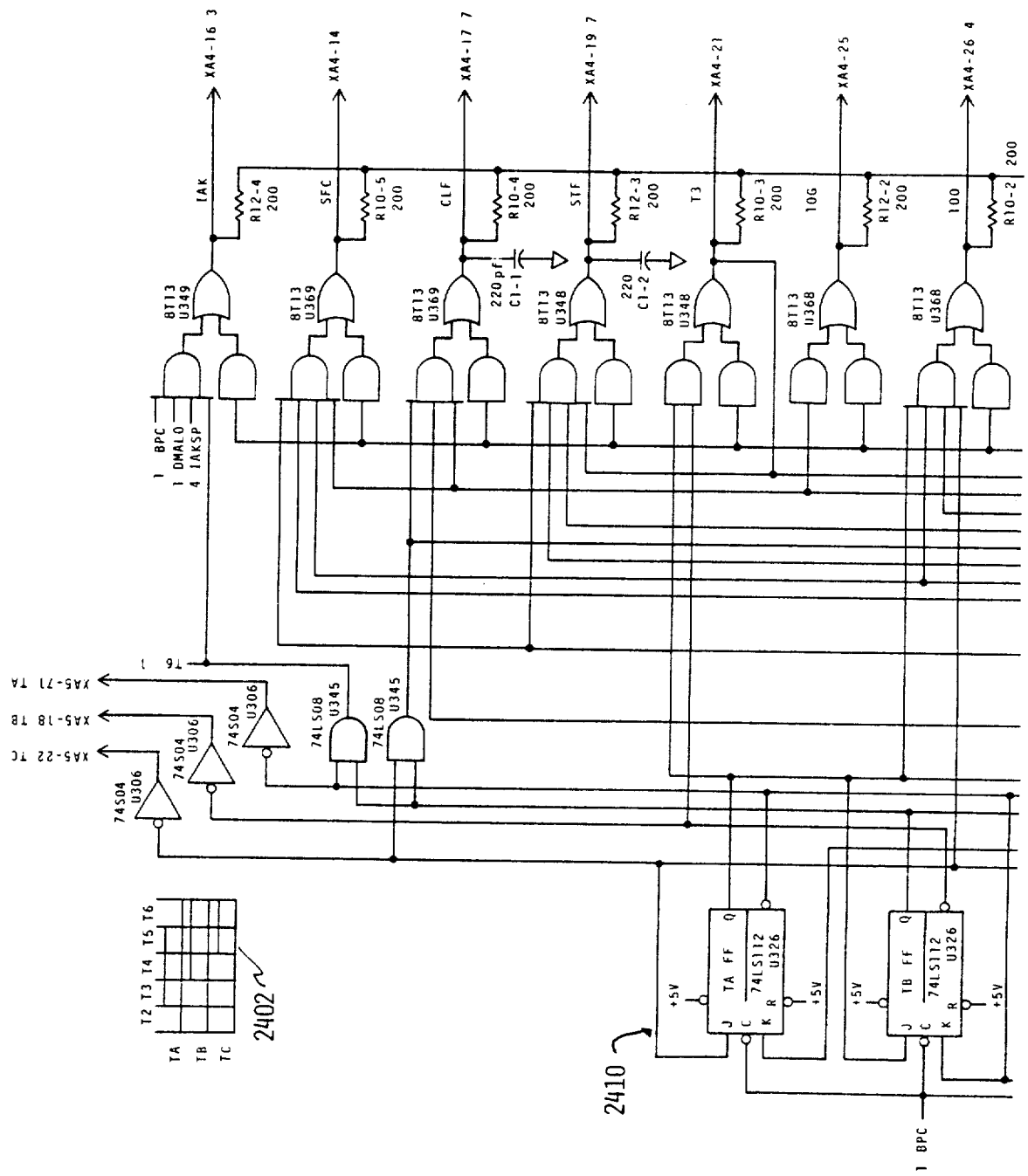
FIGS. 23A, 23B, 23C, 23D, 23E and 23F taken together comprise a detailed schematic diagram of the I/O circuitry of the preferred embodiment.
Figure 23B:
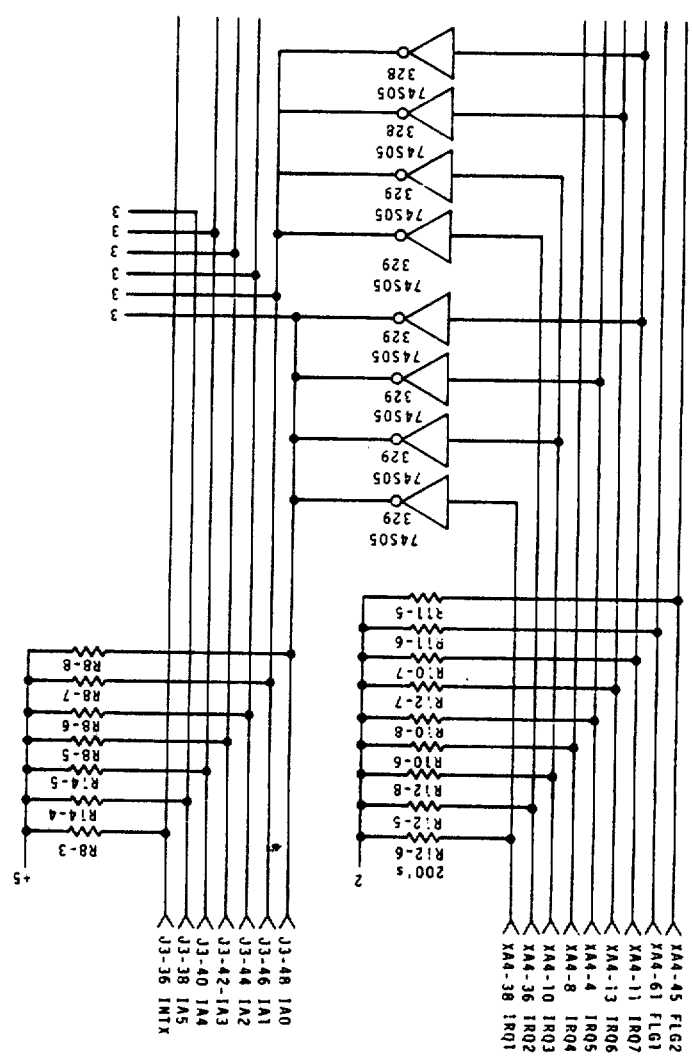
Figure 23C:
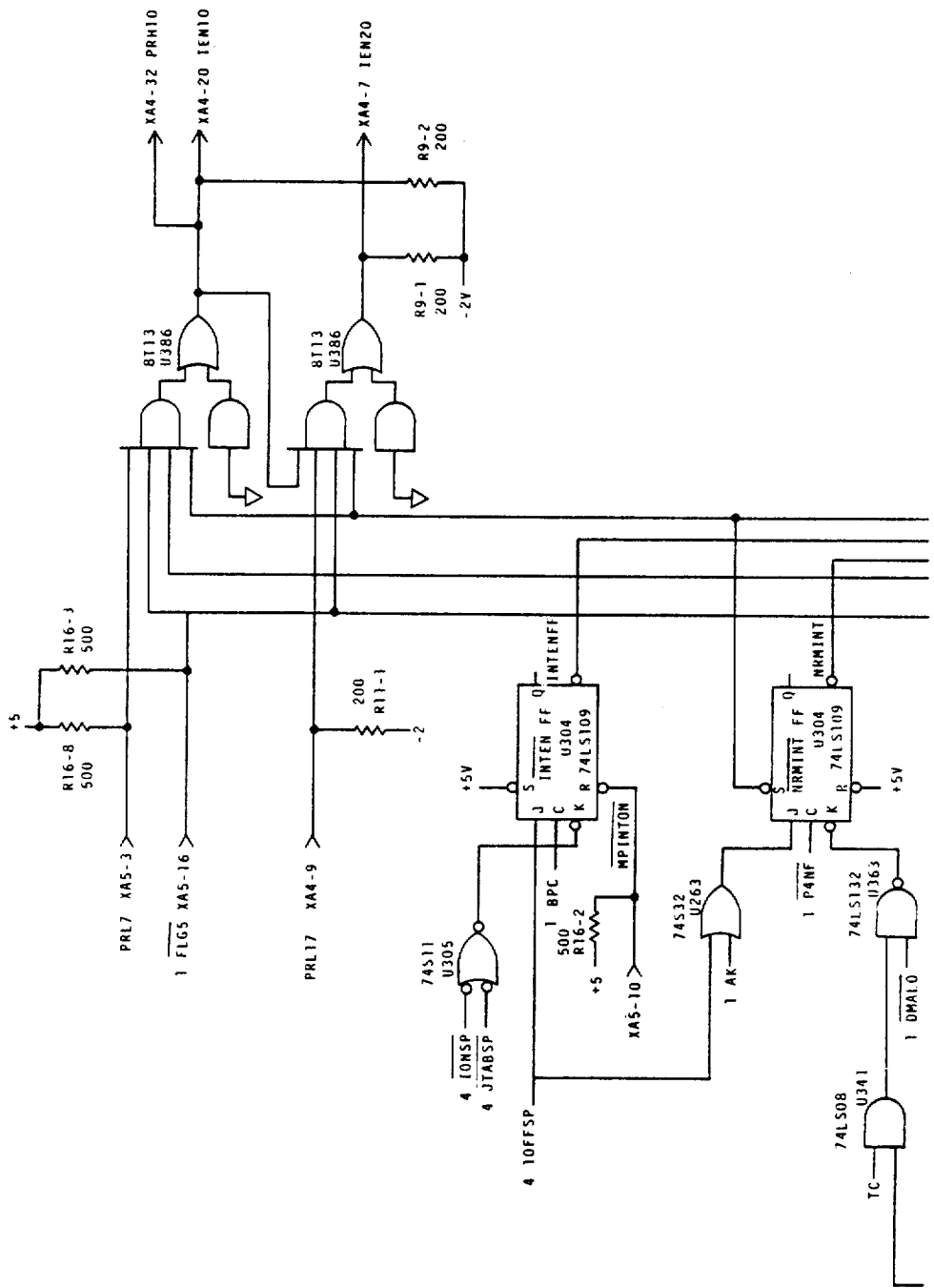
Figure 23D:
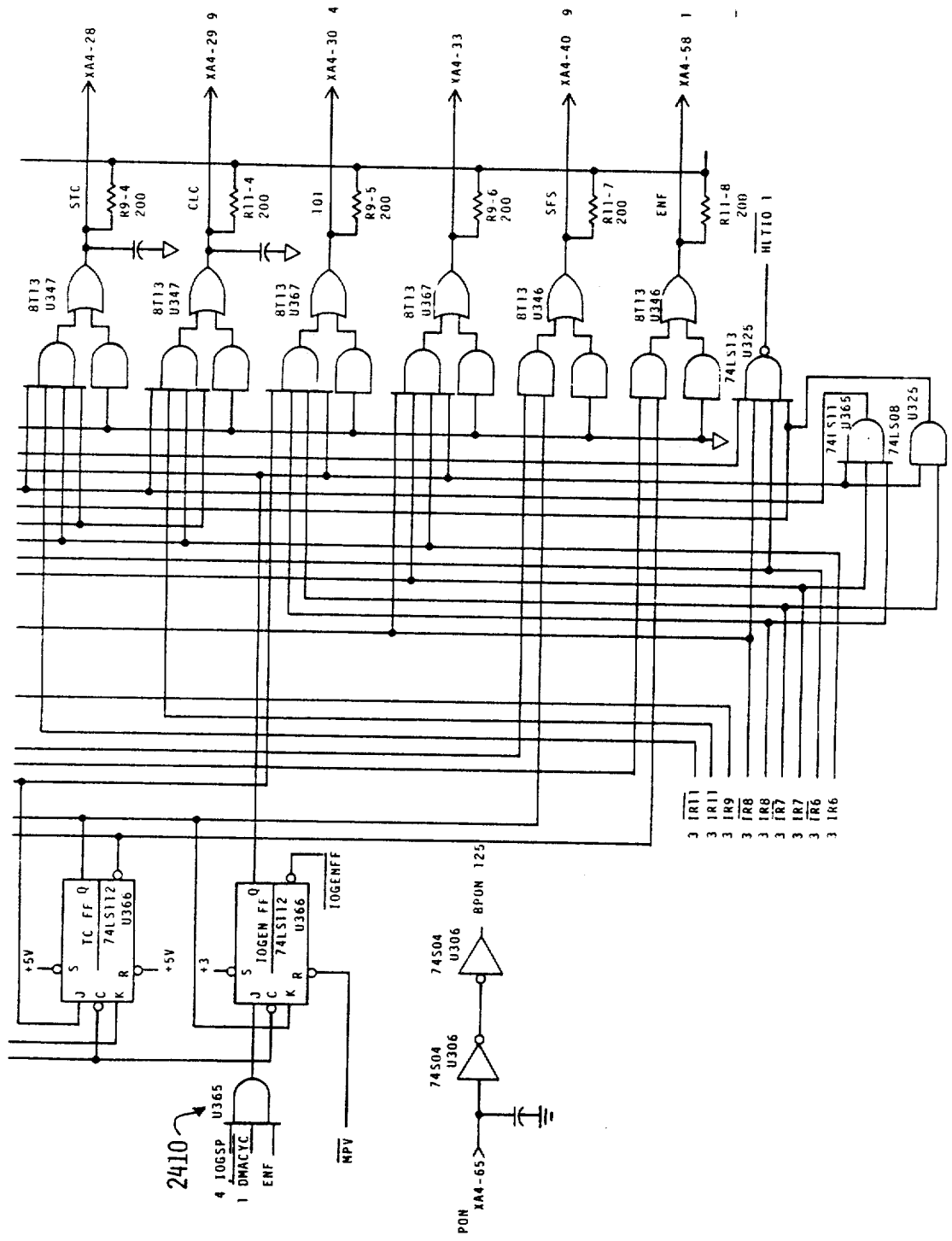
Figure 23E:
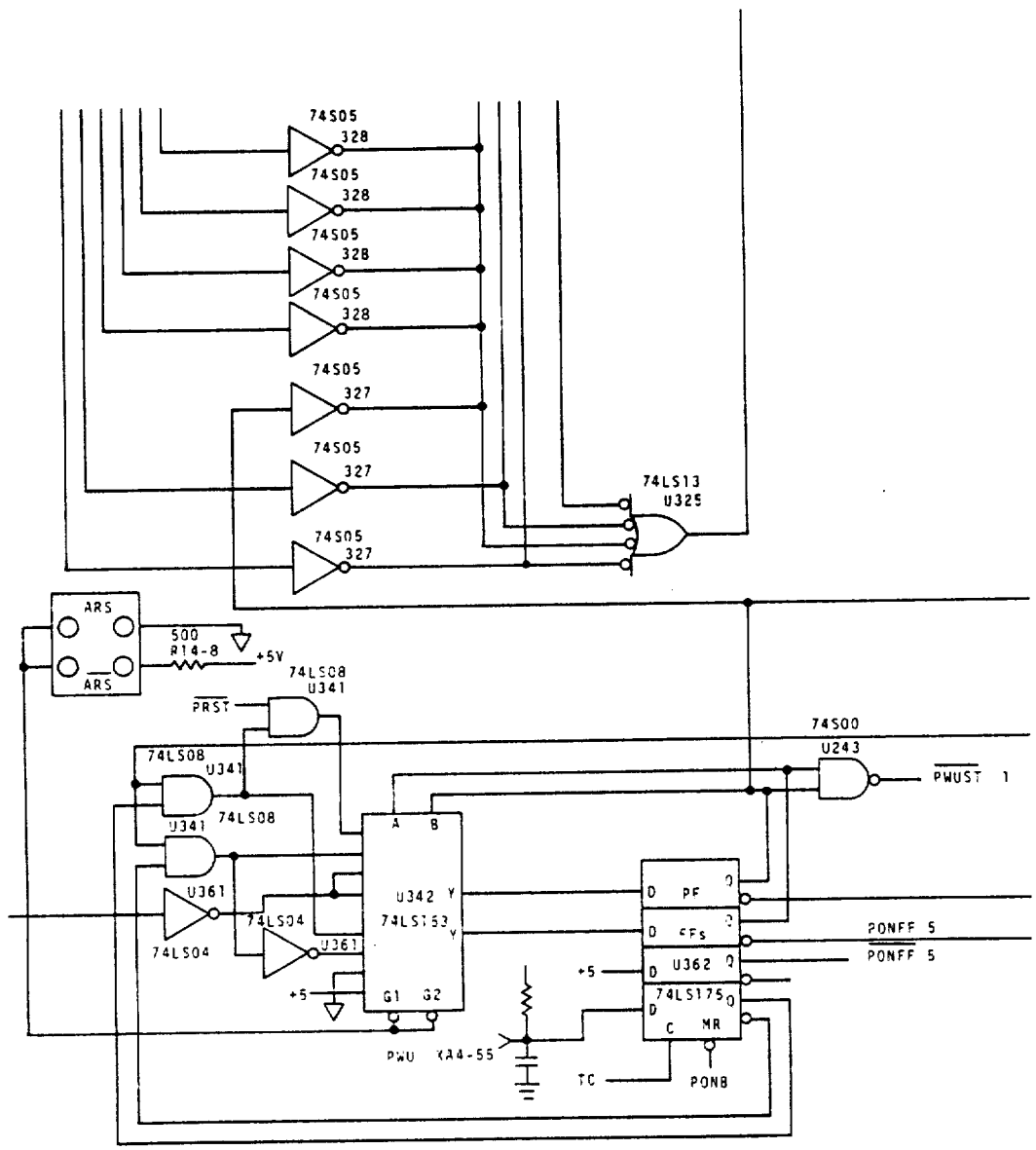
Figure 23F:
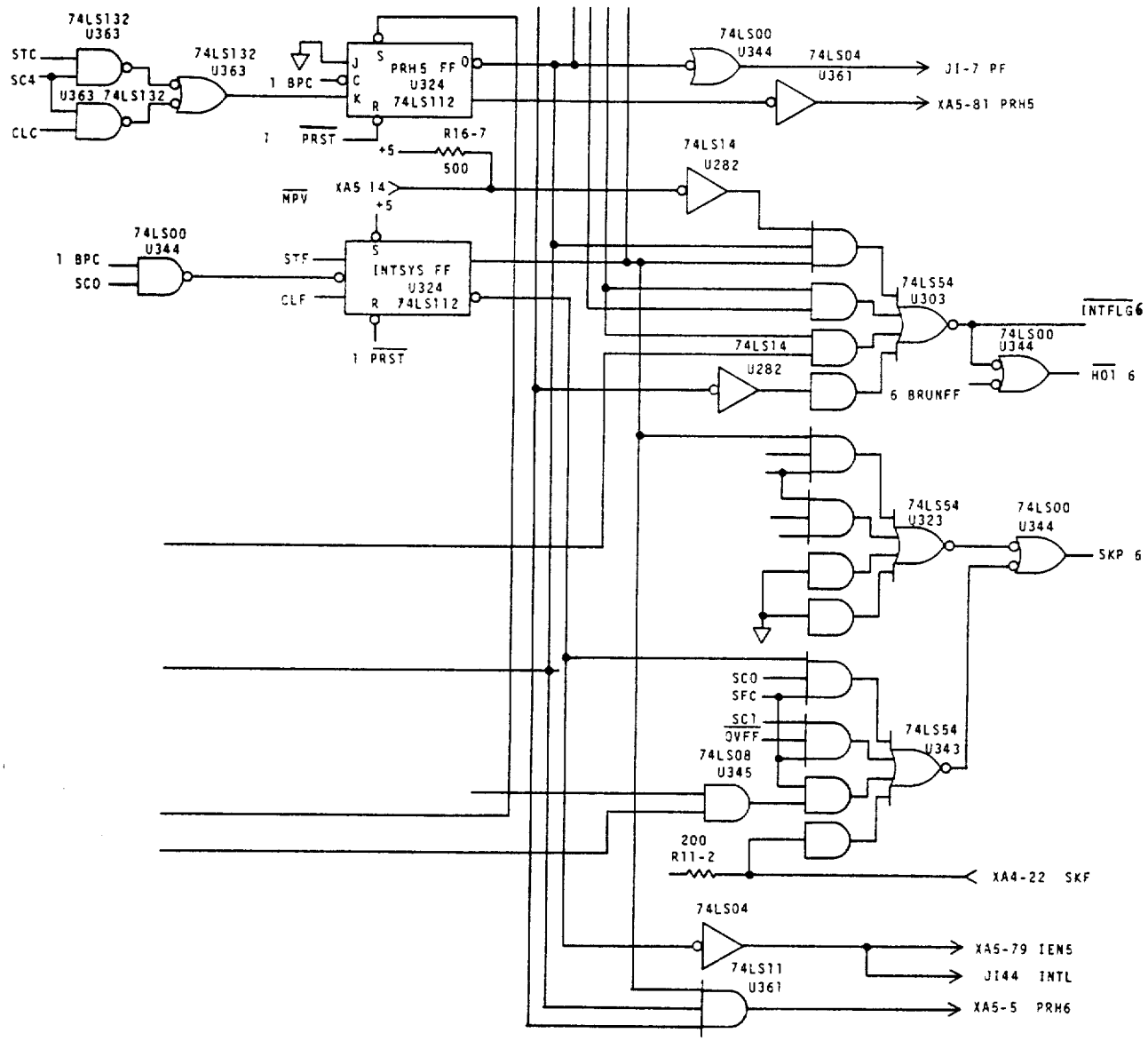
Figure 24A:
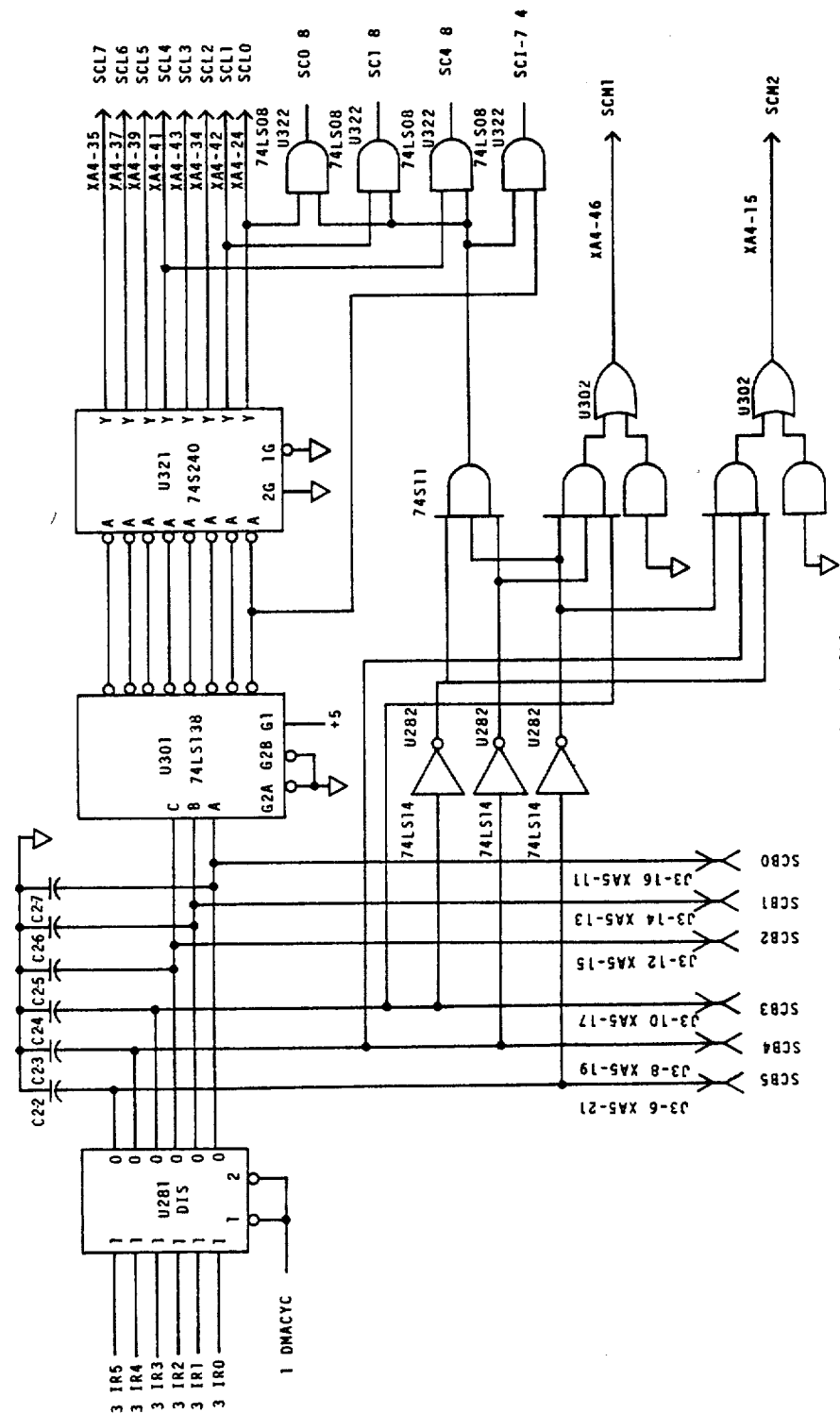
FIGS. 24A and 24B taken together comprise a detailed schematic diagram of the I/O circuitry of the preferred embodiment.
Figure 24B:
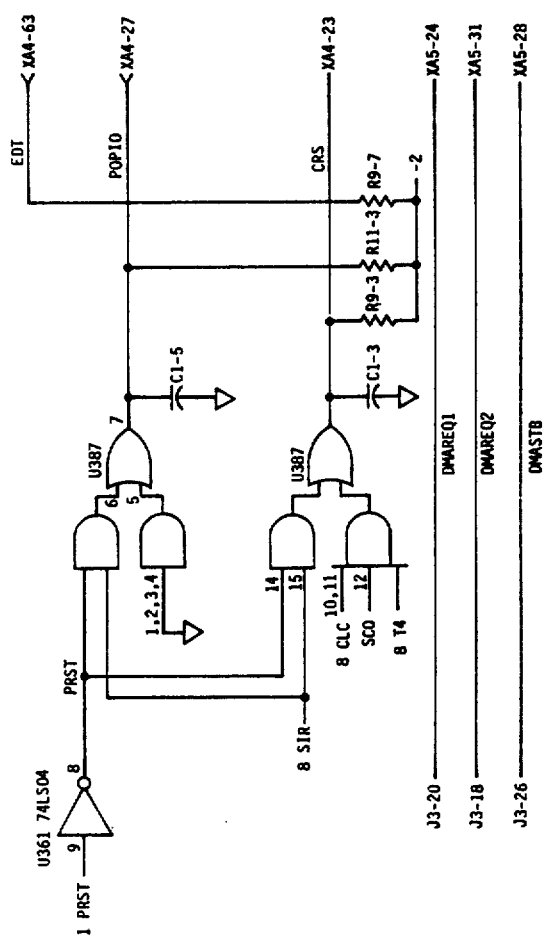
Figure 22C:
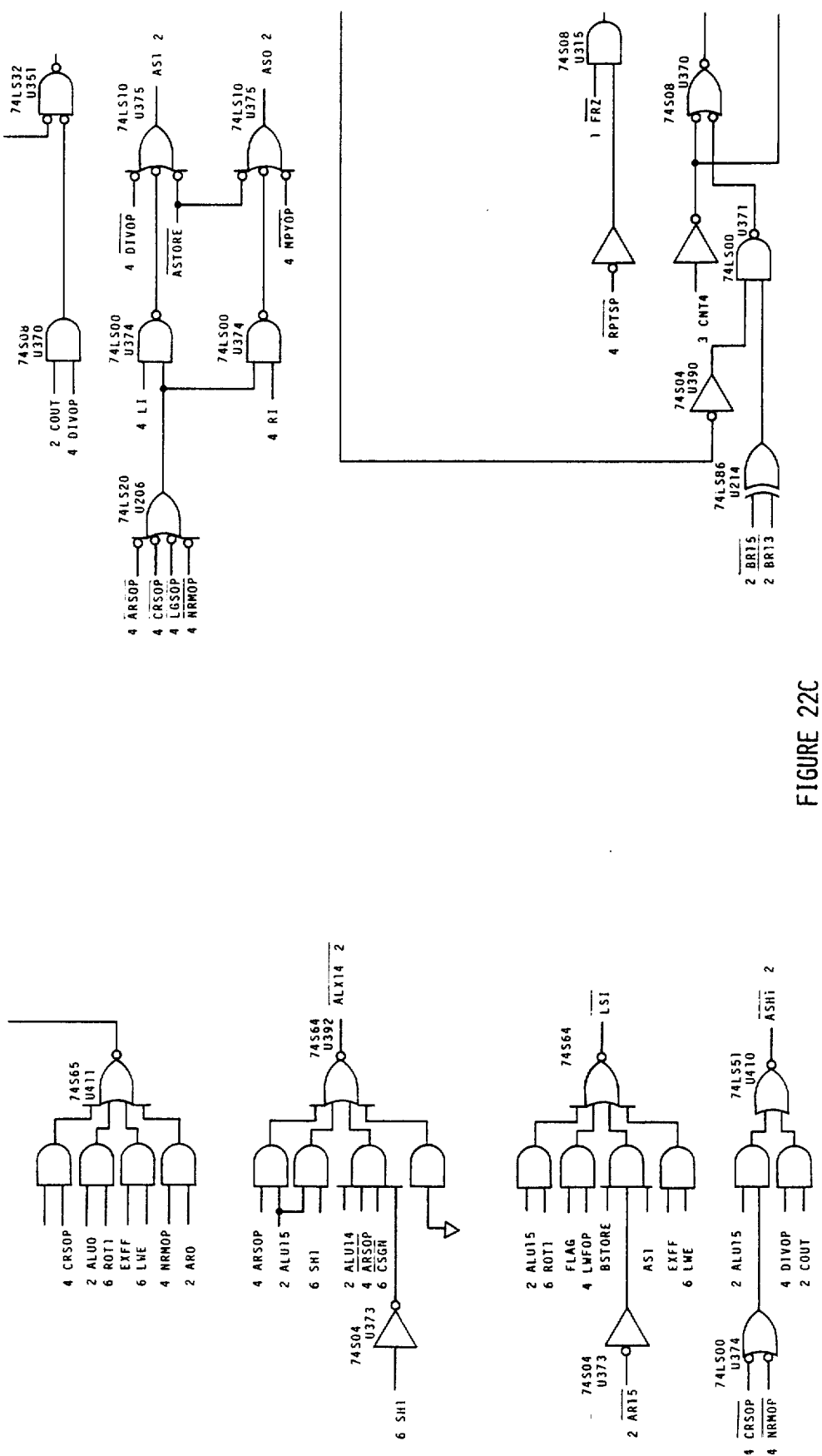

The timing logic for the I/O system of the preferred embodiment is shown in FIG. 23A. A buffered image of the PC flip-flop signal clocks a mod 5 counter 2410, shown in FIGS. 23A and 23D, at the end of every microcycle. The counter is implemented using JK flip-flops individually labeled TA, TB and TC and counts as the timing diagram 2402 in FIG. 24A indicates. These timing signals generated are subsequently decoded into 5 distinct periods, referred to as T-periods, numbered T2, T3, T4, T5 and T6, that control I/O system operation. Five such T-periods are defined as one complete I/O cycle. Various circuitry associated with the counter is designed so that no lock up in any state can occur.

In general, the I/O system performs a specific task no more frequently than in one complete I/O cycle. Thus, the 5 T-periods are used for precise implementation of specific tasks.

The purpose of the CPU freeze as hereinabove described is to selectably disable control processor micro-instruction execution for certain time periods without disabling other computer activities. With the exception of I/O related activities and memory refreshing operation, if a refreshable memory is used, all computer operations are suspended when the freeze is invoked. Therefore, destinations of the nonfreezable signals are to be preselected to include usually the I/O accessory and memory systems. A freeze flip-flop 1650 is updated at the end of every microcycle and determined if the control processor is to be frozen during the next microcycle. Gate 1648 is fed by circuitry which monitors the four conditions in the preferred embodiment that may freeze the CPU.

One condition that will freeze the CPU is if the control processor is preparing to initiate a memory cycle which is indicated by the signal RDORWT on a line 1671 and the existence of either a memory refresh or a memory accessory data transfer, then a control processor freeze will occur. The signal REFRESH is generated by the memory controller to indicate to the CPU that the memory resources will be occupied during some preselected time. In the preferred embodiment, the signal REFRESH on line 1642 is generated during T5 and T6 to indicate that the refresh will occur during time periods T2 and T3.

A second condition which will freeze the central processor occurs when an interrupting I/O device requires processing by the CPU. The interrupt acknowledge signal (IAK) is sent to the I/O system, when the device interrupt address is loaded into the central interrupt register of the computer.

A third condition that will "freeze" the CPU is when the signal IOGSP on line 1645 indicates that an I/O instruction is to be executed. Since as described above, the control processor is normally executing micro-instructions asynchronously of the T-period interval designations, a freeze is required until the two timing systems are synchronized. The control processor therefore freezes until the signal ENF on line 1643 is true.

The fourth condition for a freeze is when a direct memory access transfer is being used to directly transfer data from an I/O device into memory without transferring it through the central processing unit. The signal DMACYC on a line 1644 is interrogated each T5 time period to determine whether the CPU should be frozen during the duration of the next T2, T3, T4, T5 I/O time periods to allow the I/O device to use both the data bus and memory system.

Long/Short Cycles

In the preferred embodiment, three circumstances will cause the control processor to generate a long microcycle rather than a short microcycle. These are an unconditional branching instruction or a conditional branching instruction where the branch condition is met, and I/O instruction where it is required to extend the microcycles corresponding to I/O time intervals T3, T4 and T5, or some memory operation such as the Dynamic Mapping System used in the preferred embodiment, will be unable to complete the interfacing tasks required in the 175 nanoseconds which is normally available after a micro-instruction is loaded in the micro-instruction register. This extension of the microcycle is performed by gates 1631 and 1632 as shown in FIG. 16A. These gates detect these special conditions early in every microcycle before the signal PB goes high at subinterval P3. If no special conditions are present at subinterval P3, the SHORT signal goes low and forces all inputs to the P flip-flops to go high. Therefore, at the next clock period, i.e., the end of subinterval P3, all three flip-flops will be clocked to the P4 state. Thereafter, counting proceeds to subinterval P5 since the signal PB is still low. In this case, the state counter would have counted P1, P2, P3, P4 and P5 for a total of five P-periods or a total of 175 nanoseconds.

The P subinterval flip-flops utilize an eight-state Gray code which is a binary representation characterized by only a single flip-flop changing at any common clock pulse.

Pause

Figure 16C:
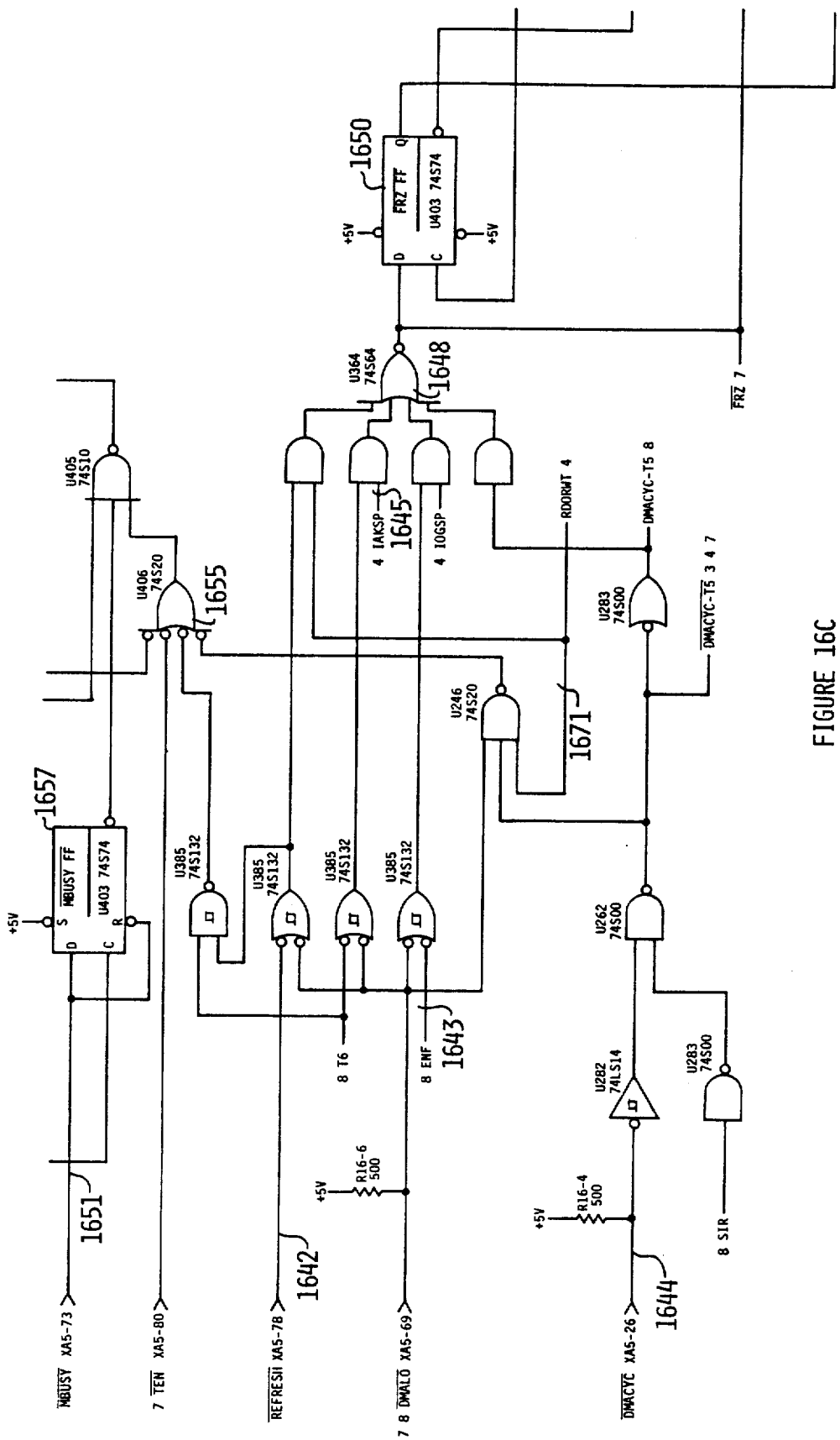
Figure 16D:
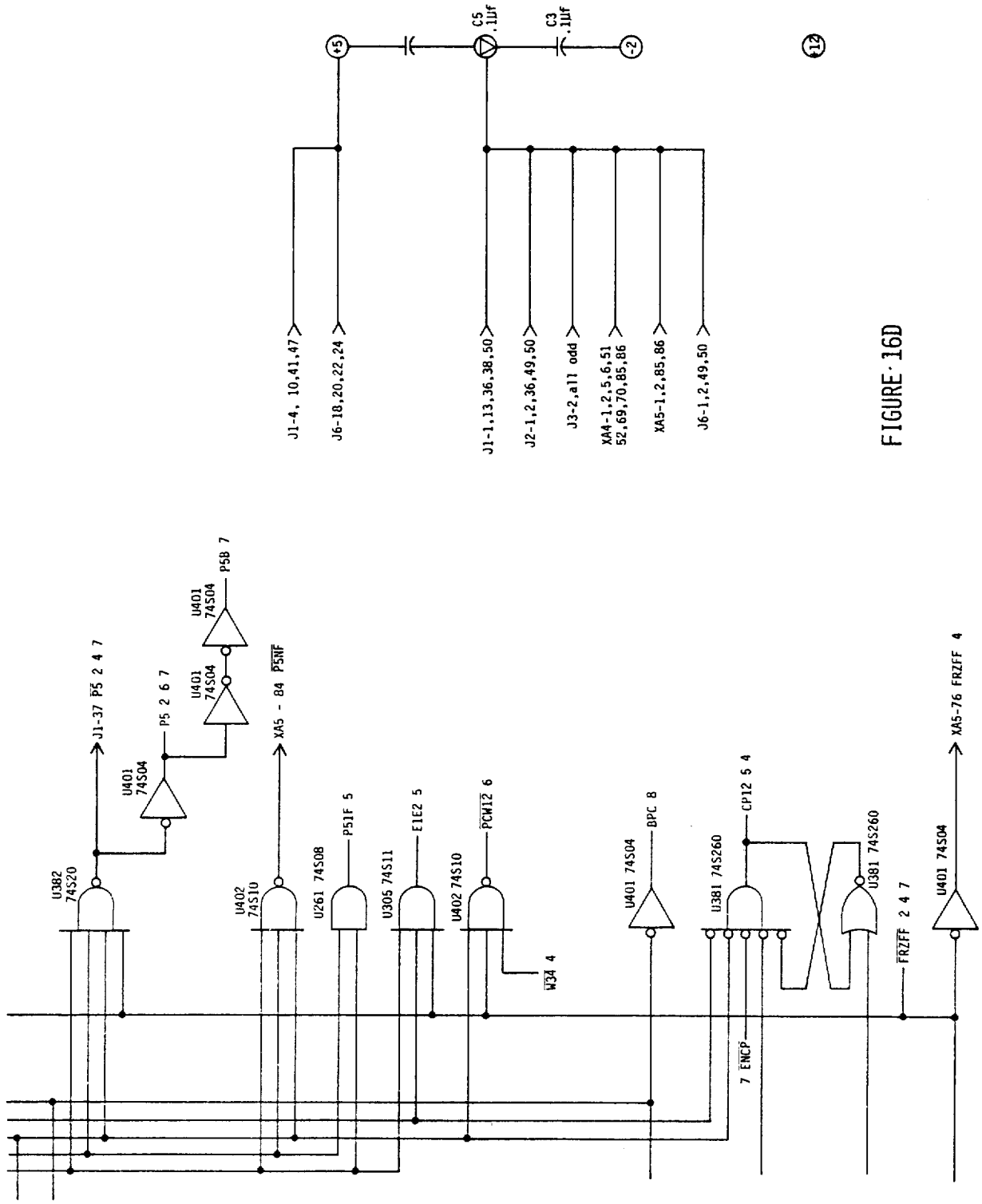

The processor may request an operation of main memory while the memory is completing another task. The memory system will inform the central processing unit that it is busy by causing a signal MBUSY on line 1651 (FIG. 16C) to go low. In the preferred embodiment there are four micro-orders that affect memory; they are READ, WRTE, RJ30 and TAB (see appendix B for instruction definitions of these micro-orders). These conditions are detected by gate 1655. After the signal PB goes high at subinterval P3, the PAUSE signal will go low and force the D inputs to the P interval flip-flops to the binary equivalent of P3. This P3 state is then cycled back into the P flip-flops repeatedly until the signal NOT MBUSY goes high to allow the microcycle to complete the normal sequence of subintervals. The resulting micro-instruction is thus extended 35 nanoseconds each time the P3 subinterval is repeated.

The signal NOT TST on a line 1622 is synchronized with the fourth flip-flop in counter 1640. The NOT MBUSY signal on line 1651 is synchronized by a separate dedicated flip-flop 1657.

CONTROL PROCESSOR OPERATION

The Run Flip-Flop

The Run Flip-Flop 1670 (RUNFF) is shown in FIG. 16B. The RUNFF commands the control processor to either process micro-instructions that fetch and execute main memory instructions or execute micro-instructions that perform operator panel scanning tasks.

The RUNFF is set in one of three ways. Pressing the RUN button (RUNB) on the operator panel will set the RUNFF if the run enable (RUNE) signal on a line 1677 is high. The RUNFF may also be set if the SRUN micro-order is executed in the SP field or if the power fail logic detects an auto restart condition (PWUST). This will be discussed in more detail later.

The RUNFF is reset when a micro-instruction with SHLT in the SP field is executed, when PONB is low, when a HLT instruction is executed (HLTIO), when the HALT button on the operator panel is pressed and the RUNE signal is high, and when a memory parity error is indicated and switch A1S1 is in the HALT position. The RUNFF is also reset when an I/O interface wishes to call the Remote Program Load (RPL) facility of the computer. This requires directing the control processor to the operator panel microroutines. The interface pulls down on the RUN line in the I/O backplane when the RUNFF is set. BRUNFF is high, bu the RUN line will be low. The conflict situation is sensed by a gate 1679 which causes the RUNFF to be reset.

The internal logic in the computer is initialized by the Preset ($\overline{PRST}$) line. $\overline{PRST}$ is primarily created by the PRESET button on the operator panel.

RPL Circuitry

The remote program load feature is a dual purpose capability in the preferred embodiment that permits (1) automatic system bootstrapping on cold power-ups and (2) automatic down line system loading from a second computer system via the I/O system of the first system.

Several previous minicomputers had hard-wired or ROM imprinted instruction routines that execute a fixed set of instructions when the attendant presses an appropriate switch on the operator panel or that automatically communicate and wait for load instructions from a terminal device when power is applied to the minicomputer. The remote program load capability of the preferred embodiment is a hardware-firmware combination that begins with firmware reading a set of hardware configuration switches to obtain, inter alia, a ROM number and I/O select code information, unpacking the selected ROM contents into 64 16-bit words, loading them into main memory, modifying all I/O instructions with the select code indicated by the configuration switches, setting the program counter to the starting address of the routine, and placing the preferred embodiment minicomputer in the running state. The ROM contains an appropriate bootstrap program that accesses the selected peripheral device to obtain the operating programs desired.

This feature thus allows the single application of power to the preferred embodiment to automatically bootstrap the system up entirely without further operator interaction. This is especially advantageous when no terminal is connected to the system, there is no operator panel installed, or the computer itself is buried in an inaccessible location in the system. The remote program load feature also allows automatic system bootstrap operations to be initiated without having to gain access to the system directly (down line loading). Any two computers that are running properly are capable of communicating with one another and pass programs or log data between them. However, if the operating system in one computer is destroyed for any reason and that system is unattended, it is impossible to reload the destroyed system and return to normal operation. Because the operating system is not functioning properly, the communication link between the two systems could be down. An attendant would be required to halt the ailing system and execute a load routine via its operator panel. The remote program load approach in the preferred embodiment is to permit a master computer system the capability to pull a hard-wire line in the slave (down) system's I/O backplane that calls immediate attention to the down computer. Like cold power-up discussed above, the remote program load firmware/hardware feature calls for the appropriate ROM loader to be loaded, all I/O instructions configure with the proper select code, and the computer placed in the running mode, thus executing the loader program. The loader, of course, brings in a valid copy of the desired operating system and the slave system is thus again running properly.

The remote program load hardware consists of the run flip-flop 1670, the buffered run flip-flop 2110 (FIG. 21) and various gates. When the run flip-flop is on, the computer is executing machine language instructions. The buffered run flip-flop signal on a line 2111 is also high so that the run line which travels up the backplane is also high. The output of gate 1680 is low so that the output of gate 1679 is high which is the normal running state. Should the backplane run line be pulled low as explained above, the output of U389 would become high, allowing a low pulse during P3 at the output of gate 1679 to clear the run flip-flop thus sending the control processor from the run mode microcode to the halt code micro-instructions. The tests that it makes are outlined in FIG. 8. A listing of this RPL microprogram is in Appendix D.

Figure 17:
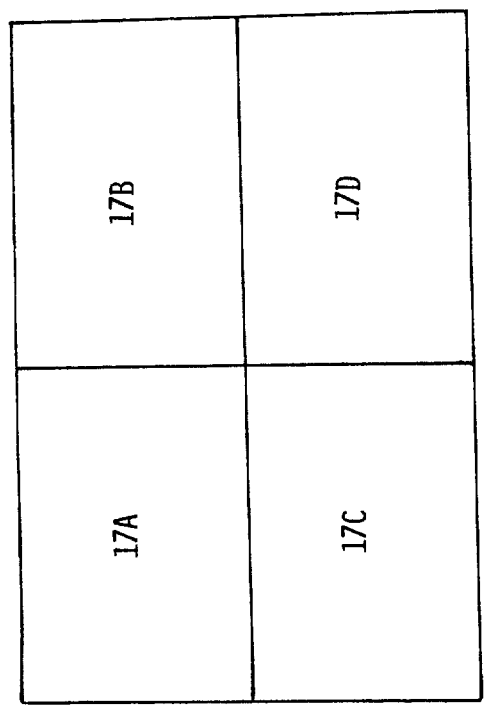
FIG. 17 shows the relationship of FIGS. 17A, 17B, 17C and 17D.
Figure 17A:
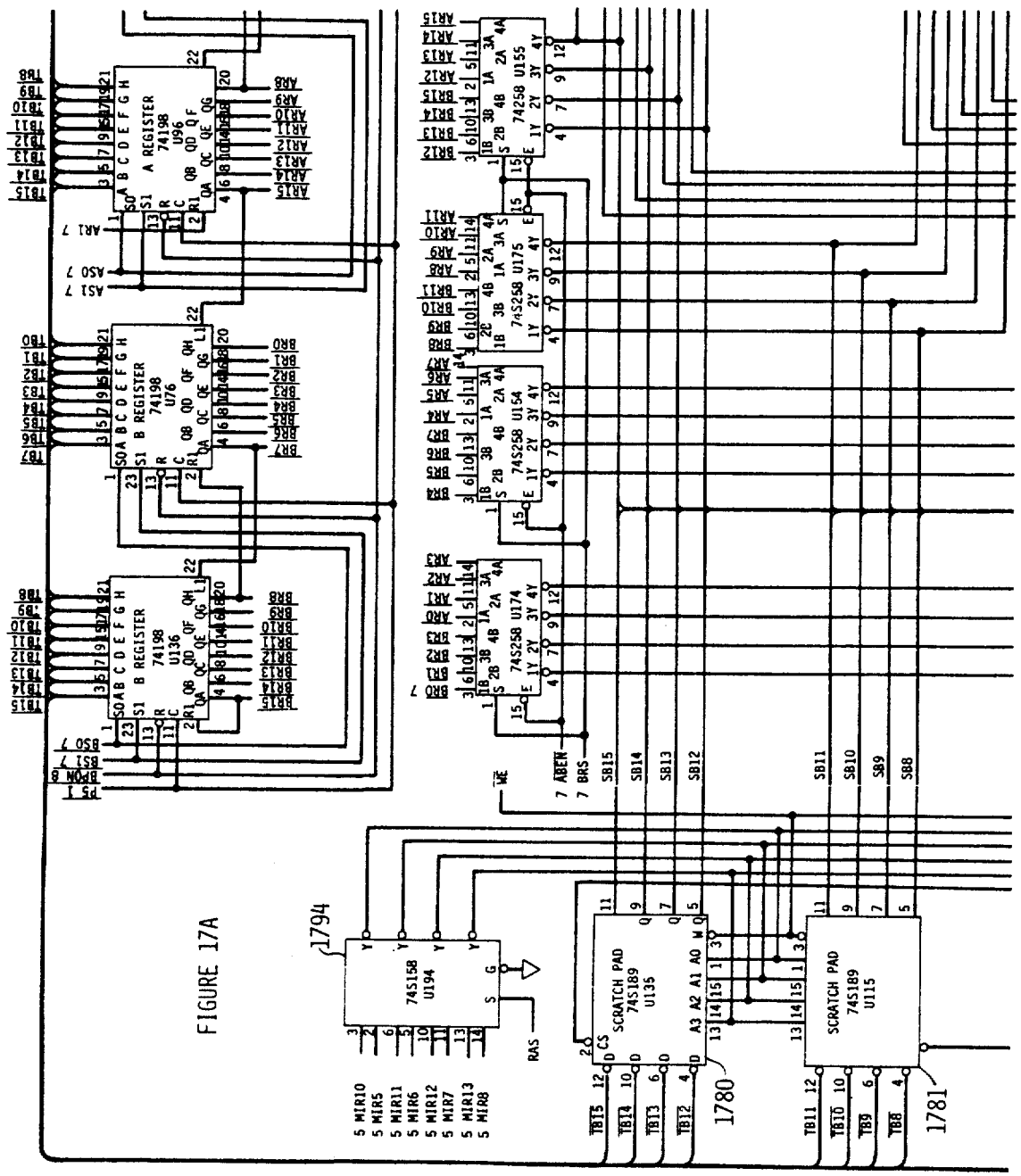
Figure 17C:
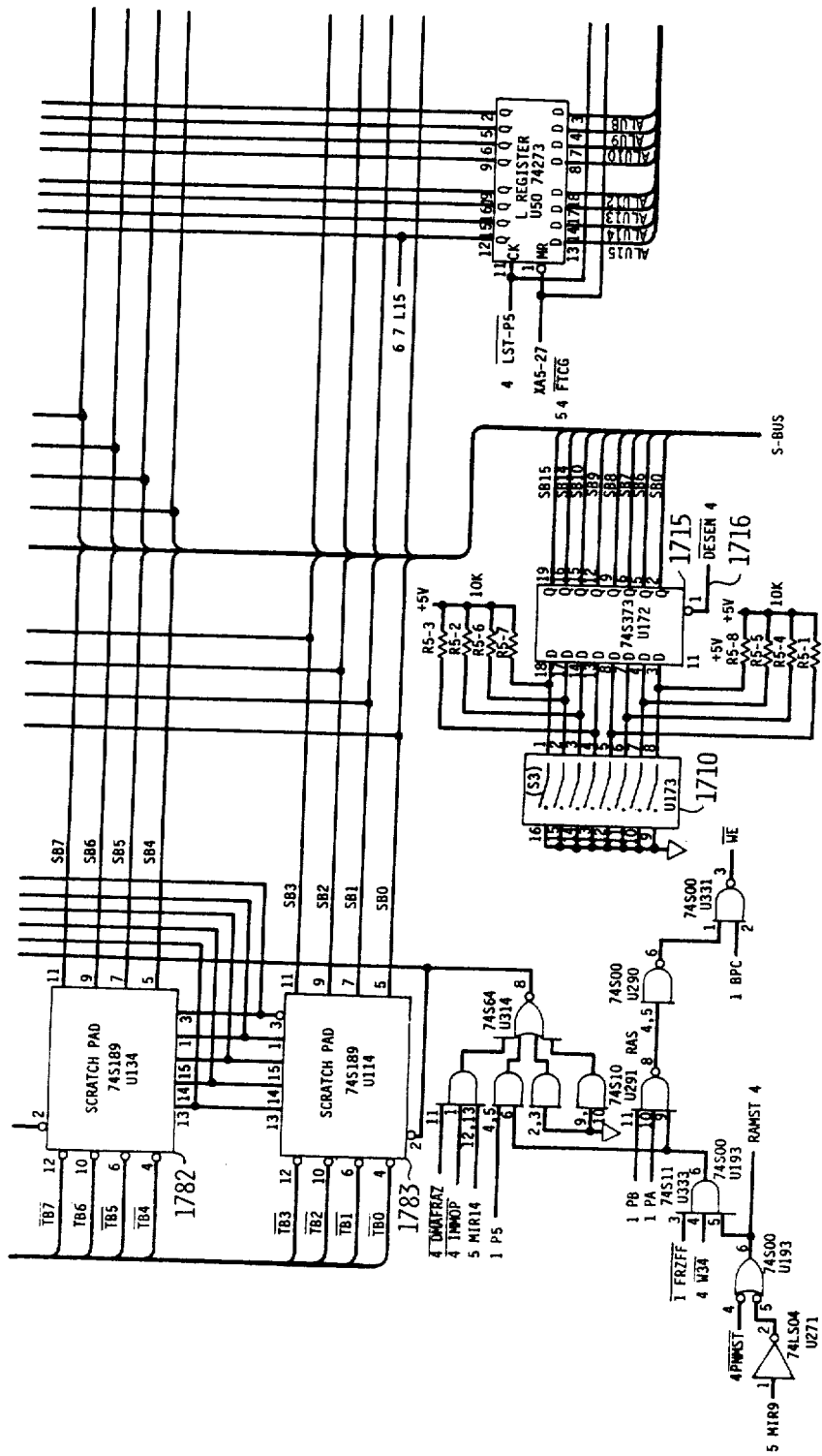
Figure 17D:
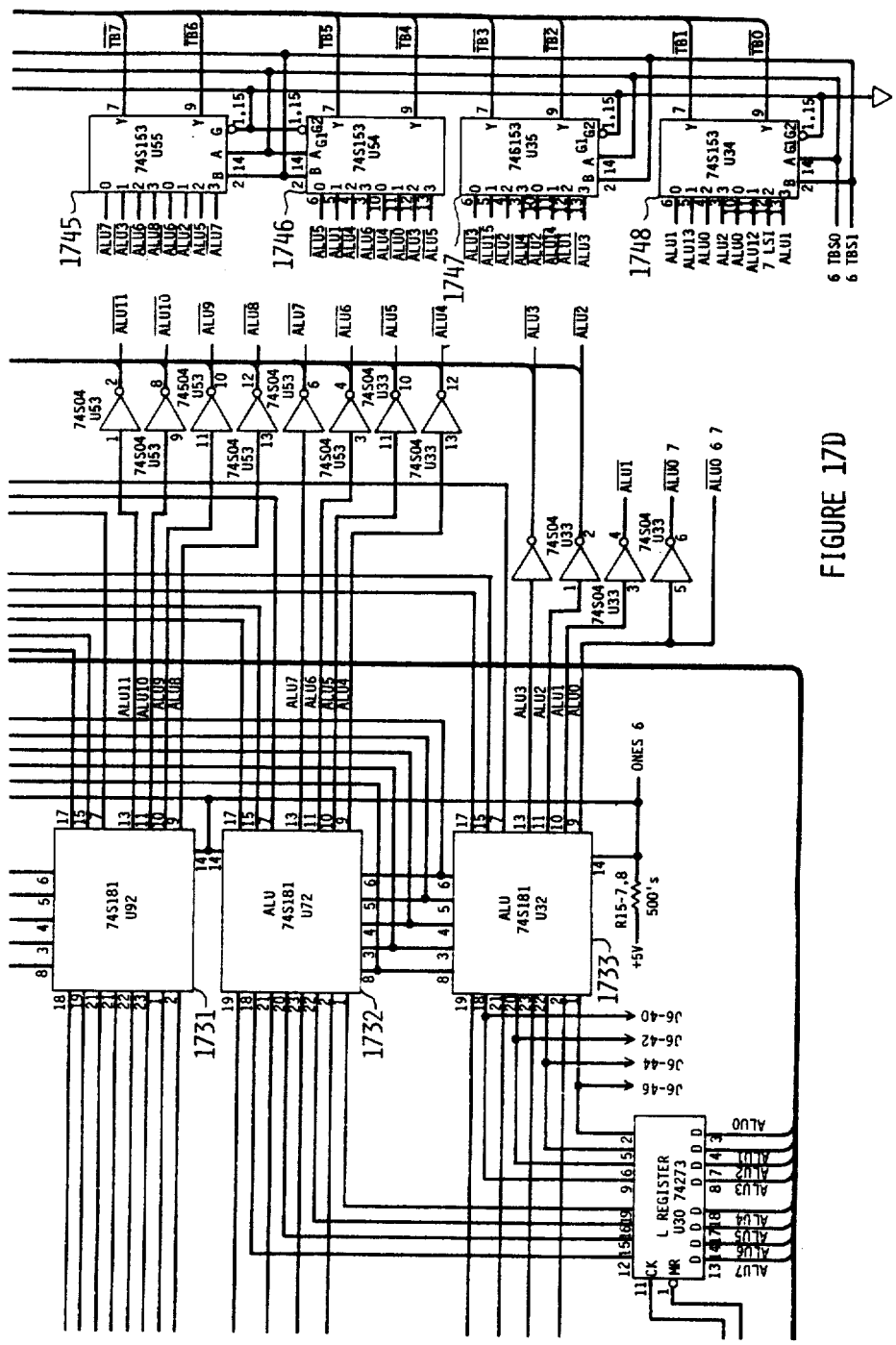

The configuration switches 1710 are shown on FIG. 17. They can be examined by reading them onto the S-bus of the preferred embodiment by passing them through gate 1715 when the signal $\overline{DESEN}$ on line 1716 is low. But $\phi$ is the first bit tested and if it is set, a check is made for the inclusion of the operator panel. The line $\overline{SFP}$ (standard front panel) is low if the operator panel is installed, high if it is not. It is tested via the control branch multiplexes 2120, 2121, 2122, 2123, 2124 (FIGS. 21A and 21C). If the operator panel is not installed, or if the minicomputer power supply switch is in the lock position (tested similarly by the line $\overline{RUNE}$, low if it is in lock, high if it is not), the remote program load firmware is entered. The firmware looks again at the data in the configuration switches 1710 to select one of ROM loaders 1805, 1810, 1815, 1820 (see FIG. 18) and load the desired loader into main memory. The select code of the I/O device is read from the configuration switches per the format shown in FIG. 10 and merged into all I/O instructions in the loader program. The program counter is set to the starting address of the loader, the computer is set into the run mode, and the loader is again executed.

Control Memory Address Register (CMAR)

The rising edge of the CMAR clock signal occurs at CP12+E1E2. CP12 is responsible for incrementing the CMAR at the beginning of the microcycle. If a branch is detected, LCMAR (Load CMAR) comes high requesting a long microcycle (from FIG. 16) and permitting E1E2 to occur. At E1E2 (end of P3) the CMAR again may be clocked. (Registers 2030, 2031, 2032, and 2033 in FIG. 20 comprise the CMAR).

If the enable input to the CMAR is high it may count; if low, it will not. Since the enable input is high only during P5 and P1, it will easily bracket the beginning of a microcycle and CP12 will increment the CMAR. The load control is low during the middle of every microcycle if a branch is to occur so the parallel load operation happends synchronous to the clock at E1E2.

Figure 20:
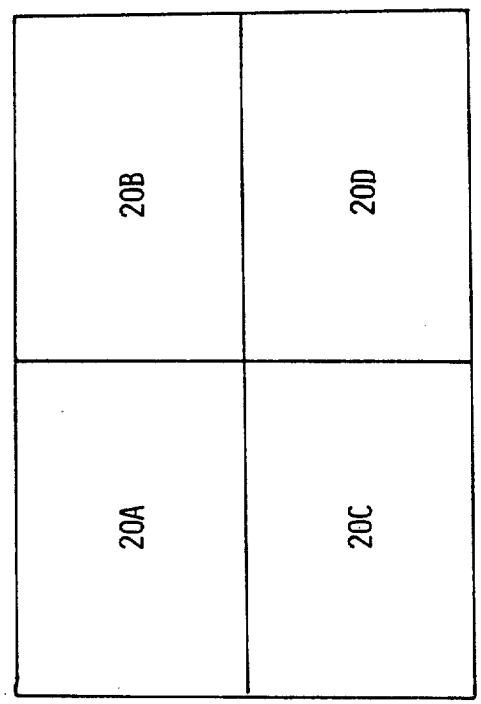
FIG. 20 shows the relationship of FIGS. 20A, 20B, 20C and 20D.
Figure 20A:
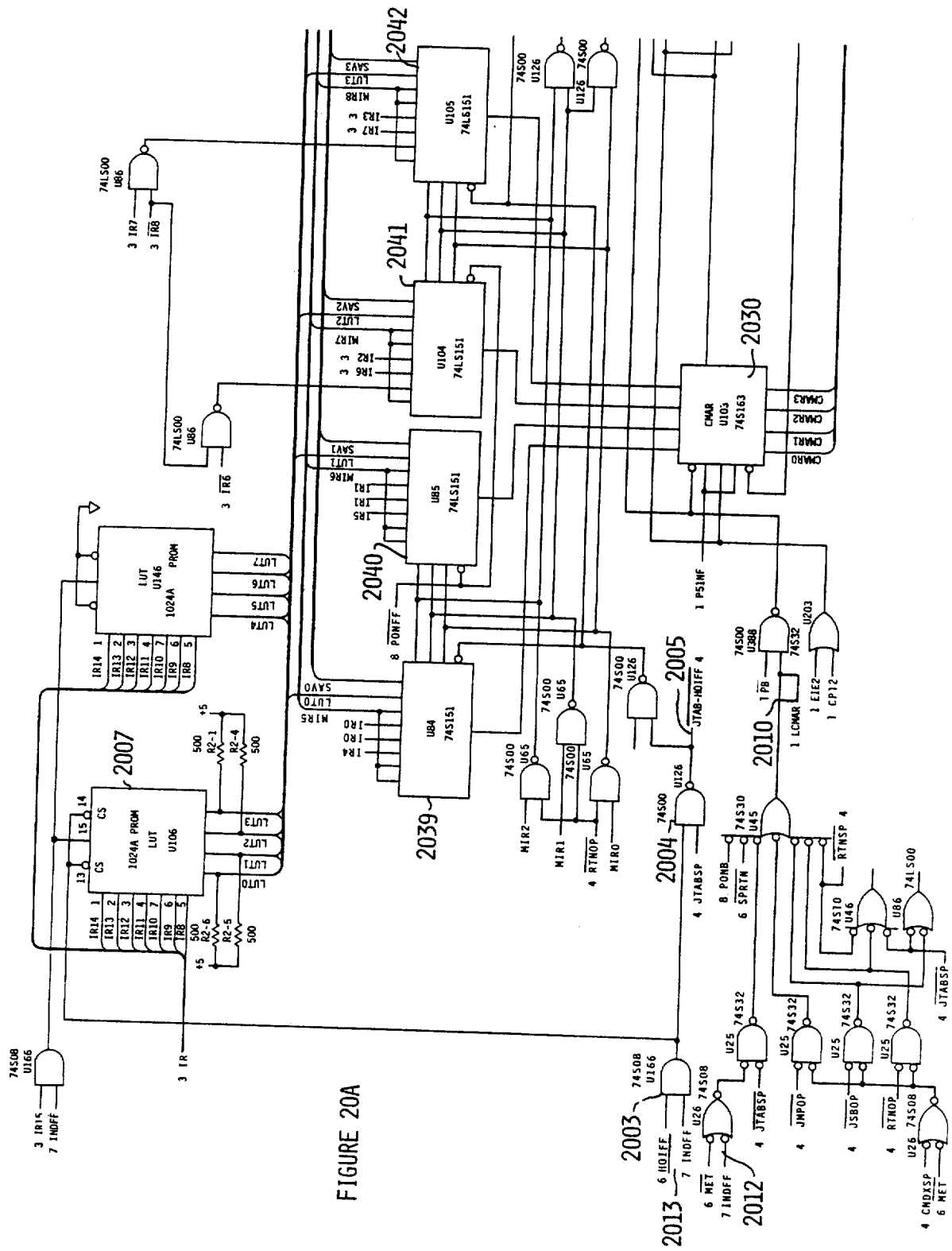
FIGS. 20A, 20B, 20C and 20D taken together comprise a detailed schematic diagram of the control memory and the control memory address register circuitry.
Figure 20B:
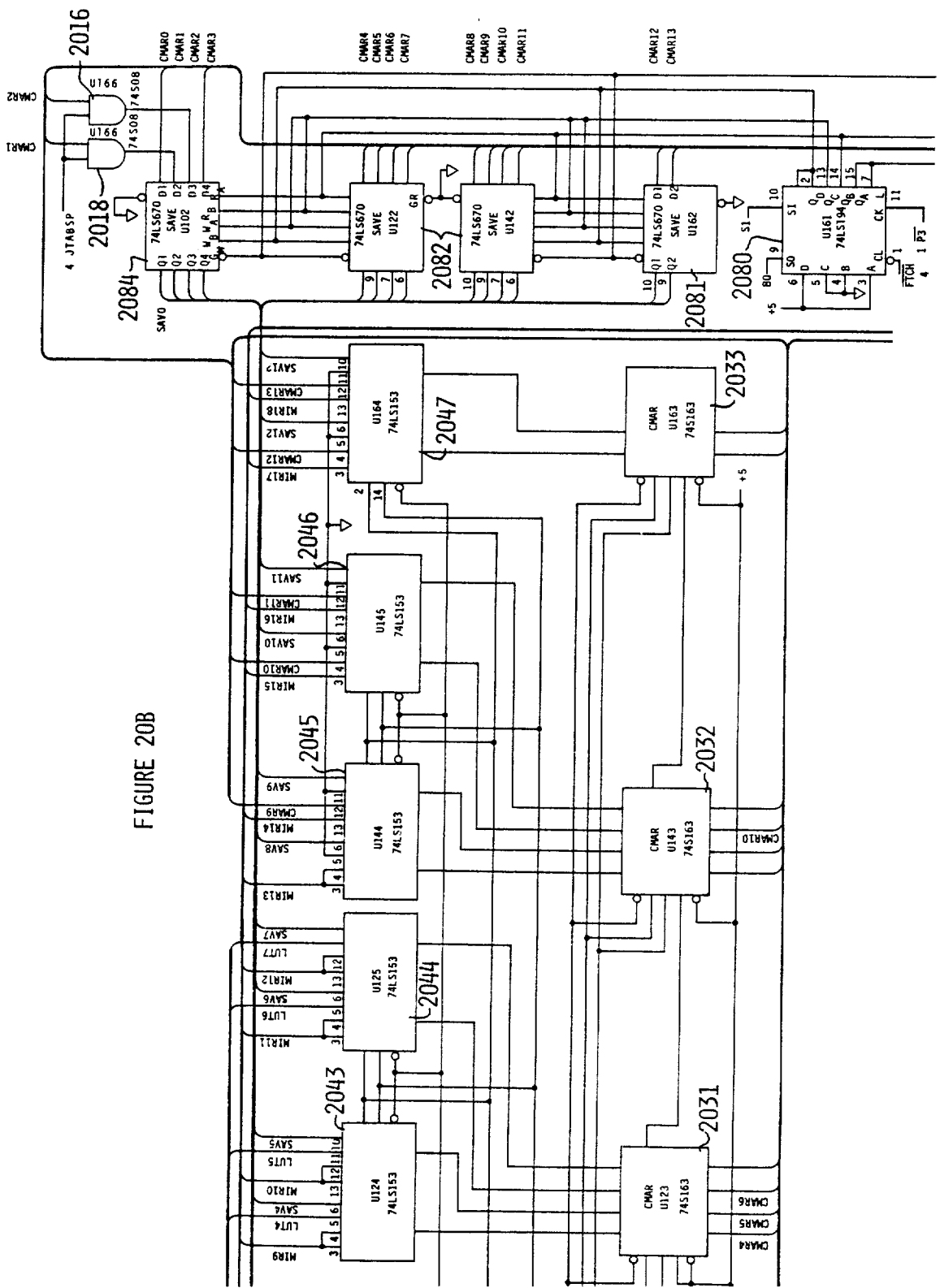
Figure 20C:
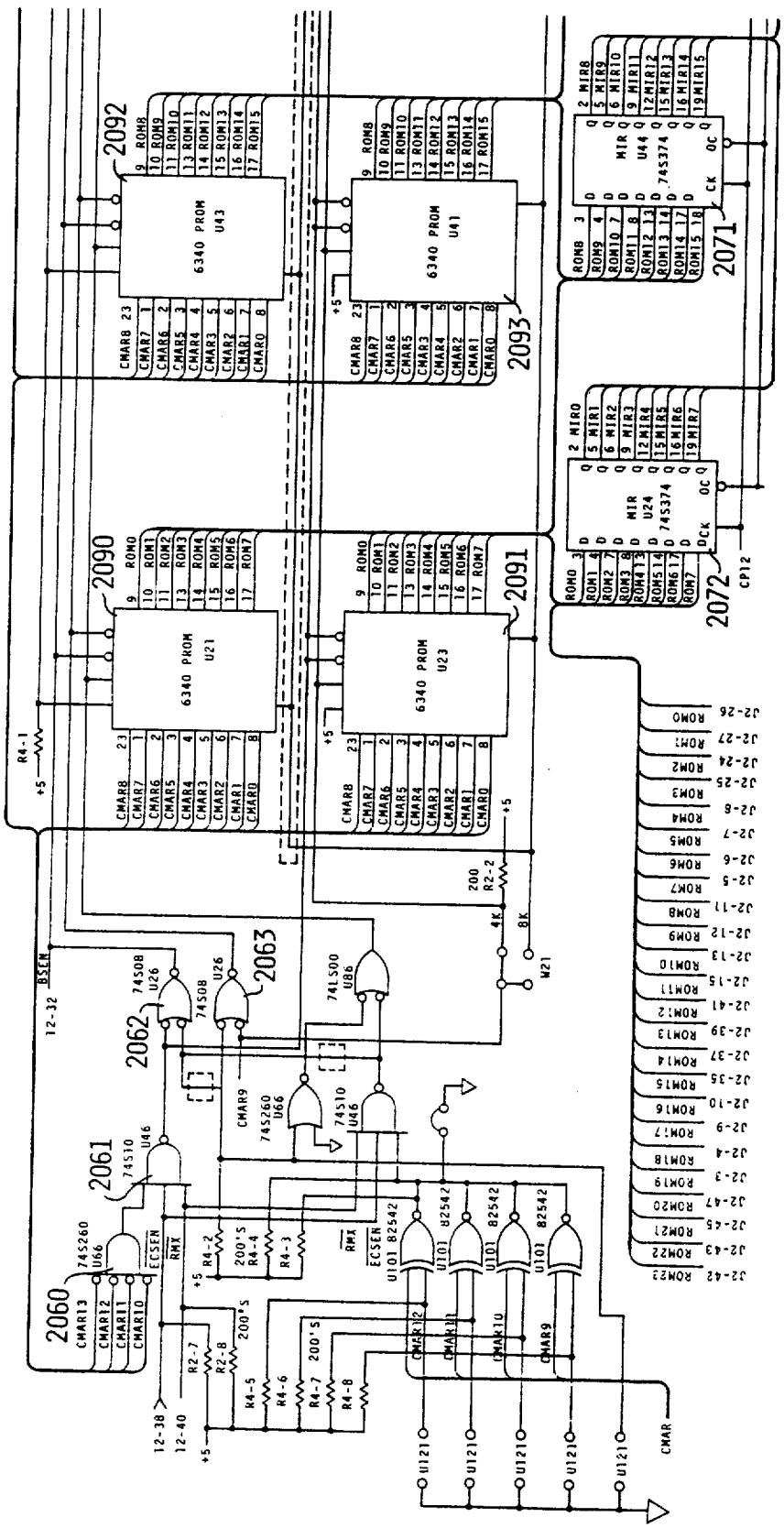
Figure 20D:
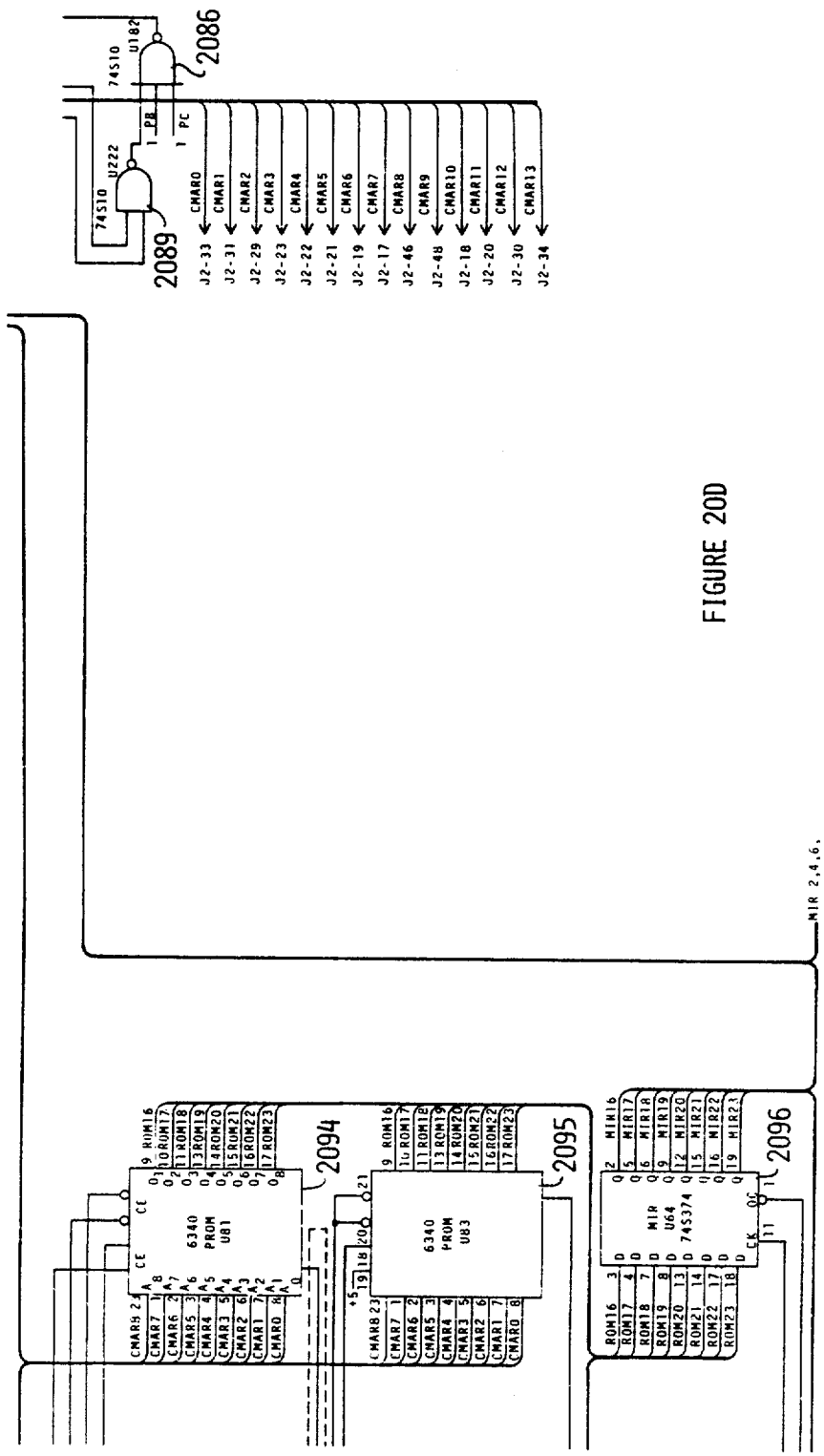

The signal LCMAR on line 2010 is the result of straight-forward combinational logic that looks at all of the ways the control processor may branch (FIG. 20). The three OP fields RTN, JSB and JMP can force a branch if no CNDX is in the SP field (word type 4), or if the condition interrogated by the COND field is met (word type 3). The $\overline{MET}$ signal on line 2012 is low if the condition specified by the COND field is met.

JTAB will force a branch if the indirect flip-flop (INDFF) is not set (i.e., no INCI has preceded the JTAB in the SP field), or if the condition specified is met. RTN in the SP field always forces a branch. A special return (SPRTN) is requested if the micro-orders ASG or SRG2 require branches. The PONB term will be explained later.

The inputs to the CMAR are the outputs of the nine multiplexers 2039-2047 that are switched by eight basic modifiers that determine how the CMAR is to be loaded. These can be listed from the first eight SP field micro-orders: RTN, JTAB, CNDX, ION, RJ30, J74, IOG and NOP. The actual logic implementation is simplified by using the least significant three bits of the SP field of the MIR as the selector inputs to the multiplexers. The multiplexer data inputs can be connected directly to the appropriate source that matches the function called by the SP modifier. A special case is RTN in the OP field which must force the selector inputs to match the code of RTN in the special field. Using this associative bit pattern technique, three other SP field micro-orders (STFL, RPT and IOFF) may be used in word type 4 micro-instructions without modifying the jump target because their least significant three SP bit patterns are the same as NOP. Table X reviews the bit patterns at the selector inputs of the multiplexers.

Table X

| SPECIAL | MIR 2, 1, 0 | MULTIPLEXERS 2039-2042 | MULTIPLEXERS 2043-2047 |
|---|---|---|---|
| RTN | 000 | 111 | 00 also RTN in OP field |
| JTAB | 001 | 110 | 01 |
| CNDX | 010 | 101 | 10 |
| ION | 011 | 100 | 11 |
| RJ30 | 100 | 011 | 11 |
| J74 | 101 | 010 | 11 |
| IOG | 110 | 001 | 11 |
| NOP,RPT STFL,IOFF | 111 | 000 | 11 |

Although there are eight different ways to branch through CM, there is substantial similarity among five of them. ION, RJ30, J74, IOG, and NOP are all unconditional jumps that modify the target address in the micro-instruction in the lower four bits. The other three modifiers are unique and call their own selected pattern. RTN requests an address from the SAVE stack, JTAB requests an address from a PROM jump table based upon the IR, and CNDX calls for a nine-bit (512-word) address displacement around the current CMAR address.

Halt or Interrupt Detection

When either a halt state or a pending I/O interrupt condition prevails in the computer, an interruption of the normal fetch-to-execute flow is made. The CMAR is then loaded with the constant 6 when JTAB is executed without a preceding 1NC1 at CM location 1. The special conditions are detected by a gate 2003 and a gate 2004 on FIG. 20. Gate 2003 disables the lower jump table 2007 thus forcing its output to all ones. The signal HOIFF on a line 2013 disables all of the multiplexers, except multiplexers 2040 and 2041 to zeros. Since the multiplexers are switched to the jump tables, multiplexers 2040 and 2041 pass their ones to their outputs, consequently loading the constant 6 into the CMAR. The terms PONFF and $\overline{\text{PONFF}}$ will be discussed later.

The Save Stack

The save stack holds microprogramming subroutine return addresses. Three levels of microsubroutine calls are permitted by the control processor, but the stack is actually implemented by a four-word dual-port RAM. Control logic makes the RAM appear as a stack. The fourth register normally holds an all-zeros address that is used when more microsubroutine returns are executed than branches.

Figure 25:
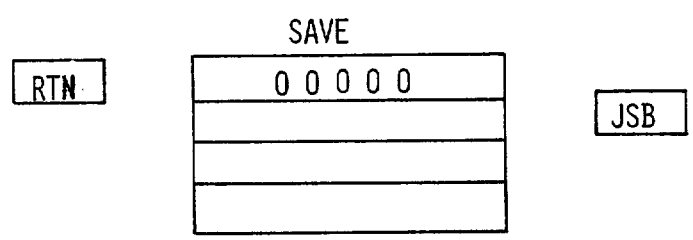
FIGS. 25 and 26 illustrate the operation of the Jump Subroutine (JSB) Save Stack of the preferred embodiment.

Three levels of microsubroutine calls are available for executing an instruction after the fetch micro-instructions. Initially a read (or "RTN" pointer) addresses an all zeros word and a write (or "JSB" pointer) addresses the first available save word. (See FIG. 25)

Figure 26:
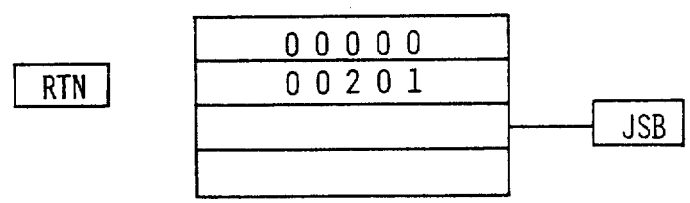

Any executed return will load the contents of the CMAR at the address pointed to by the RTN pointer. In this case, a return to CM location 0 will occur. An executed JSB will write the return address into the location pointed to by the JSB pointer and then advance the pointers. If a JSB occurs from location 200, the pointers will be advanced to the state shown in FIG. 26.

An executed RTN will place the contents of the save at the address pointed to by the RTN pointer (201 in this case) into the CMAR and the pointers will move back to the previous state after the fetch. Deeper levels of subroutines operate in a similar manner with the pointers moving back and forth always one away from each other. When one more RTN is executed than a JSB, a branch to zero is made. FIG. 20 contains the circuitry for the save register.

The RAM includes a write enable, a read enable, two write address and two read address lines. Simultaneous reading and writing of two different locations is permitted, and this is the key to the selection of the control logic used.

Register 2080 is a left-right four-bit shift register set up in a circular rotate configuration which actually holds the read address and write address pointers. The two mode controls manipulate the pointers in response to subroutine branches and returns. S0 is high when a RTN is executed, S1 is high when a JSB is executed, and JTAB forces both high. Synchronous to P3, a RTN causes a right shift, JSB causes a left shift, and JTAB forces a load.

Three of the four outputs of the shift register become the read and write address pointers to the save stack which comprises registers 2081, 2082, 2083 and 2084. The read enable is always low since reading of the return address always happens, and, assuming that the output signal from gate 2086 is high, a write occurs every P12. Therefore, the saved word pointed to by the WRTE pointer is actually written every microcycle with the contents of the CMAR. The CMAR points to one word beyond the address of the currently executing micro-instruction. When a JSB is executed, both pointers are advanced beyond their present positions. The last write is left behind and is the valid future return address.

FTCH and JTAB are specific hardware-oriented micro-orders that are never used by user-microprogrammers. They are infrequently used in the base set. In regard to the save stack, the most important usage is at CM locations 0 and 1. First the FTCH is executed clearing the 74LS191 shift register and setting both pointers to 00. Next, the micro-instruction at CM location 1 is executed. During P1 and P2, a save stack write occurs storing the present value of the CMAR into the location pointed to by the JSB pointer (00). Recall that the CMAR is equal to 2 at this time. Since the micro-instruction located at CM location 2 includes a JTAB, the CMAR 1 and 2 inputs to the save stack are masked by gate 2003, thus loading all zeros. After P3, JTAB causes a load of constant 1001 into the register 2080, completing the initialization of the control logic.

The shift register simulates the effect of two pointers displaced by one position from each other. See Table XI below:

Table XI

|  | 74LS194 ABCD | RTN AB | JSB AB |
|---|---|---|---|
| After FTCH | 0000 | 00 | 00 |
| After JTAB | 1001 | 00 | 01 |
| After 1st Subrtn | 0011 | 01 | 11 |
| After 2nd Subrtn | 0110 | 11 | 10 |
| After 3rd Subrtn | 1100 | 10 | 00 |

Note that the write address (JSB) is the read address (RTN) for the next subroutine level. RAM 00 holds all zeros, RAM 01 holds the first subroutine return address, RAM 11 the second, and RAM 10 the third. See Table XII below:

Table XII

| SAVE | | |
|---|---|---|
| 00 | 00000 | all zeroes |
| 01 | | 1st |
| 11 | | 2nd |
| 10 | | 3rd |

JTAB also occurs at locations 3 and 306 in the base set. The JTAB at 3 in the MRGIND routine again forces zeros into the save stack. While JTAB is being executed, the CMAR is equal to 4 (advanced by one) but gate 2003 masks this bit before loading into the stack. The JTAB at 306 in the operator panel routines is not required to load zeros onto the stack, but rather to initialize Save control logic.

The purpose of gate 2089 is to detect the third JSB state and disable the write pulse which would modify RAM 00 which is the all zeros word and must remain valid.

Control Memory

The CMAR drives the base set control memory PROMs 2090, 2091, 2092, 2093, 2094, 2095. Gates 2060-2063 and the related circuitry decode the module addresses.

Micro-Instruction Register (MIR)

The 24-bit micro-instruction from the control memory PROMs appears on the ROM bus and is clocked into the MIR Registers 2072, 2071, and 2096 at the beginning of the microcycle by clock signal CP12. The outputs of the MIR travel throughout the CPU. Simultaneous with loading of the MIR, the CMAR is incremented to point to the next micro-instruction.

Decoders

The computer described herein employs a vertical format for its micro-instruction. Vertical format micro-instructions are often characterized by micro-orders encoded into several fields of operation. Each field is usually decoded to a unique function it is responsible for. The advantages to using a vertical format include cost (a relatively narrow micro-instruction width is required) and ease of microprogramming. In a horizontal format a micro-instruction is substantially wider (more than one hundred bits is not uncommon) and little or no decoding is required because bits in the micro-instruction may themselves be responsible for a single function. The advantage is speed (no decoding circuits may be required decreasing microcycle time). Therefore, the preferred embodiment uses a 24-bit vertical format micro-instruction.

Figure 19:
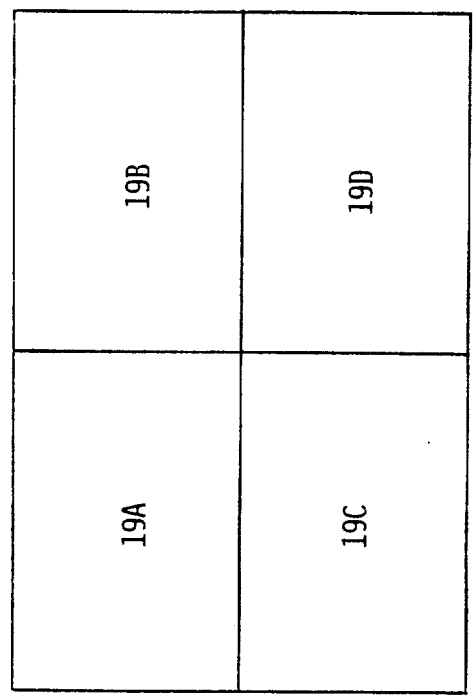
FIG. 19 shows the relationship of FIGS. 19A, 19B, 19C and 19D.
Figure 19A:
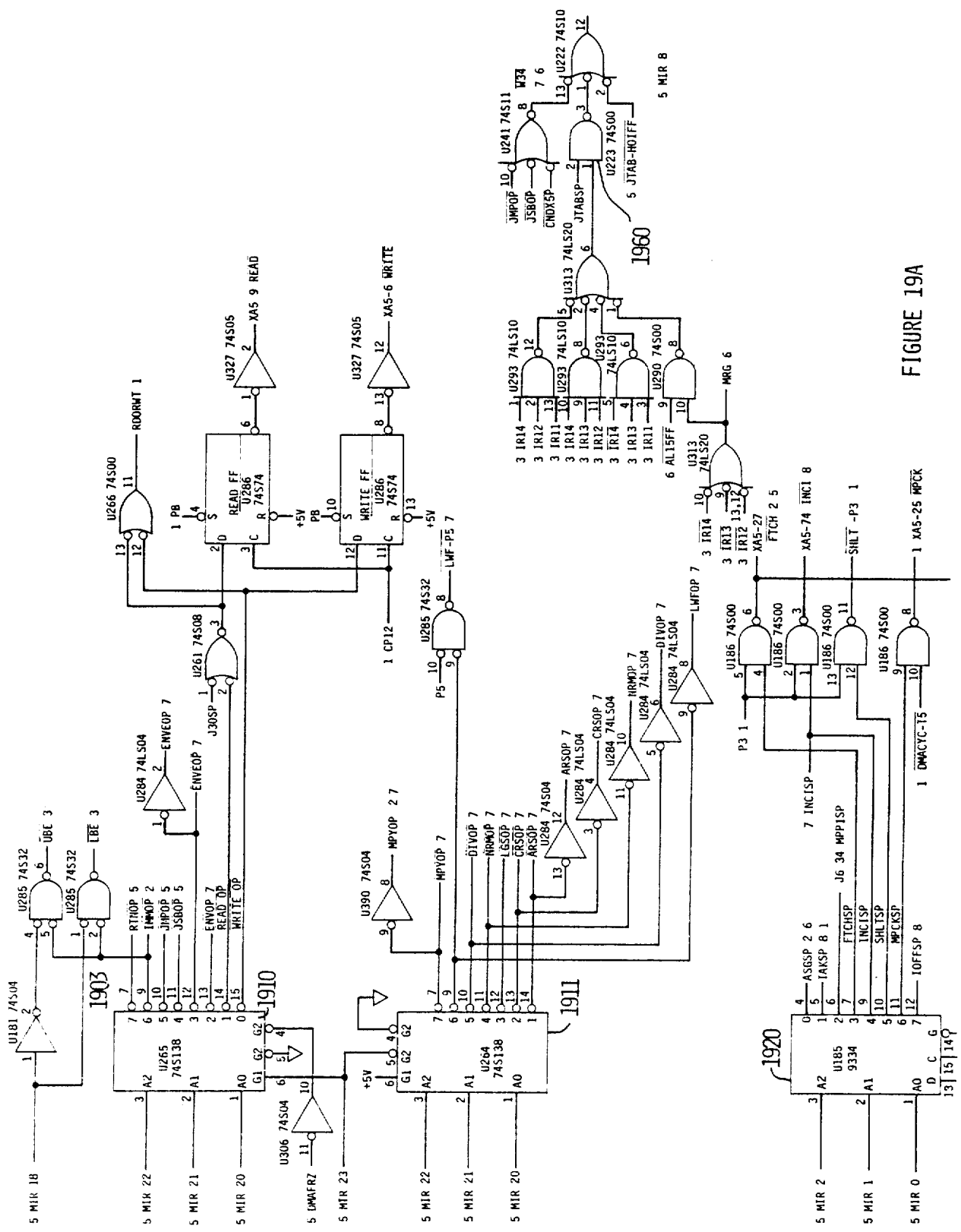
FIGS. 19A, 19B, 19C and 19D taken together comprise a detailed schematic diagram of the micro-instruction register and the related decoding circuitry.
Figure 19B:
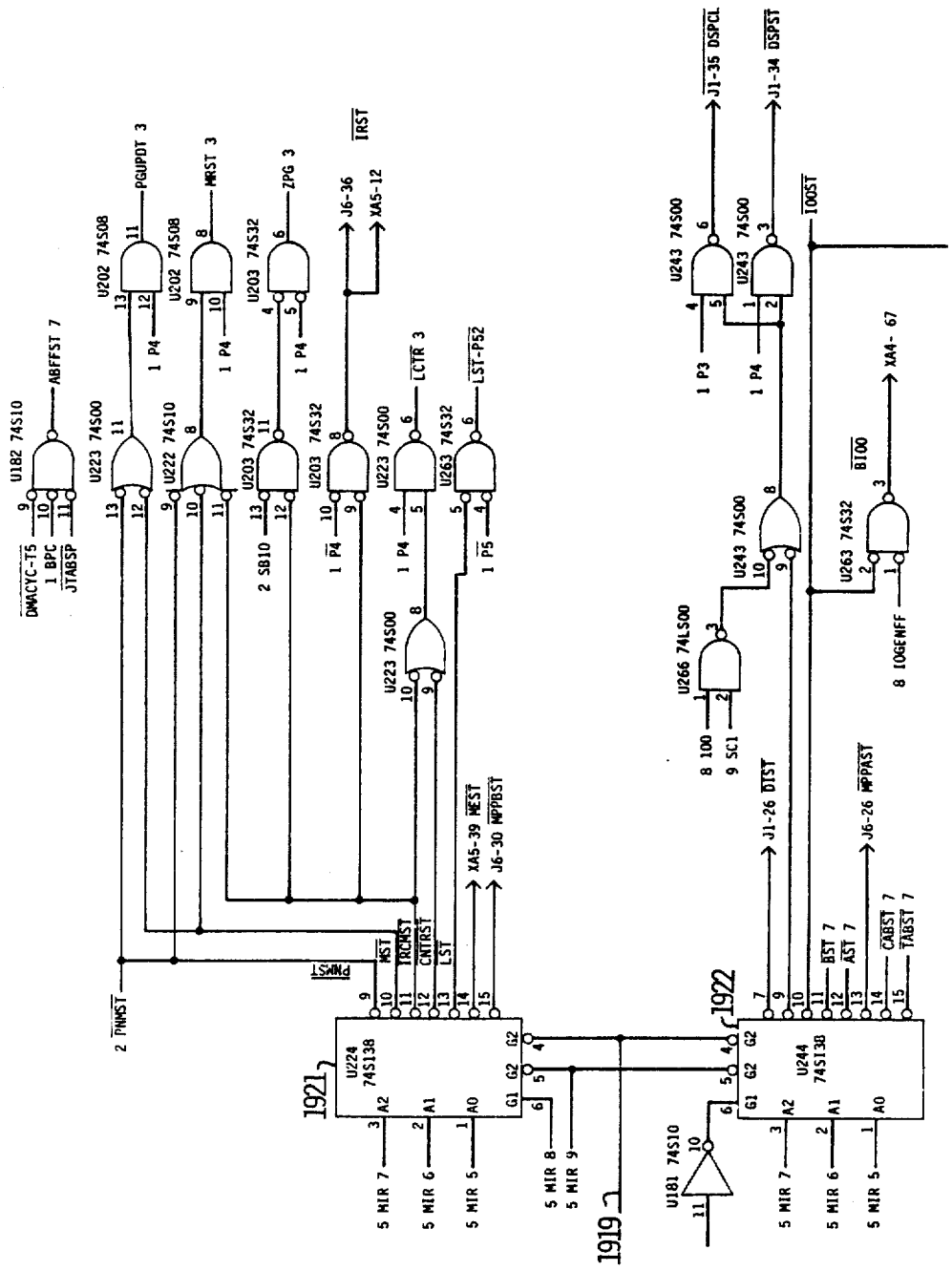

FIG. 19 is a detailed schematic diagram of the decoding circuits for the micro-instruction fields. The fields not entirely decoded are the SB and ST fields that reference the sixteen registers in the RAM, the ALU field, and the COND field. Understanding the operation of a decoded micro-order requires a parallel review of the definition of each micro-order.

Operation Field

Decoders 1910 and 1911 are high-speed three-to-eight decoders that decode the OP field micro-orders. $\overline{\text{IMMOP}}$ is combined with MIR bit 18 to determine whether the lower byte ($\overline{\text{LBE}}$) or upper byte ($\overline{\text{UBE}}$) is to be enabled onto the S-bus. The $\overline{\text{READOP}}$ and $\overline{\text{WRTEOP}}$ micro-orders logically set their respective flip-flops at the end of the microcycle. The falling edge of the $\overline{\text{READ}}$ or $\overline{\text{WRTE}}$ pulse actually initiates the memory cycle. The signal $\overline{\text{DMAFRZ}}$ on a line 1901 is low when an extended memory such as the Dynamic Mapping System referenced above requires the S-bus during a data transfer. Its purpose is to disable the decoding of the OP field primarily to inhibit the $\overline{\text{IMMOP}}$ signal on line 1903 to prevent data from being enabled onto the S-bus.

Special Field

All thirty-two special field micro-orders are decoded by decoders 1920, 1923, 1924, 1925. P5 (at the end at the microcycle) is the basic timing pulse used to actually trigger these operations.

Store Field

The sixteen SB and ST field micro-orders that are not associated with the sixteen registers contained in the RAM are decoded. The RAM addressing logic is discussed later. All registers of the CPU are loaded at the end of P5 (end of the microcycle) except the Instruction Register (IR) and the Memory Address Register M which are loaded from the S-bus at P4 (due to signal skewing and delays, it may be marginally unsafe to clock data off the S-bus at the end of P5).

The ST field is decoded by decoders 1921 and 1922. The decoding is disabled by the rather complex combinational logic which provides the signal on line 1919. The first term JMPOP+JSBOP+CNDXSP is a detection of word type 3 or 4 micro-instructions. Such a micro-instruction does not operate on data, and hence does not require usage of the S-bus. However, MIR bits 10 through 14 will enable a register onto the S-bus and MIR bits 5 through 9 will decode a register to be stored if not disabled. The second set of qualifier conditions is input through gate 1960 and is essentially a logical definition of the micro-order JTAB (JTAB is to suppress the operation of the ST field if an indirect MRG instruction is in the IR or if a JMP, JSB, ISZ, STA or STB instruction is in Instruction Registers 1802, 1803, 1804 and 1805.

A third qualifier inhibits the ST field if a halt or interrupt condition is pending as JTAB is decoded. JTAB will force the CMAR to CM location 6 as explained previously.

Figure 22:
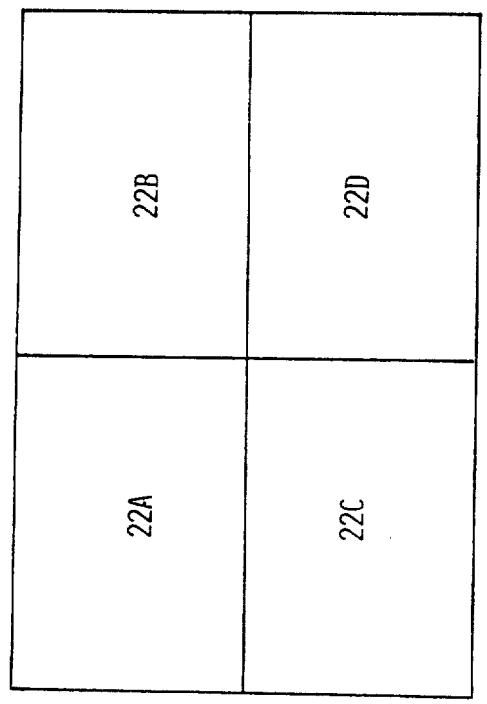
FIG. 22 shows the relationship of FIGS. 22A, 22B, 22C and 22D.
Figure 22A:
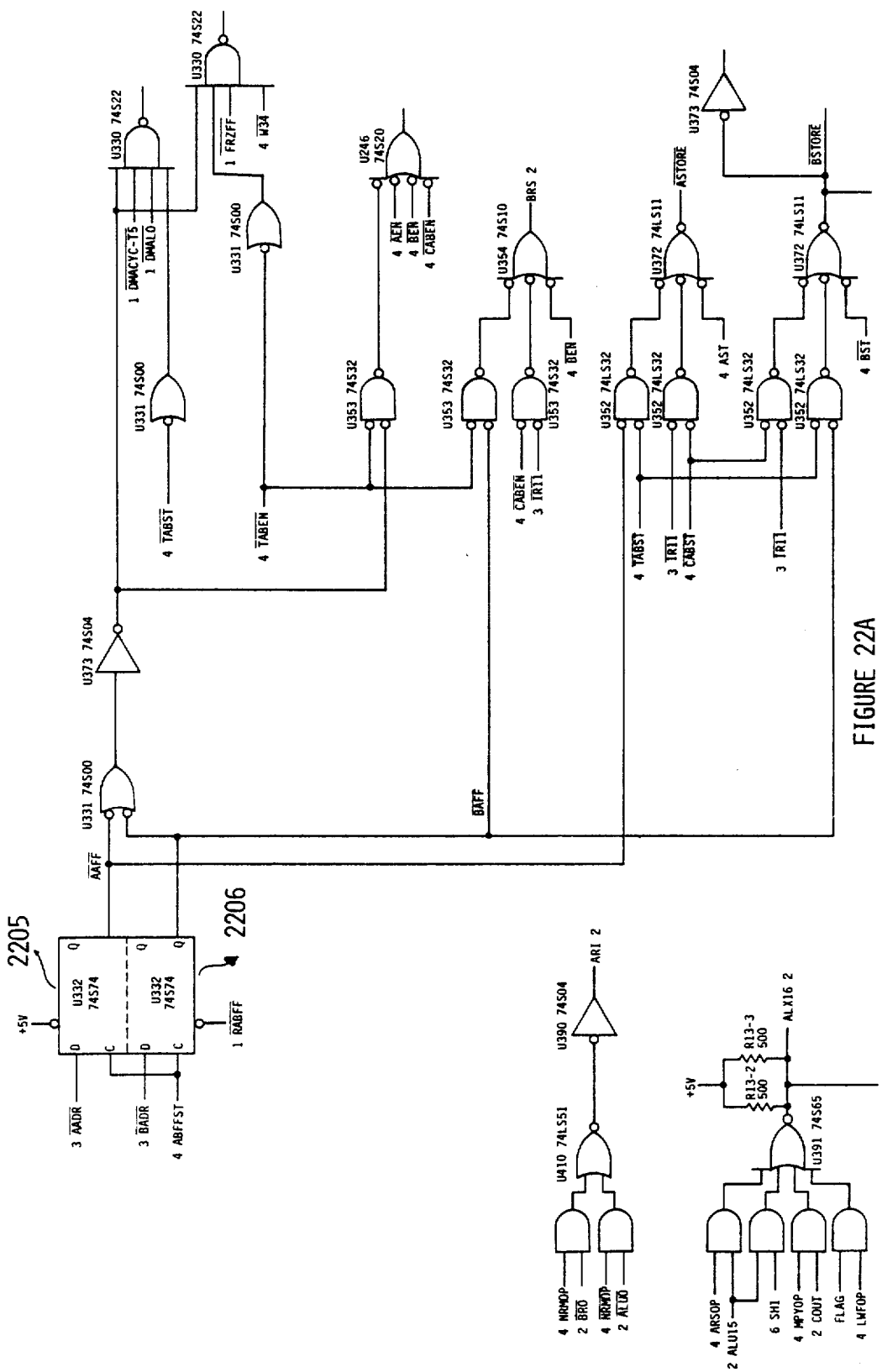
FIGS. 22A, 22B, 22C and 22D taken together comprise a detailed schematic diagram of the extend and overflow register circuitry, the A and B addressable flip-flop and circuitry for the generation of various control signals within the preferred embodiment.
Figure 22B:
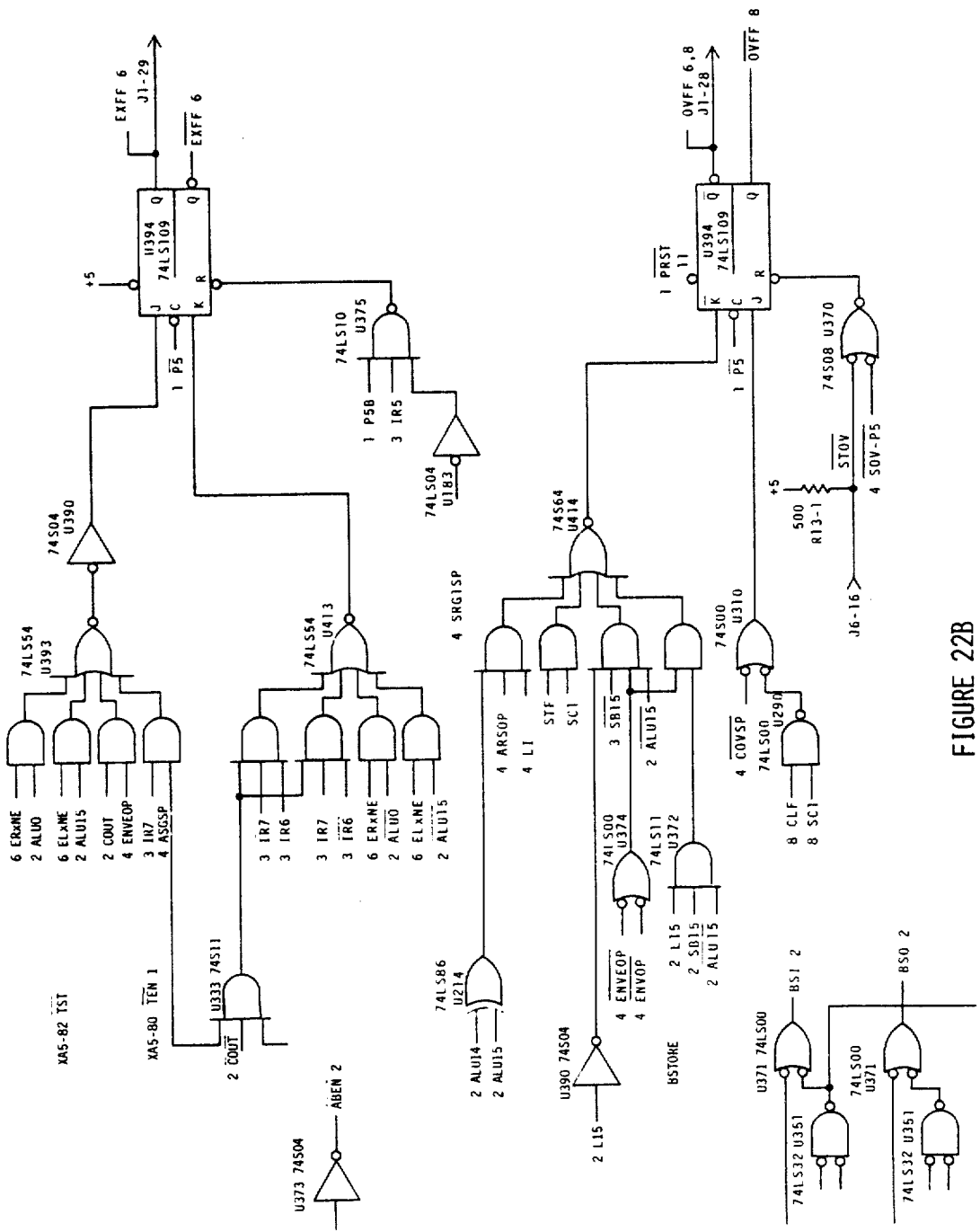
Figure 22D:
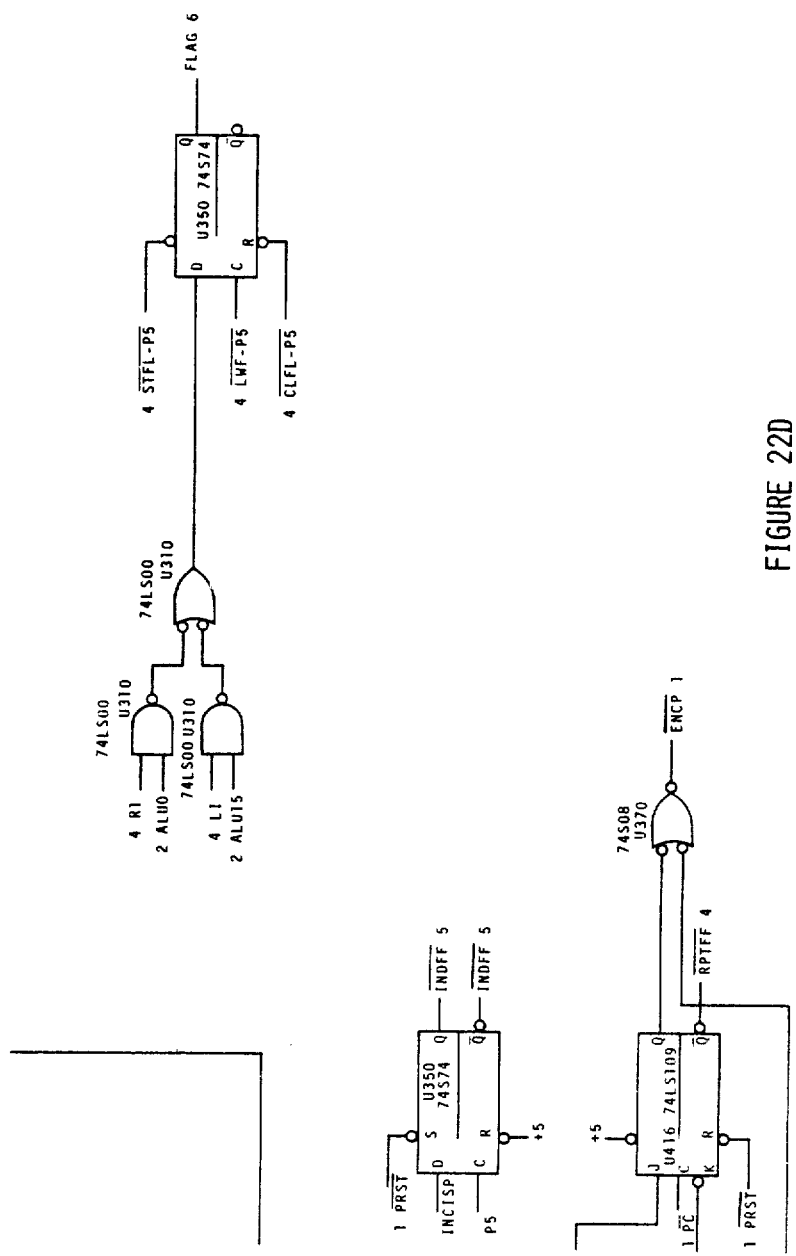

The A and B addressable flip-flops 2205 and 2206, (ABFF), shown in FIG. 22A, can be clocked at the end of every microcycle. Addresses 0 and 1 are detected on the M-bus and the flip-flops are set accordingly.

S-bus Field

Figure 19C:
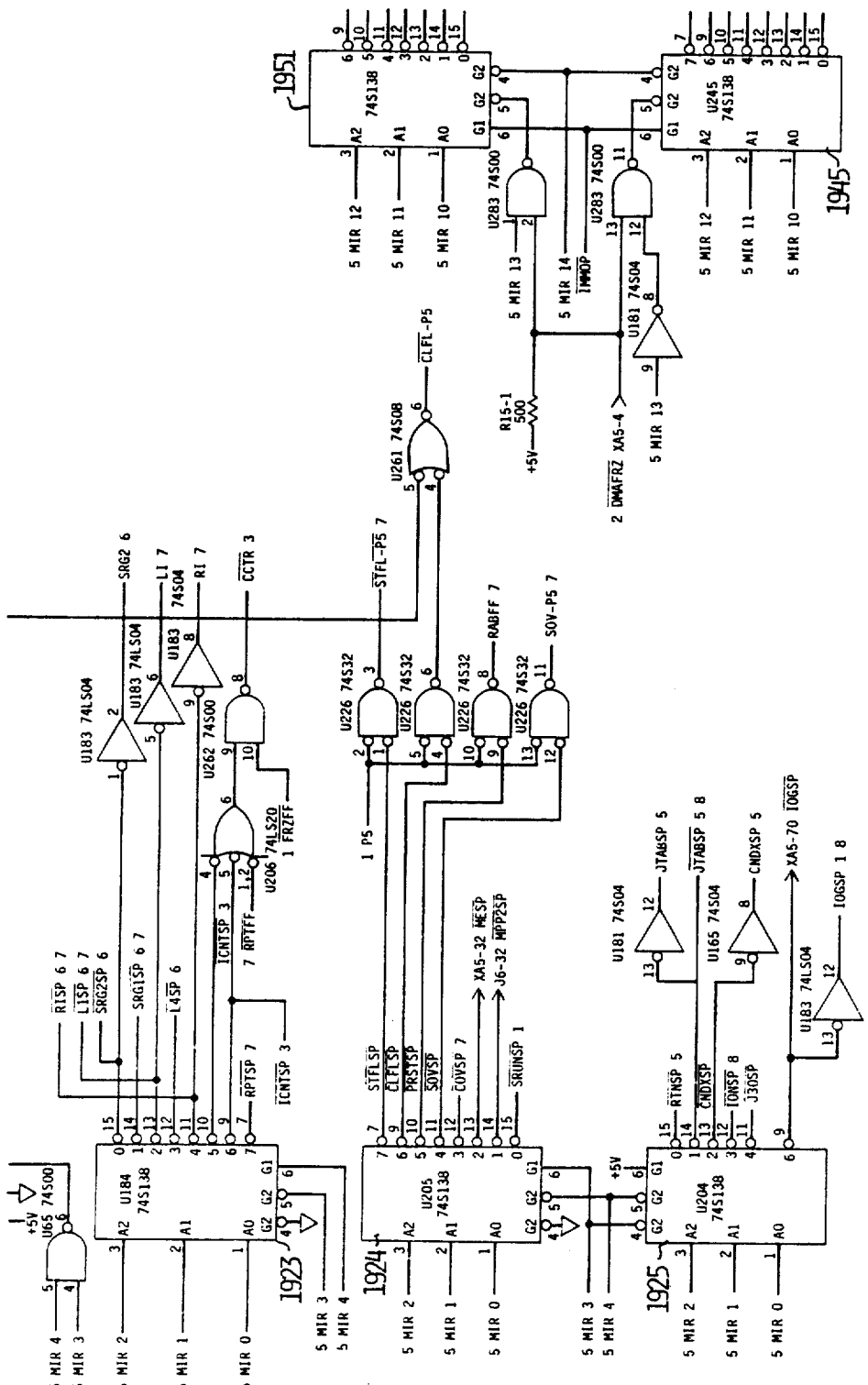
Figure 19D:
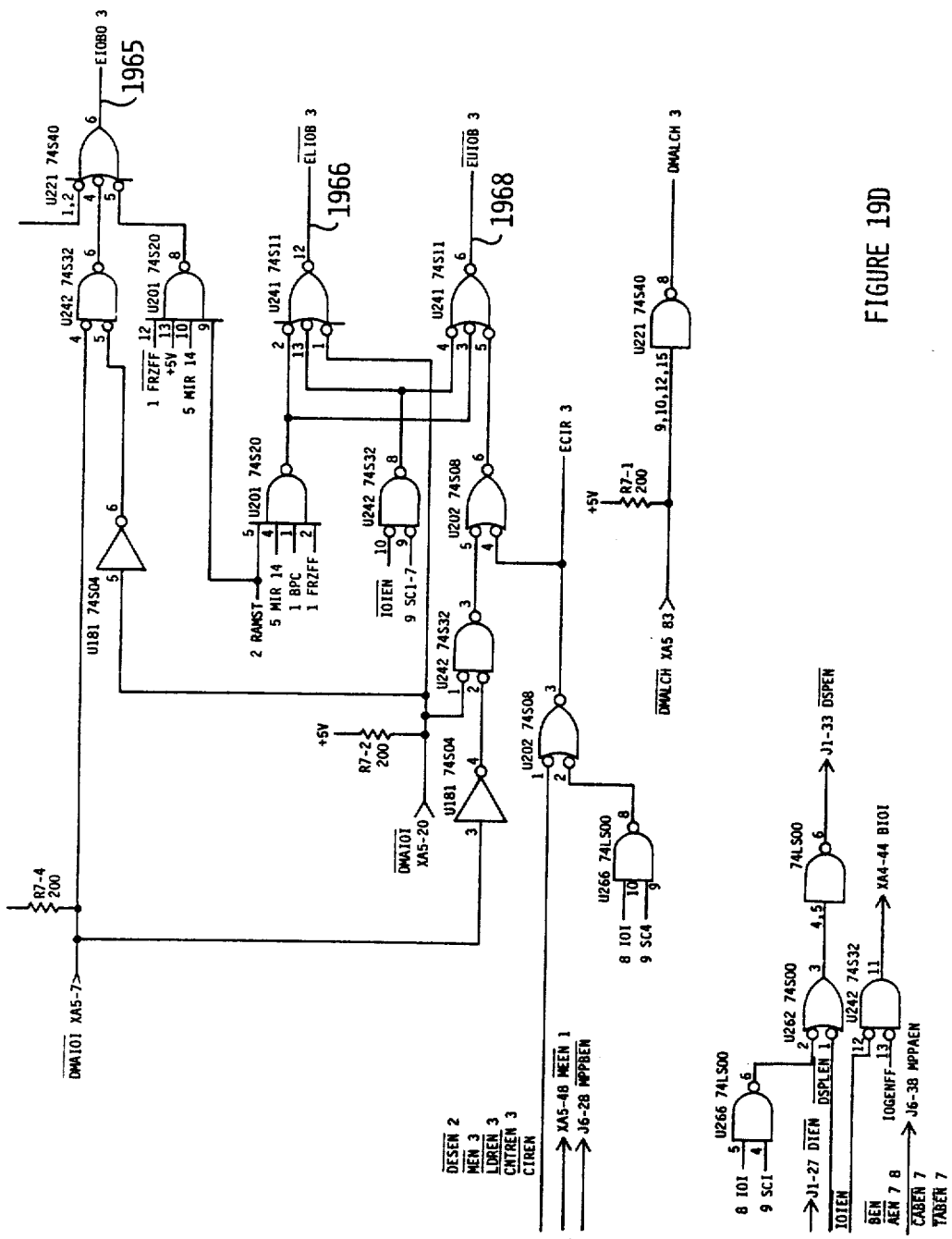

The SB field is decoded by decoders 1945 and 1951 (FIG. 19C). Decoding is suppressed if $\overline{\text{DMAFRZ}}$ is low or if $\overline{\text{IMMOP}}$ has been decoded in the OP field. $\overline{\text{IMMOP}}$ implies a word type 2 wherein an eight bit byte is to be enabled onto the S-bus rather than a register.

IOI is typically used to execute I/O input instructions. The literal definition of IOI is to gate the I/O bus onto the S-bus. This is performed by signal EIOBO on line 1965. There are, however, certain cases in this context when the I/O bus must not be enabled onto the S-bus. All I/O interfaces reside on the I/O bus, but accessories with select codes less than ten reside on the S-bus. To enable the I/O bus onto the S-bus when an I/O input instruction is requesting data from, e.g., a memory channel, would be disastrous. Therefore, the gating of the I/O bus is inhibited if select codes one through seven (SC1-7) are detected. Select code 0 does enable the I/O bus but this is just to maintain compatibility with earlier computers when executing LIA 0 to LIB 0 instructions. Therefore, $\overline{\text{IOIEN}}$ is qualified with SC1-7 by gate 1960 and enables both the lower byte of the I/O bus by signal $\overline{\text{ELIOB}}$ on line 1966 and the upper byte of the I/O-bus by signal $\overline{\text{EUIOB}}$ on line 1968.

Conditional Field

Figure 21:
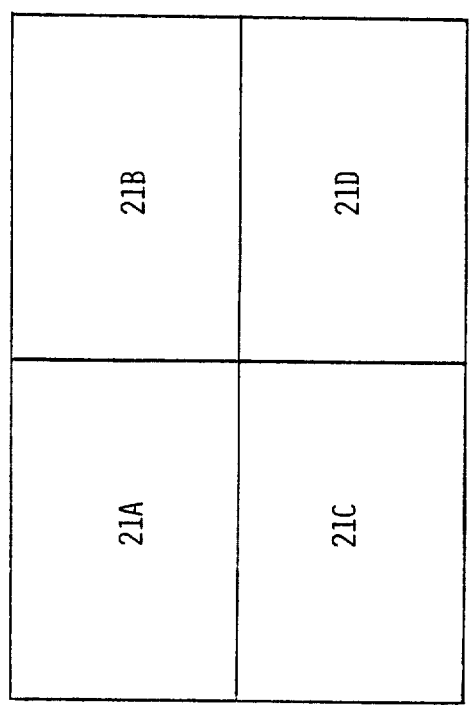
FIG. 21 shows the relationship of FIGS. 21A, 21B, 21C and 21D.
Figure 21A:
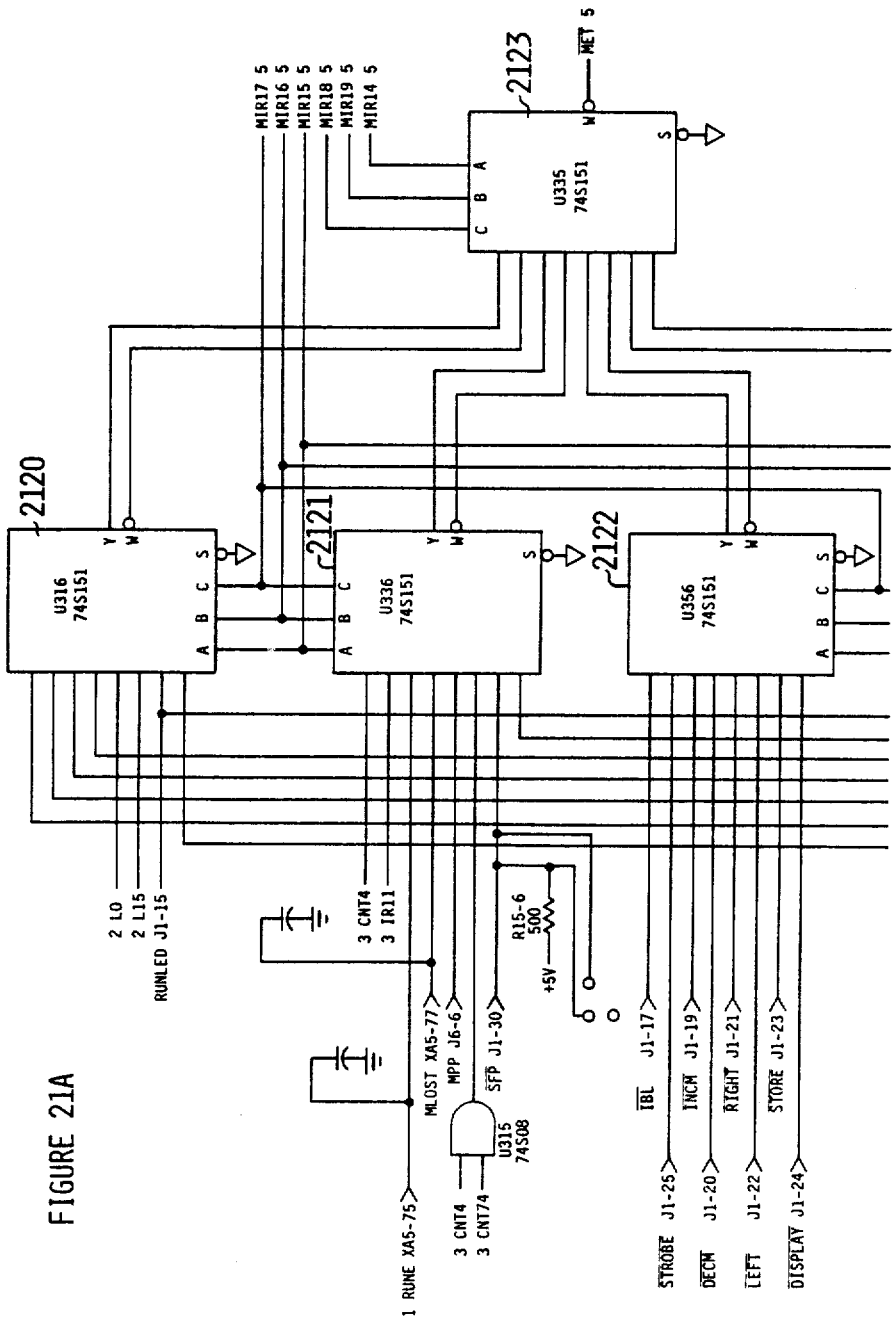
FIGS. 21A, 21B, 21C and 21D taken together comprise a detailed schematic diagram of the macro-instruction register and a portion of the decoding circuitry therefore of the preferred embodiment.
Figure 21B:
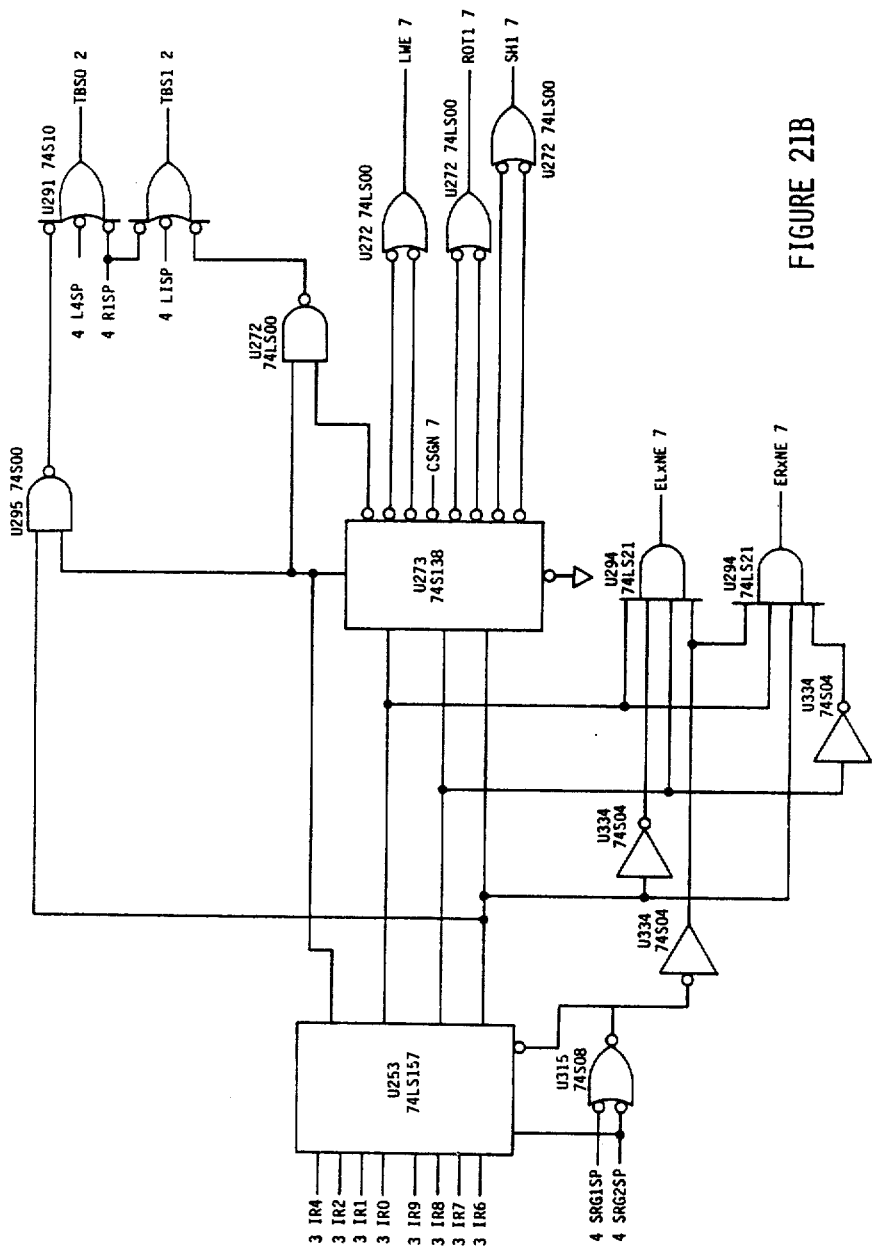
Figure 21C:
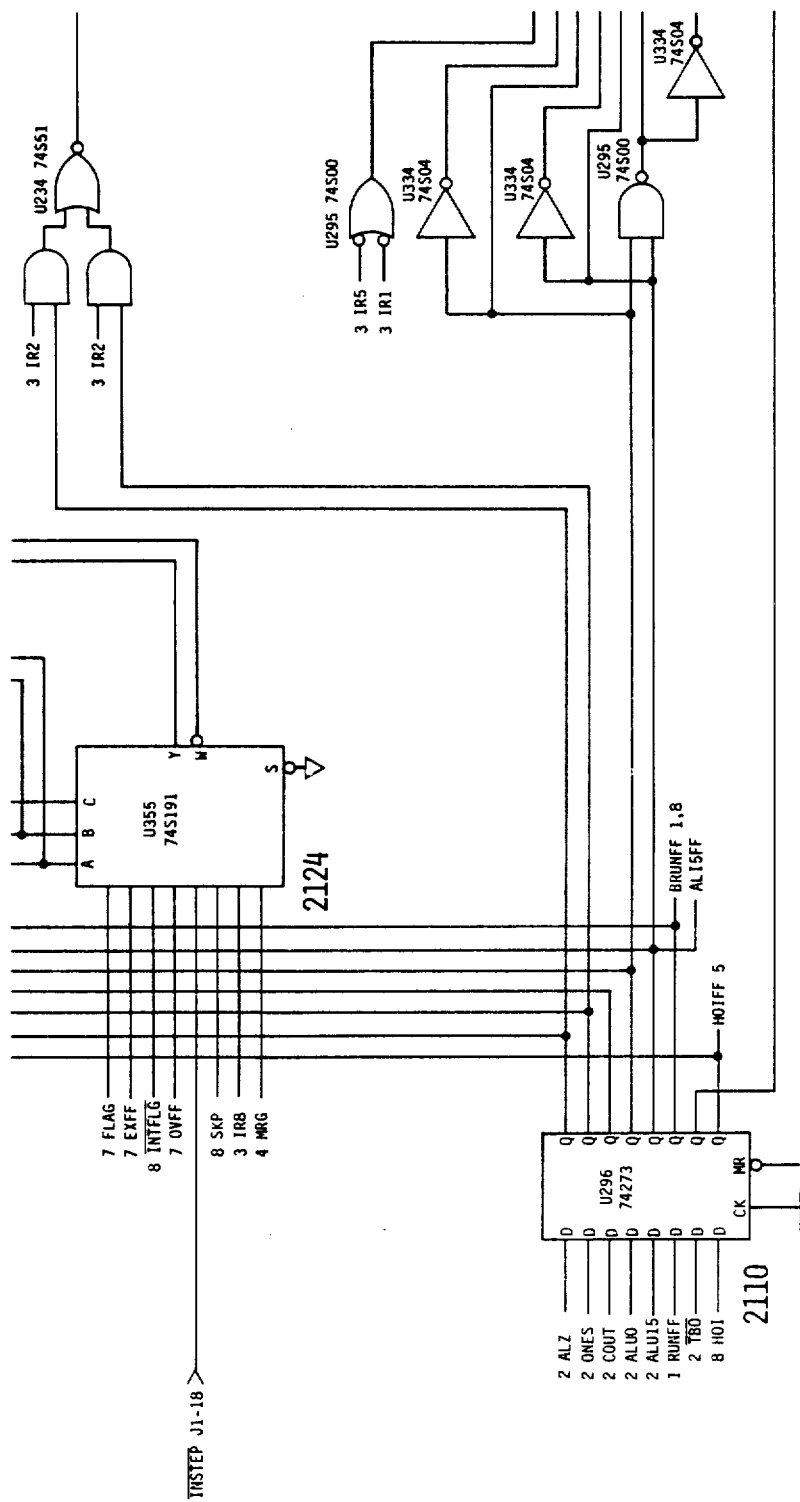
Figure 21D:
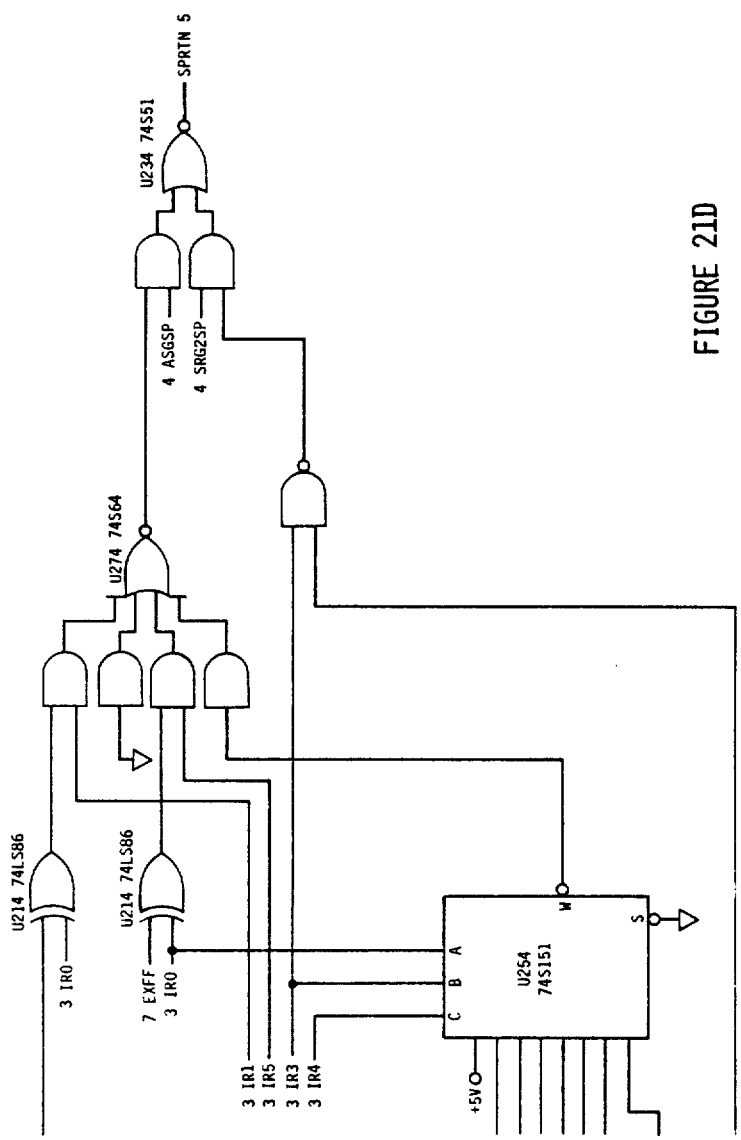

The control processor jump conditional logic is illustrated in FIG. 21. MIR bits 15 through 19 compose the COND field and are selectors to a high speed multiplexing tree comprising decoders 2120, 2121, 2122, 2123 and 2124 which selects one of thirty-two possible jump conditions. MIR 14 is the reverse jump sense (RJS) bit and is used in the last stage to complement the condition sensed. The signal output of the tree is the signal $\overline{\text{MET}}$ which goes into the CMAR load logic previously discussed with respect to FIG. 20.

Arithmetic/Logic

Figure 18:
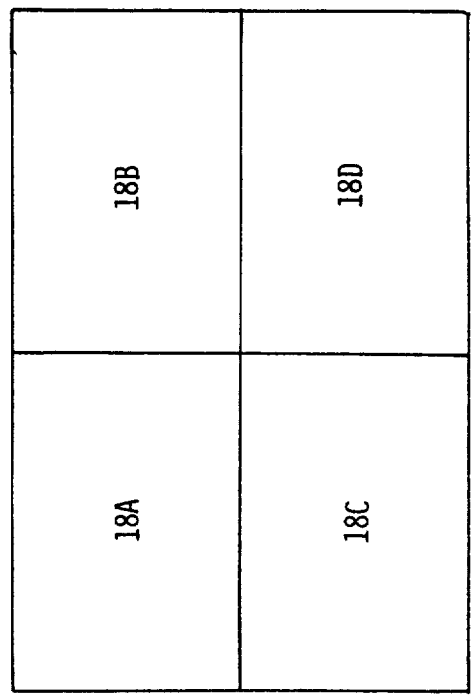
FIG. 18 shows the relationship of FIGS. 18A, 18B, 18C and 18D.
Figure 18A:
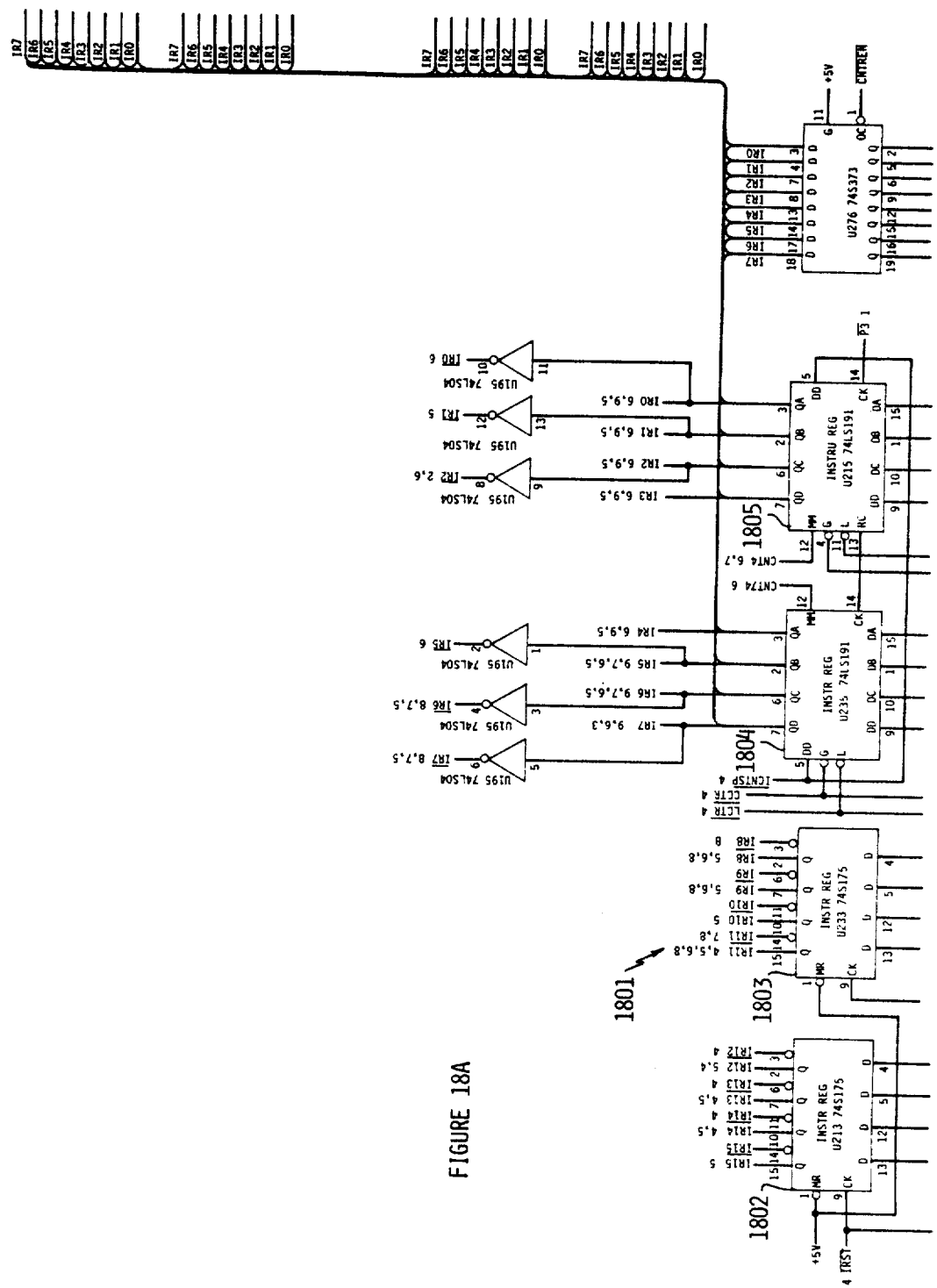
FIGS. 18A, 18B, 18C and 18D taken together comprise a detailed schematic diagram of the connection register and I/O bus circuitry of the preferred embodiment.
Figure 18B:
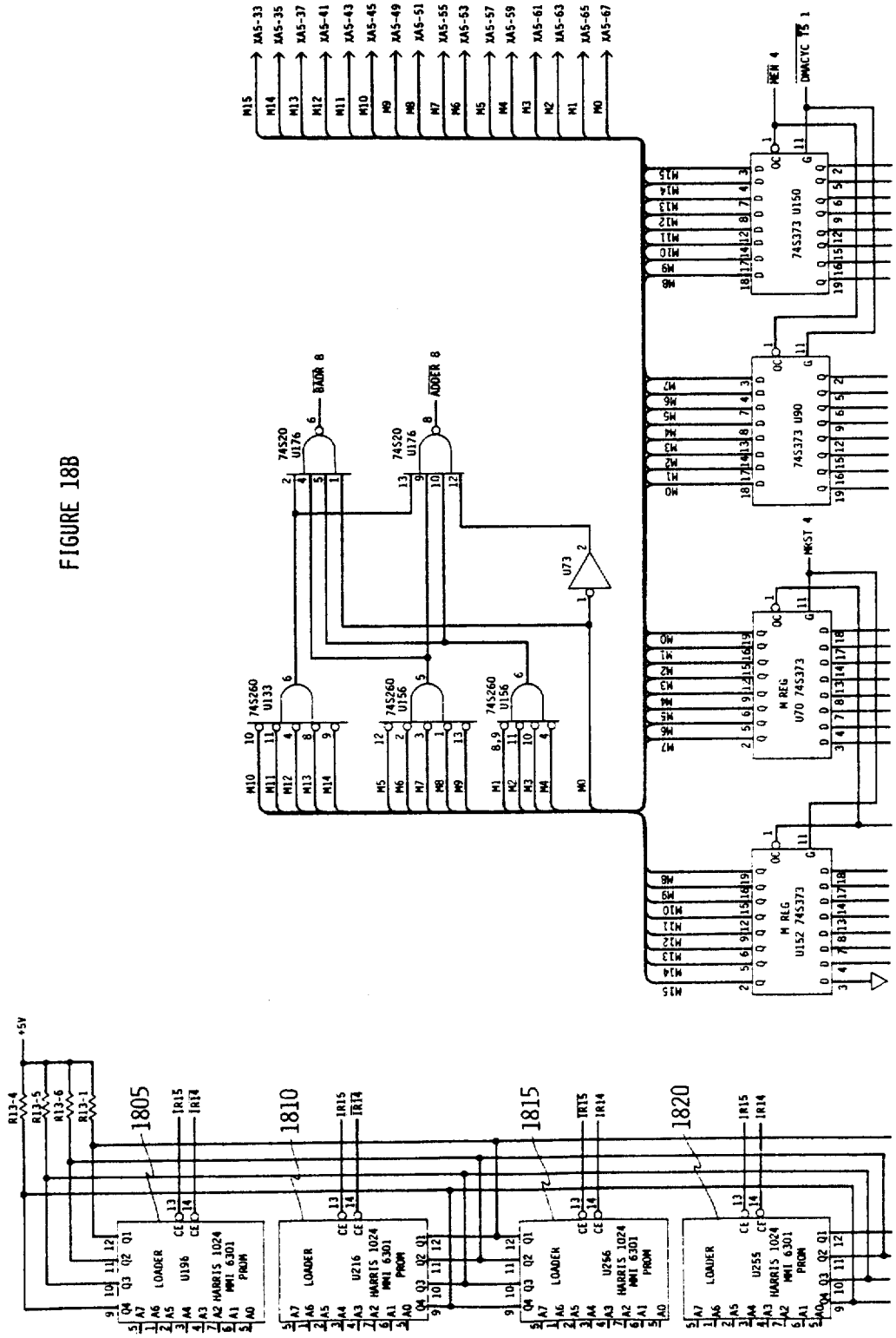
Figure 18C:
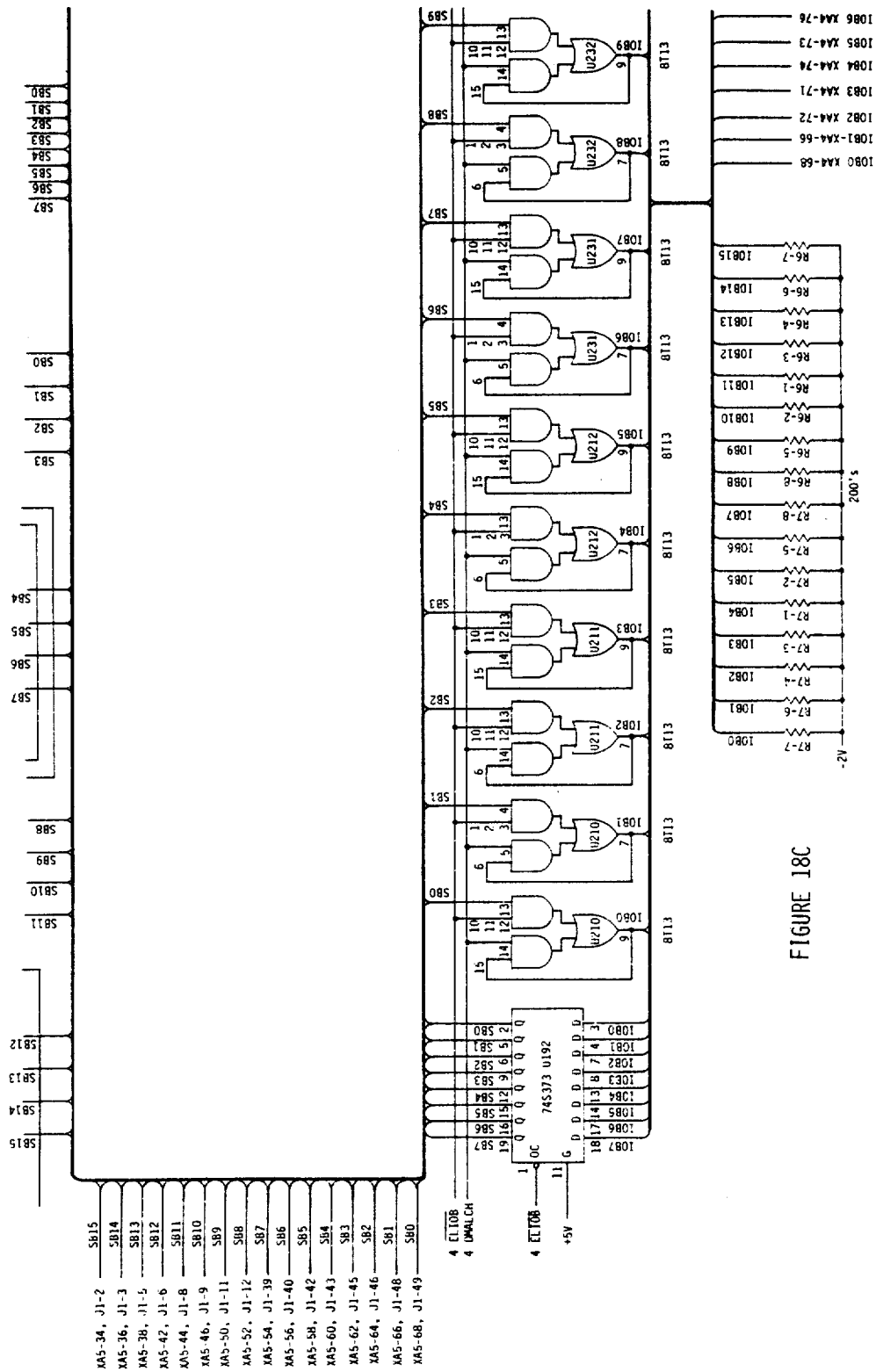
Figure 18D:
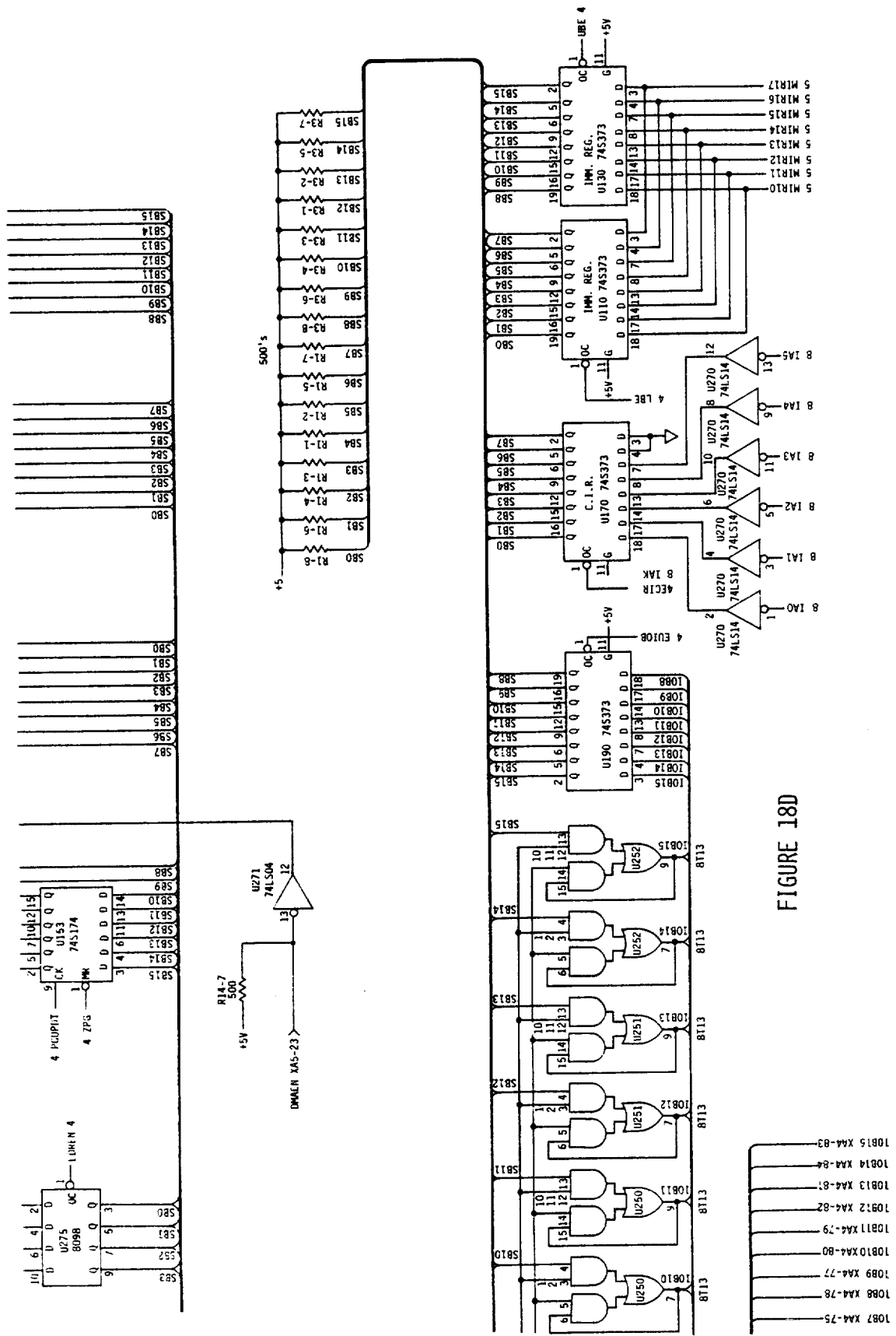

The arithmetic/logic section is shown in FIGS. 17, 18, 21 and 22. FIGS. 17 and 18 are the most important and contain all of the data registers and the four 16-bit data busses in the CPU. The tri-state bidirectional positive-true S-bus is the main data bus upon which the SB field of the micro-instruction enables a register for the duration of the microcycle. The S-bus drives the ALU which in turn drives the RS and ground true T-bus. The CTL-compatible bidirectional positive true I/O bus can be gated from or onto the S-bus. The tri-state positive true M-bus is shared by the CPU's M-register and DCPC's memory address registers. It may also be enabled back onto the S-bus.

The RAM

There are sixteen registers that are physically located in the 16-word by 16-bit RAMs 1780, 1781, 1782 and 1783 as shown in FIG. 17. The registers contained in the RAM are the P (program counter), S, X, Y, SP and eleven scratch registers. The 74S189 RAM or the like, manufactured by Texas Instruments and others is suitable for use in the preferred embodiment. Writing and reading at different locations are not permitted simultaneously. The control logic illustrated above and below the RAMs determines how they are to operate. The microinstruction control bits of the SB and ST fields are multiplexed by multiplexer 1794 into the address inputs of the RAM. The Write Enable ($\overline{\text{WE}}$) lines is low during P5 of any microcycle that the ST field calls for a RAM register to be loaded. The Chip Enable ($\overline{\text{CE}}$) input is low when a RAM register is to be read onto the S-bus or stored from the T-bus.

There are four possible permutations of RAM registers between the S-bus and Store fields.

First consider the case of a micro-instruction that has a RAM register neither in the S-bus nor Store field. In this case, both MIR14 and RAMST are low, so both $\overline{\text{CE}}$ and $\overline{\text{WE}}$ are high and the RAM remains completely inactive during the microcycle.

Arithmetic/Logic Unit, Rotate Shifter, and L Register

The ALU is made of four high-speed ALU circuits 1730, 1731, 1732 and 1733 and one carry look-ahead generator 1729. The ALU is driven directly by MIR bits 15 through 19.

The Rotate Shift logic is made of eight dual four-to-one multiplexers 1741, 1742, 1743, 1744, 1745, 1746, 1747 and 1748 respectively. They function as a high speed shifter, capable of shifting left one bit, left four bits, right one bit, or straight pass through in 9ns.

Instruction Register

The IR is located in FIG. 18 and comprises registers 1802, 1803, 1804 and 1805. The lower eights bits are also called the CNTR. The CNTR can be read onto the S-bus if CNTR is in the SB field.

APPENDIX A

| BITS | 23 22 21 20 | 19 18 17 16 15 | 14 13 12 11 10 | 9 8 7 6 5 | 4 3 2 1 0 |
|---|---|---|---|---|---|
| FIELDS | OPERATION (OP) | ALU | S-BUS | STORE | SPECIAL |
| WORD TYPE I | ARS 0001<br>CRS 0010<br>DIV 0101<br>ENV 1010<br>ENVE 1011<br>LGS 0011<br>LWF 0110<br>MPY 0111<br>NOP 0000<br>NRM 0100<br>READ 1001<br>RTN 1111<br>WRTE 1000 | ADD 00110<br>AND 10100<br>CMPL 11010<br>CMPS 11111<br>DBLS 00011<br>DEC 00000<br>INC 01111<br>IOR 10001<br>NAND 11011<br>NOR 11110<br>NSAL 11101<br>NSOL 10111<br>ONE 10011<br>OP1 01110<br>OP2 01101<br>OP3 01011<br>OP4 01010<br>OP5 01000<br>OP6 00111<br>OP7 00101<br>OP8 00100<br>OP10 00010<br>OP11 00001<br>OP13 11100<br>PASL 10101<br>PASS 10000<br>SANL 11000<br>SONL 10010<br>SUB 01001<br>XNOR 10110<br>XOR 11001<br>ZERO 01100 | A 00011<br>B 00100<br>CAB 00001<br>CIR 01010<br>CNTR 01011<br>DES 01110<br>DSPI 00111<br>DSPL 00110<br>IOI 00101<br><br><br>LDR 01100<br>M 01101<br>MEU 01001<br>MPPA 00010<br>MPPB 01000<br>NOP 01111<br>P 11110<br><br>S 11111<br>SP 11011<br>S1 10000<br>S2 10001<br>S3 10010<br>S4 10011<br>S5 10100<br>S6 10101<br>S7 10110<br>S8 10111<br>S9 11000<br>S10 11001<br>S11 11010<br>TAB 00000<br>X 11100<br>Y 11101 | A 00011<br>B 00100<br>CAB 00001<br>CNTR 01011<br>DSPI 00111<br>DSPL 00110<br>IOO 00101<br>IRCM 01100<br>L 01010<br>M 01101<br>MEU 01001<br>MPPA 00010<br>MPPB 01000<br>NOP 01111<br>P 11110<br>PNM 01110<br>S 11111<br>SP 11011<br>S1 10000<br>S2 10001<br>S3 10010<br>S4 10011<br>S5 10100<br>S6 10101<br>S7 10110<br>S8 10111<br>S9 11000<br>S10 11001<br>S11 11010<br>TAB 00000<br>X 11100<br>Y 11101 | ASG 11000<br>CLFL 01110<br>COV 01011<br>DCNT 10101<br>FTCH 11011<br>IAK 11001<br>ICNT 10110<br>INCI 11100<br>IOFF 11111<br>IOG 00110<br>ION 00011<br>JTAB 00001<br>L1 10010<br>L4 10011<br>MESP 01010<br>MPCK 11110<br>MPP1 11010<br>MPP2 01001<br>NOP 00111<br>PRST 01101<br>RJ30 00100<br>RPT 10111<br>RTN 00000<br>R1 10100<br>SHLT 11101<br>SOV 01100<br>SRG1 10001<br>SRG2 10000<br>SRUN 01000<br>STFL 01111 |
| FIELDS | OPERATION (OP) | MODIFIER | OPERAND | STORE | SPECIAL |
| WORD TYPE II | IMM 1110 | CMHI 11<br>CMLO 10<br>HIGH 01<br>LOW 00 | (ANY 8-BIT CONSTANT TO THE S-BUS MODIFIED BY BITS 13 AND 19) | (SAME AS ABOVE) | (SAME AS ABOVE) |

A-1

| BITS | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|
| FIELDS | BRANCH |||| CONDITION |||||  B R A N C H  S E N S E  R J S 1 | ADDRESS |||||||||| SPECIAL |||||
| WORD TYPE III | JMP 1101<br>JSB 1100<br>RTN 1111 |||| ALZ 00000<br>AL0 00011<br>AL15 01111<br>CNT4 01000<br>CNT8 01101<br>COUT 00010<br>E 11001<br>FLAG 11000<br>HOI 00111<br>IR8 11110<br>IR11 01001<br>L0 00100<br>L15 00101<br>MPP 01100<br>MRG 11111<br>NDEC 10011<br>NINC 10010<br>NINT 11010<br>NLDR 10000<br>NLT 10101<br>NMDE 10111<br>NMLS 01011<br>NRT 10100<br>NSFP 01110<br>NSNG 11100<br>NSTB 10001<br>NSTR 10110<br>ONES 00001<br>OVFL 11011<br>RUN 00110<br>RUNE 01010<br>SKPF 11101 |||||  | (ANY ADDRESS IN CURRENT 512 WORD BLOCK. IF THE MICROINSTRUCTION IS LOCATED IN THE LAST LOCATION OF A $512_{10}$ WORD BLOCK THE TARGET ADDRESS IS DEFINED AS THE NEXT $512_{10}$ WORD BLOCK. SEE TABLE 4-1.) |||||||||| CNDX 00010 |||||
| FIELDS | BRANCH |||| | ZERO 0 | ADDRESS |||||||||| MODIFIER/ SPECIAL |||||
| WORD TYPE IV | JMP 1101<br>JSB 1100 |||| | | (ANY ADDRESS IN THE 16K WORD CONTROL MEMORY) |||||||||| IOFF 11111<br>IOG 00110<br>ION 00011<br>J74 00101<br>NOP 00111<br>RJ30 00100<br>RPT 10111<br>STFL 01111 |||||

A-2

APPENDIX B

| MICRO-ORDER | DEFINITION |
|---|---|
| | WORD TYPE I OP FIELD |
| ARS | Meaning: Perform a single bit arithmetic shift of the A- and B-registers combined, with the A-register forming the low-order 16 bits. The direction of the shift is specified in the Special field: L1 for left, R1 for right.<br><br>Required micro-order (field) entries:<br><br>| OP | SPECIAL | ALU | STORE | S-BUS |<br>|---|---|---|---|---|<br>| ARS | L1 or R1 | PASS | B | B |<br><br>If the Special field contains L1, a 0 is shifted into bit 0 of the A-register; bit 14 of the B-register is lost, but the sign bit (bit 15) remains unchanged. The Overflow register bit is set if B-register bits 14 and 15 differ before the shift operation. One left shift multiplies by two, i.e., doubles the number.<br><br>ARITHMETIC LEFT SHIFT: SPECIAL = L1<br><br>If the Special field contains R1, the sign (bit 15) is copied into bit 14 of the B-register and bit 0 of the A-register is lost. B-register bit 15 remains the same.<br><br>ARITHMETIC RIGHT SHIFT: SPECIAL = R1 |

B-1

| MICRO-ORDER | DEFINITION |
|---|---|
| | WORD TYPE I - OP FIELD (CONT.) |
| CRS | Meaning: Perform a single bit circular rotate shift on the combined A- and B-registers with the A-register forming the low order 16 bits. The direction of the rotate is specified in the Special field: L1 for left, and R1 for right.<br><br>Required micro-order (field) entries.<br><br>| OP | SPECIAL | ALU | STORE | S-BUS |<br>|---|---|---|---|---|<br>| CRS | L1 or R1 | PASS | B | B |<br><br>If the Special field contains L1, bit 15 of the B-register is transferred to bit 0 of the A-register.<br><br>CIRCULAR LEFT SHIFT: SPECIAL = L1<br>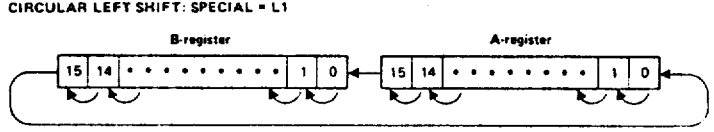<br><br>If the Special field contains R1, bit 0 of the A-register is transferred to bit 15 of the B-register.<br><br>CIRCULAR RIGHT SHIFT: SPECIAL = R1<br>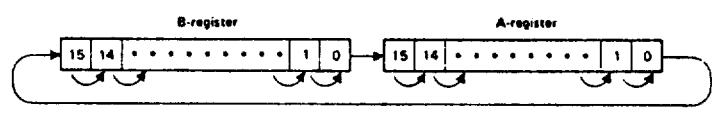 |

| MICRO-ORDER | DEFINITION |
|---|---|
| | WORD TYPE I - OP FIELD (CONT.) |
| DIV | Meaning: Perform a divide step where the divisor is in the L-register and the 32-bit dividend is in the A- and B-registers (least significant bits in the A-register). This microinstruction is usually repeated (16 times for a full word divisor) by specifying the Special field micro-order RPT in the preceding microinstruction. This performs the successive subtractions required in a divide algorithm.<br><br>Required micro-order (field) entries:<br><br>| OP | SPECIAL | ALU | STORE | S-BUS |<br>|---|---|---|---|---|<br>| DIV | L1 | SUB | B | B |<br><br>The divide step is executed as follows:<br><br>a. Subtract the L-register from the B-register (ALU = B-L)<br><br>b. If a borrow is required to complete the subtraction, the ALU Carry Out flag is clear (0). This carry out result means that the divisor (L-register) is too large. The ALU result is not stored. The A-register and B-register are left shifted one bit and the divide step is complete.<br><br>c. If a borrow is not required to complete the subtraction, the ALU Carry Out flag is set (1). This means that the divisor is small enough and the result of the subtraction is left shifted one bit and stored back into the B-register. Bit 15 of the A-register shifts into bit 0 of the B-register and bit 0 of the A-register is set to 1 (the carry out result). The divide step is complete.<br><br>Usage: The base set divide operation is shown in appendix G under the Extended Arithmetic Group instruction microroutines at label DIV. This can be used as an example in your microprogramming. When performing 16 divide steps, the numbers in the A- and B-registers should have a 32-bit left shift executed before the RPT and the first divide step. This is accomplished for proper bit alignment before the division. Also, the counter should be set for the desired number of repeat steps before the 32-bit left shift. Example:<br><br>INITIAL CONTENTS:<br><br>| B-register | A-register | L-register |<br>|---|---|---|<br>| Dividend 16 Most Significant bits | Dividend 16 Least Significant bits | Divisor (Absolute Value) |<br><br>(Left Shifted)<br><br>AFTER REPEAT 16 TIMES OF DIVIDE STEP:<br><br>| B-register | A-register | L-register |<br>|---|---|---|<br>| Remainder Doubled | 16-Bit Quotient of (B, A) / L | Divisor (Unchanged) | |

B-3

| MICRO-ORDER | DEFINITION |
|---|---|
| WORD TYPE I - OP FIELD (CONT.) ||
| ENV | Meaning: Enable the overflow logic for the current ALU operation. If ADD is coded in the ALU field, the Overflow register does not set unless requested.<br><br>Usage: To detect an overflow (i.e., set the Overflow register bit), ENV or ENVE (see below) must be specified in the OP field of the microinstruction in which the condition is to be tested. The Overflow register is set if the S-bus and L-register bits 15 are the same and bit 15 output from the ALU is different. Caution is advised in the use of DEC (decrement) or INC (increment) in conjunction with ENV. The L-register is always compared with the S-bus. Section 7 provides further information on programmatically setting and clearing the Overflow register. |
| ENVE | Meaning: Enable the overflow and extend logic for the current ALU operation.<br><br>Usage: To detect (test for) an overflow (i.e., set the Overflow register bit), ENV (see above) or ENVE must be specified in the OP field of the microinstruction in which the condition is to be tested. To set the Extend register as a result of the ALU operation, the ENVE micro-order must be specified in OP field of the microinstruction. The Extend register bit is set if there is a carry generated by the ALU (ALU Carry Out flag = 1).<br><br>Example:<br><br>| OP | SPECIAL | ALU | STORE | S-BUS |<br>|---|---|---|---|---|<br>| [ENV]<br>[ENVE] |  | ADD | S3 | S3 |<br><br>See section 7 information on programmatically setting and clearing the Overflow register. |

| MICRO-ORDER | DEFINITION |
|---|---|
| | WORD TYPE I - OP FIELD (CONT.) |
| LGS | Meaning: Perform a single bit logical shift of the A- and B-registers combined, with the A-register forming the low order 16 bits. The direction of the shift is specified in the Special field: L1 for left, R1 for right.<br><br>Required micro-order (field) entries:<br><br>| OP | SPECIAL | ALU | STORE | S-BUS |<br>|---|---|---|---|---|<br>| LGS | L1 or R1 | PASS | B | B |<br><br>If the Special field contains L1, a 0 is shifted into bit 0 of the A-register and bit 15 of the B-register is lost.<br><br>LOGICAL LEFT SHIFT: SPECIAL = L1<br><br>If the Special field contains R1, a 0 is shifted into bit 15 of the B-register and bit 0 of the A-register is lost.<br><br>LOGICAL RIGHT SHIFT: SPECIAL = R1 |

B-5

| MICRO-ORDER | DEFINITION |
|---|---|
| WORD TYPE I - OP FIELD (CONT.) ||
| LWF | Meaning: Perform a one bit rotational shift of a 17-bit operand in the Rotate/Shifter where bit 17 is formed by the CPU flag (link with flag). The data rotates left one bit if L1 is in the Special field, or right one bit if R1 is in the Special field. If neither L1 or R1 are specified, LWF clears the CPU flag and no rotate takes place.<br><br>ROTATIONAL RIGHT SHIFT: SPECIAL = R1   ROTATIONAL LEFT SHIFT: SPECIAL = L1<br>(ALU Contents diagrams with CPU Flag) |
| MPY | Meaning: Perform a multiply step where the multiplier is in the L-register and the multiplicand is in the A-register.<br><br>Required micro-order (field) entries:<br><br>OP   SPECIAL   ALU   STORE   S-BUS<br>MPY   R1   ADD   B   -B<br><br>The multiply step is executed as follows:<br><br>a. If bit 0 of the A-register is a one, the L-register is added to the S-bus (B-register value). The result is shifted right one bit and stored into the B-register with the ALU Carry Out flag forming bit 15.<br><br>b. If bit 0 of the A-register is a zero, the S-bus (B-register value) is shifted right one bit and stored back into the B-register with the ALU Carry Out flag forming bit 15.<br><br>c. In either case, the A-register is shifted right and ALU bit 0 fills vacated bit position 15. Bit 0 of the A-register is lost. The multiply step is complete.<br><br>Usage: This microinstruction is usually repeated 16 times by specifying the Special field micro-order RPT in the preceding microinstruction.<br><br>Each step of the multiply algorithm effectively multiplies the L-register by the A-register bit that corresponds to the step; i.e., step one multiplies the L-register by bit 0 of A-register, step two multiplies the L-register by bit 1 of the A-register, etc. Thus to multiply the L-register by all 16 bits of the A-register, MPY must be repeated 16 times.<br><br>Since the B-register goes through successive right shifts and additions, the initial content of the B-register is added to the final result of the multiply algorithm. If the B-register is not zero before the multiply steps are begun, 16 multiply steps will yield the 32-bit result in the B- and A-registers (where the least significant bits (LSB's) are in the A-register). |

B-6

| MICRO-ORDER | DEFINITION |
|---|---|
| | WORD TYPE I - OP FIELD (Cont.) |
| MPY (Continued) | (B,A) = [(AxL) + B]<br><br>This may be useful in some computational procedures. For example: X(2) = X(1) + (YxZ).<br><br>Initial Contents.<br><br>INITIAL CONTENTS:<br><br>B-register: Value to be added to the final result<br>A-register: Multiplicand<br>L-register: Multiplier<br><br>AFTER REPEATING THE MULTIPLY STEP 16 TIMES:<br><br>B-register: (AxL) + B, 16 Most Significant bits<br>A-register: (AxL) + B, 16 Least Significant bits<br>L-register: Multiplier (Unchanged) |

B-7

| MICRO-ORDER | DEFINITION |
|---|---|
| | WORD TYPE I - OP FIELD (CONT.) |
| NOP | Meaning: No operation is specified for the OP field.<br><br>Usage: This is the default micro-order when the OP field is left blank. |
| NRM | Meaning: Perform a one bit shift on the 48-bit combined value of the B-register, A-register, and S-bus data (normalize a 48-bit floating point number) as follows.<br><br>Left shift: The left normalizing shift requires that the following micro-orders be used:<br><br>    OP      SPECIAL    ALU    STORE    S-BUS<br><br>    NRM      L1         PASS       *          *<br><br>*Desired Register<br><br>This will arithmetically shift the B-register, A-register, and S-bus data left one bit. If B-register bits 15 and 13 are different before the shift, the Repeat flip-flop is cleared. (Refer to the explanation of normal Repeat flip-flop operation under RPT in the Special field. This operation is an exception.)<br><br>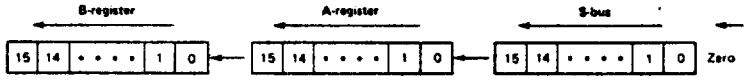<br><br>Right shift: The right normalizing shift requires that the following micro-orders be used:<br><br>    OP      SPECIAL    ALU    STORE    S-BUS<br><br>    NRM      R1         PASS       *          *<br><br>*Desired Register<br><br>This will arithmetically shift the B-register, A-register, and S-bus data right one bit with the sign bit of the B-register preserved. No "special" conditions will clear the Repeat flip-flop (as opposed to the left shift usage).<br><br>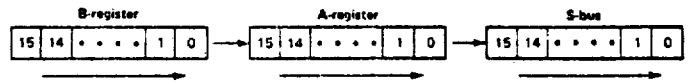 |

B-8

| MICRO-ORDER | DEFINITION |
|---|---|
| | WORD TYPE I - OP FIELD (Cont.) |
| NRM (Continued) | A second application of the NRM micro-order is in "denormalization", or aligning floating point numbers (with different exponents). In this case, one or the other of the numbers is operated on to adjust the exponent and shift the floating point into the proper position. The number of alignment shifts is passed into the counter and the microinstruction below is repeated the appropriate number of times.<br><br><table><tr><th>OP</th><th>SPECIAL</th><th>ALU</th><th>STORE</th><th>S-BUS</th></tr><tr><td>NRM</td><td>R1</td><td>PASS</td><td>S1</td><td>S1</td></tr></table><br>Usage. The use of NRM in the left shift application is not as obvious as right shift. For example, assume a 48-bit two's complement number in the B-, A-, and S1-registers is to be quickly normalized. The following demonstrates the process.<br><br><table><tr><th>LABEL</th><th>OP</th><th>SPECIAL</th><th>ALU/ COND.</th><th>STORE</th><th>S-BUS-ADDRESS</th></tr><tr><td>NRM48</td><td>IMM</td><td></td><td>LOW<br>DBLS<br>XOR</td><td>CNTR<br>L</td><td>0<br>B<br>B</td></tr><tr><td></td><td>JMP</td><td>CNDX<br>RPT</td><td>AL15</td><td></td><td>*+4</td></tr><tr><td></td><td>NRM<br>JMP</td><td>L1</td><td>PASS</td><td>S1</td><td>S1<br>NRM48+1</td></tr></table><br>Upon exit, the number is normalized and the counter contains the two's complement of the number of shifts performed.<br><br><br><center>NOTE</center><br>Floating point numbers are considered normalized when the mantissa sign bit and adjacent bit are opposite in polarity and the mantissa falls in a range of a set of numbers between zero and everything up to but not including one. |

| MICRO-ORDER | DEFINITION |
|---|---|
| WORD TYPE I OP FIELD (CONT.) ||
| READ | Meaning: Read data from main memory at the address specified in the M-register and store into the T-register. The CPU will pause if main memory is busy.<br><br>Usage: The M-register must be loaded prior to or during the microinstruction containing the READ micro-order. The data from main memory must be removed from the T-register within three microinstructions after the READ. Optimum performance is realized when the maximum number of microinstructions allowable are used between READ and TAB. Refer to section 7 for READ micro-order use considerations. |
| RTN | Meaning: Jump to the return address, i.e., branch by "popping" the "top" address in the Save Stack into the CMAR. Note that there can be three levels of microsubroutines (JSB's).<br><br>Usage: For word type I, CNDX is *not allowed* in the Special field so the "pop" operation and branch are unconditionally made. |
| WRTE | Meaning: Write the data in the T-register into the main memory address specified in the M-register. The CPU will pause if main memory is busy.<br><br>Usage: The T-register must be loaded during the microinstruction containing the WRTE micro-orders. Refer to section 7 for WRTE micro-order use considerations |

B-10

| MICRO-ORDER | DEFINITION |
|---|---|
| WORD TYPE I AND II - SPECIAL FIELD | |
| ASG | Meaning: Bits 6 and 7 of the Instruction Register (IR) determine which of the following functions are to be performed:<br><br>| IR | bit | Alter/Skip Group |<br>|---|---|---|<br>| 7 | 6 | Instruction |<br>| 0 | 1 | (CLE) Clear Extend register |<br>| 1 | 0 | (CME) Complement Extend register |<br>| 1 | 1 | (CCE) Set Extend register |<br><br>Also, this micro-order loads the top of the Save Stack into the CMAR if the Alter Skip Group conditions are not satisfied. It does not "pop" the Save Stack (i.e., the address also remains in the stack). The operation specified in the ALU field is forced to a PASS if IR bit 2 is a zero.<br><br>Usage: This micro-order is used in the base set microprogram to implement the Alter Skip Group instructions. It will not normally be used by the microprogrammer. Refer to section 7 use considerations. |
| CLFL | Meaning: Clear the CPU flag |
| COV | Meaning: Clear the Overflow register. Refer to section 7 for information on programmatically setting and clearing the Overflow register. |
| DCNT | Meaning: Decrement the counter (the lower 8 bits of the IR) by one |
| FTCH | Meaning: This micro-order (for use only in the base set) adjusts the Save Stack and performs other operations in relation to Memory Protect. If you are going to perform system emulation you will find further details on this micro-order in appendix C. Otherwise, it is not to be used for "normal" microprogramming. |
| IAK | Meaning: Freeze the computer until time period T6 and then load the interrupt address into the Central Interrupt register (CIR) and generate an IAK signal to the I/O section. Also clears the Indirect Counter in Memory Protect.<br><br>Usage: Not normally used by the user microprogrammer. Refer to section 7 for interrupt handling techniques. |
| ICNT | Meaning: Increment the counter (the lower 8 bits of the IR) by one |
| INCI | Meaning: Increment the Indirect Counter in Memory Protect (if installed) by one<br><br>Usage: Used by microprograms that implement indirect addressing. If INCI is executed three times before the next FTCH or IAK appears in the Special field, the Interrupt Enable flag is set to allow the CPU to recognize interrupts. Used to prevent multiple indirect addressing levels from holding off recognition of I/O interrupt requests. If the following microinstruction includes a JTAB in the Special field, the actual branch called by JTAB is made only if the condition mapped by bits 19 through 14 of that microinstruction are met. Refer to section 7 for interrupt handling techniques. |

B-11

| MICRO-ORDER | DEFINITION |
|---|---|
| WORD TYPE I AND II - SPECIAL FIELD (CONT.) | |
| IOFF | Meaning: Turn off the Interrupt Enable flag to disable recognition of power fail and I/O interrupts (does not disable Memory Protect or parity interrupts).<br><br>Usage: After the occurrence of an IAK or FTCH, or three occurrences of INCI in the Special field, interrupts are again recognized if Memory Protect is installed.<br><br>IOFF should be used with caution since holding off interrupts could cause the loss of input and output data. Refer to section 7 for interrupt handling techniques. |
| IOG | Meaning: Freeze the CPU until time period T2. Then enable the generation of I/O timing signals dependent upon the instruction in the IR.<br><br>Usage: Microprogrammed input and output require cooperation between the I/O section and microprogram control. Familiarity with the I/O system is mandatory. Refer to section 7 for information on forming and executing I/O microinstructions. |
| ION | Meaning: Turn on the Interrupt Enable flag and allow the CPU to recognize power fail and I/O interrupts until the micro-order IOFF is executed.<br><br>Usage: An interrupt from any I/O device can be detected in two ways:<br><br>a. If a JTAB micro-order is executed and an interrupt is pending or the Run flip-flop is clear, execution is forced to control memory (CM) location 6 (the Halt-Or-Interrupt microroutine).<br><br>b. A test for interrupt pending or Run flip-flop clear can be performed by the executing microprogram by having an HOI encoded in the Condition field of a word type III microinstruction. Or, a test for a pending interrupt can be made by having NINT encoded in a word type III Condition field. The micro-order ION allows interrupts to be recognized. However, interrupts are not generated by the interrupt system unless an STF 0 I/O control command has been executed. Refer to the discussion of the interrupt system in the *HP 21MX E-Series Computer Series Operating and Reference Manual*. Refer to section 7 for interrupt handling considerations. |
| JTAB | Meaning: This micro-order (for use only in the base set) maps instructions in the IR to the proper location in CM. If you are going to perform system emulation, you will find further details on this micro-order in appendix C. Otherwise, it is not to be used for "normal" microprogramming. |
| L1 | Meaning: Left shift one bit command to the Rotate/Shifter.<br><br>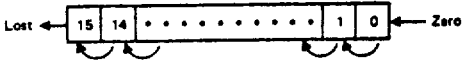<br><br>Usage: Refer to MPY, DIV, CRS, LGS, ARS, NRM, and LWF. Without one of the previous OP field micro-orders, L1 performs a one bit logical left shift on data leaving the ALU. |

| MICRO-ORDER | DEFINITION |
|---|---|
| | WORD TYPE I AND II - SPECIAL FIELD (CONT.) |
| L4 | Meaning: Four bit left rotate command to the Rotate Shifter.<br>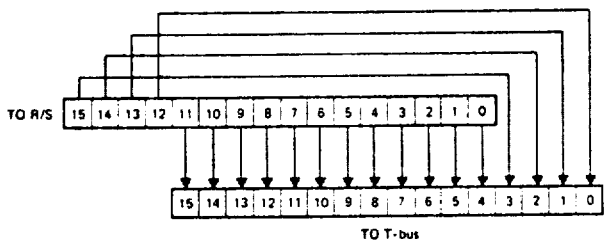 |
| MESP | Meaning: Dynamic Mapping System (DMS) signal generation micro-order used in conjunction with the MEU micro-order in the Store and S-bus fields. Eight different functions are performed (designated Q0 through Q7 for reference) by combinations of MESP and MEU. The combinations of these signals and their functions are described in section 7.<br><br>Usage: The DMS must be installed for the MESP and MEU micro-orders to be used. The DMS installation includes availability of the "standard" DMS Assembly language instructions which invoke the HP-written DMS microroutines. The MESP and MEU micro-orders are available for you to write microprograms using your DMS facility. You should thoroughly understand the DMS before using these micro-orders. |
| MPCK | Meaning: Request a Memory Protect check of the address in the M-register for a Memory Protect fence or DMS violation.<br><br>Usage: This micro-order is used with any instruction that may cause a Memory Protect or DMS violation by entering or modifying protected memory. It need not be used if Memory Protect is not installed in the computer. It is subject to the following:<br><br>a. Micro-orders IRCM, M, or PNM can not be specified in the Store field.<br><br>b. The M-register must have the address to be checked when the microinstruction using MPCK is executed. (MPCK is usually used with the WRTE micro-order in the OP field.) Refer to section 7 for reading, writing and I/O considerations using MPCK.<br><br>c. If there is not a READ or WRTE micro-order in the OP field (of the same microinstruction), the MPCK must follow the microinstruction containing a READ or WRTE by one or two microinstructions. The MPCK must never be further than two microinstructions away if Dual-Channel Port Controller (DCPC) is installed in the computer. The microinstruction below demonstrates a typical use of MPCK.<br><br>\| OP \| SPECIAL \| ALU \| STORE \| S-BUS \|<br>\| WRTE \| MPCK \| PASS \| TAB \| S1 \| |

| MICRO-ORDER | DEFINITION |
|---|---|
| WORD TYPE I AND II - SPECIAL FIELD (CONT.) ||
| MPP1 | Meaning: Generate a signal $\overline{PP1SP}$ (use to be defined by user) to the Microprogrammable Processor Port (MPP).<br><br>Usage: Refer to the *HP 21MX/21MX E-Series Computer I/O Interfacing Guide* for further information. Example microprogrammed use can be found in section 13 of this manual. |
| MPP2 | Meaning: Generate a signal PP2SP (use to be defined by user) to the MPP.<br><br>Usage: Refer to the *HP 21MX/21MX E-Series Computer I/O Interfacing Guide* for further information. Example microprogrammed use can be found in section 13 of this manual. |
| NOP | Meaning: No operation in the Special field.<br><br>Usage: This is the default operation if no other micro-order is specified in the Special field. |
| PRST | Meaning: This micro-order will clear the A- and B-Addressable flip-flops (AAF and BAF).<br><br>Usage: This may be used by the microprogrammer to gain access to main memory locations 0 and 1. Refer to section 7 for read and write operation considerations. |
| RJ30 | Meaning: When used in a word type I or II microinstruction (available also in word type IV), the definition of RJ30 is identical to that of a READ micro-order in a word type I OP field (i.e., a read operation takes place and no address modification action is defined). |
| RPT | Meaning: Repeat the next microinstruction for the number of times specified by the positive number in the least significant four bits of the IR counter.<br><br>Usage: The next microinstruction must be a word type I and must not contain RTN in the OP field or RTN or JTAB in the Special field. The Repeat flip-flop is set by this micro-order which prevents the updating of the Microinstruction Register (MIR) and CMAR at the end of the next microinstruction. The counter decrements after each execution of the next microinstruction and, when the lower four bits are all zeros, the Repeat flip-flop is cleared. (Refer to the NRM, OP field micro-order for exception.) If the four least significant bits of the counter are zeros, the next microinstruction will be repeated $16_{10}$ ($20_8$) times. |
| RTN | Meaning: Return from a microsubroutine; i.e., branch to the CM address in the Save Stack. This address is loaded into the CMAR. If the Save Stack is empty (no microsubroutine previously executed), a return is made to CM location 0 (zero).<br><br>Usage: Three levels of microsubroutines are the maximum allowable. RTN overrides the effect of a JMP or JSB in the OP field which are not allowable with RTN encoded in the Special field. |
| R1 | Meaning: Right shift one bit command to the Rotate/Shifter.<br><br>Usage: Used in conjunction with the shift and rotate micro-orders. Refer to MPY, DIV, ARS, NRM, CRS, LGS, and LWF. Without one of the previous micro-orders, a single bit logical right shift is executed. |

B-14

| MICRO-ORDER | DEFINITION |
|---|---|
| WORD TYPE I AND II SPECIAL FIELD (CONT.) ||
| SHLT | Meaning Clear the Run flip-flop<br><br>Usage The Run flip-flop and RUN LED on the Operator Panel is actually cleared at the completion of the word type I or II microinstruction following the one specifying SHLT This micro-order should be used with caution by the microprogrammer. |
| SOV | Meaning Set the Overflow register Refer to section 7 for information on programmatically clearing and setting the Overflow register. |
| SRG1 | Meaning Execute the shift rotate function specified by bits 6 through 9 of the IR (Refer to the HP 21MX E-Series Computer Operating and Reference Manual.) The shift rotate function is performed on the data that leaves the ALU If IR bit 5 is set, clear the E-register after the shift. The function performed in the Rotate Shifter is determined by IR bits 6 through 9 as follows<br><br>BITS<br>9 8 7 6    FUNCTION PERFORMED IN ROTATE/SHIFTER<br><br>1000    Arithmetic left shift one bit.<br><br>1001    Arithmetic right shift one bit<br><br>1010    Rotational left shift one bit<br><br>1011    Rotational right shift one bit<br><br>1100    Arithmetic left shift one bit, clear sign (bit 15).<br><br>1101    Rotational right shift one bit with E-register forming bit 16 (the 17th bit).<br><br>1110    Rotational left shift one bit with E-register forming bit 16 (the 17th bit).<br><br>1111    Rotational left shift four bits.<br><br>0xxx    No shift (bits 8,7, and 6 can have any setting) except if bits 8,7, and 6 are 101 or 110 the E-register could be undesirably updated. (Refer to the HP 21MX E-Series Computer Operating and Reference Manual Shift Rotate Group information for instructions on how to avoid this situation.)<br><br>Usage Refer to section 7 for considerations when using SRG1. |

| MICRO-ORDER | DEFINITION |
|---|---|
| \multicolumn{2}{c|}{WORD TYPE I AND II SPECIAL FIELD (CONT.)} |
| SRG2 | Meaning: Execute the shift rotate function specified by bits 0,1,2, and 4 of the IR. (Refer to the HP 21MX E-Series Computer Operating and Reference Manual.) The shift rotate function is performed on the data that leaves the ALU. The top of the Save Stack is loaded into the CMAR unless IR bit 3 was set (a logical 1) and bit 0 of the T-bus was zero during the last word type I or II microinstruction executed. The function performed in the Rotate/Shifter is determined by IR bits 0,1,2, and 4 as follows:<br><br>BITS<br>4 2 1 0   FUNCTION PERFORMED IN ROTATE/SHIFTER<br><br>1 0 0 0   Arithmetic left shift one bit.<br><br>1 0 0 1   Arithmetic right shift one bit.<br><br>1 0 1 0   Rotational left shift one bit.<br><br>1 0 1 1   Rotational right shift one bit.<br><br>1 1 0 0   Arithmetic left shift one bit, clear sign (bit 15).<br><br>1 1 0 1   Rotational right shift one bit with E-register forming bit 16 (the 17th bit).<br><br>1 1 1 0   Rotational left shift one bit with E-register forming bit 16 (the 17th bit).<br><br>1 1 1 1   Rotational left shift four bits.<br><br>0 x x x   No shift (bits 2,1, and 0 can have any setting) except if bits 2,1, and 0 are 101 or 110, the E-register could be undesirably updated (Refer to the HP 21MX E-Series Computer Operating and Reference Manual Shift/Rotate Group information for instructions on how to avoid this situation.)<br><br>Usage: Refer to section 7 for considerations when using SRG2. |
| SRUN | Meaning: Set the Run flip-flop.<br><br>Usage: The RUN condition is not actually set until the next word type I or II is executed. |
| STFL | Meaning: Set the CPU flag. |

B-16

| MICRO-ORDER | DEFINITION |
|---|---|
| \multicolumn{2}{c}{WORD TYPE I ALU FIELD} ||
|  | NOTE<br><br>Symbols used in the following ALU field equations are defined here for reference.<br><br>+     means arithmetic function +<br>−     means arithmetic function −<br>•     means logical function "and".<br>+     means logical function "or".<br>⊕     means logical function "exclusive or".<br>$\overline{S}$ or $\overline{L}$    means the one's complement of the S-bus or the one's complement of the L-register |
| ADD | Meaning: Add the data placed on the S-bus to the contents of the L-register |
| AND | Meaning: Logical "and" the L-register and S-bus. (L•S) |
| CMPL | Meaning: One's complement the L-register |
| CMPS | Meaning: One's complement data on the S-bus |
| DBLS | Meaning: Perform the following arithmetic function in the ALU with the S-bus: S plus S. |
| DEC | Meaning: Decrement data on the S-bus by one |
| INC | Meaning: Increment data on the S-bus by one |
| IOR | Meaning: Logical "inclusive or" the L-register and S-bus. (L+S) |
| NAND | Meaning: Logical "nand" the L-register and S-bus. $(\overline{L \cdot S})$ |
| NOR | Meaning: Logical "nor" the L-register and S-bus. $(\overline{L + S})$ |
| NSAL | Meaning: Logical "and" the complement of the S-bus and the L-register: $(\overline{S} \cdot L)$. |
| NSOL | Meaning: Logical "or" the complement of the S-bus and the L-register: $(\overline{S} + L)$. |
| ONE | Meaning: Set all 16 bits (logical one's) input to the Rotate Shift logic. |
| OP1 | Meaning: Perform the following logical function in the ALU with the L-register and S-bus: (S+L) plus 1 |
| OP2 | Meaning: Perform the following logical function in the ALU with the L-register and S-bus: $(S + \overline{L})$ plus 1 |
| OP3 | Meaning: Perform the following logical function in the ALU with the L-register and S-bus: S plus (S•L) plus 1 |
| OP4 | Meaning: Perform the following logical function in the ALU with the L-register and S-bus: $(S+L)$ plus $(S \cdot \overline{L})$ plus 1 |

B−17

| MICRO-ORDER | DEFINITION |
|---|---|
| WORD TYPE I - ALU FIELD (CONT.) ||
| OP5 | Meaning: Perform the following logical function in the ALU with the L-register and S-bus: (S•L̄). This micro-order has the same effect as the SANL micro-order. |
| OP6 | Meaning: Perform the following logical function in the ALU with the L-register and S-bus: S plus (S•L). |
| OP7 | Meaning: Perform the following logical function in the ALU with the L-register and S-bus: (S+L̄) plus (S•L). |
| OP8 | Meaning: Perform the following logical function in the ALU with the L-register and S-bus: (S•L) minus 1. |
| OP10 | Meaning: Perform the following logical function in the ALU with the L-register and S-bus: (S+L) plus S. |
| OP11 | Meaning: Perform the following logical function in the ALU with the L-register and S-bus: (S+L) plus S. |
| OP13 | Meaning: Pass all zeros to the Rotate/Shifter. This micro-order has the same effect as the ZERO micro-order. |
| PASL | Meaning: Pass the L-register's contents to the Rotate/Shifter. |
| PASS | Meaning: Pass the S-bus data to the Rotate/Shifter. PASS is the default micro-order (NOP) in the ALU field. If no micro-order is encoded in the ALU field in a word type I microinstruction, a PASS will be inserted during microassembly. Data is not modified when a PASS appears in the ALU field. |
| SANL | Meaning: Logical "and" the S-bus and the complement of the L-register (S•L̄); pass the result to the Rotate/Shifter. This micro-order has the same effect as the OP5 micro-order. |
| SONL | Meaning: Logical "or" the S-bus and the complement of the L-register (S+L̄); pass the result to the Rotate/Shifter. |
| SUB | Meaning: Subtract the L-register from the S-bus and pass the result to the Rotate/Shifter. |
| XNOR | Meaning: Logical "exclusive nor" the L-register and S-bus ($\overline{L \oplus S}$); pass result to the Rotate/Shifter. |
| XOR | Meaning: Logical "exclusive or" the L-register and S-bus (L⊕S); pass the result to the Rotate/Shifter. |
| ZERO | Meaning: Pass all zeros to the Rotate/Shifter. This micro-order has the same effect as the OP13 micro-order. |

B-18

| MICRO-ORDER | DEFINITION |
|---|---|
| WORD TYPE I AND II- STORE FIELD ||
| A | Meaning: Store the data on the T-bus in the A-register. |
| B | Meaning: Store the data on the T-bus in the B-register. |
| CAB | Meaning: Store the data on the T-bus in the A- or B-register according to the value of IR bit 11:<br><br>IR bit 11 zero means A-register<br>IR bit 11 one means B-register. |
| CNTR | Meaning: Store the lower eight bits of the S-bus (bits 0-7) in the counter (lower 8 bits of the IR)<br><br>Usage: Refer to section 7 use considerations |
| DSPI | Meaning: Store the one's complement of the lower eight bits of the S-bus in the Display Indicator on the Operator Panel. (Note that only the least significant six bits are displayed.) This display indicates which register (or function) information appears in the Operator Panel Display Register. Refer to the *HP 21MX E-Series Computer Operating and Reference Manual* for details on the Operator Panel and its operation in the normal and special modes. The six indicators on the Operator Panel are associated with the S-bus bits as follows:<br><br>| Display Indicator (S- bus) bit | 7 | 6 | 5 | 4 | 3 | 2 | 1 | 0 |<br>|---|---|---|---|---|---|---|---|---|<br>| Register Displayed in Normal Mode | - | - | S | P | T | M | B | A |<br>| Function Displayed in Special Mode | - | - | s | f | t | m | y | x |<br><br>NOTE: Bits 7 and 6 not used.<br><br>Usage: The Operator Panel Display Indicator or Indicators can be lit by bits 5 through 0 from the S-bus as follows:<br><br>\| OP \| SPECIAL \| MOD. \| STORE \| OPERAND \|<br>\| IMM \| \| LOW \| DSPI \| 373B \|<br><br>Lights indicator pointing to M-register.<br><br>whereas<br><br>\| OP \| SPECIAL \| MOD. \| STORE \| OPERAND \|<br>\| IMM \| \| LOW \| DSPI \| 010B \|<br><br>Lights all indicators (Special mode) except the function "t" mode (i.e., indicates that DMS map content is displayed in the Display Register) |

B-19

| MICRO-ORDER | DEFINITION |
|---|---|
| WORD TYPE I AND II - STORE FIELD (CONT.) ||
| DSPL | Meaning: Store the data on the S-bus in the Operator Panel Display Register. This information should be coordinated with the Display Indicator. |
| IOO | Meaning: Enable the S-bus onto the I/O bus.<br><br>Usage: To be used properly, this micro-order must be issued at T4 and T5 after an IOG (Special field) micro-order for I/O operation. The IOO micro-order is not the same as the IOO backplane signal. Refer to section 7 use considerations. |
| IRCM | Meaning: Store the S-bus in the IR. Record the type of Assembly language instruction stored in the IR in Memory Protect hardware for use in determining any error conditions that occur during execution of the instruction. Store the least significant ten bits of the S-bus into the least significant ten bits of the M-register and clear the upper five bits of the M-register if S-bus bit 10 is zero.<br><br>Usage: Refer to section 7 for information on interfacing with Memory Protect. |
| L | Meaning: Store the data at the output of the ALU into the L-register.<br><br>Usage: The L-register is used as the second operand in arithmetic functions. |
| M | Meaning: Store the data on the S-bus in the M-register.<br><br>Usage: Do not store into the M-register between the READ micro-order and the subsequent TAB if references to the A- or B-registers are possible. Refer to section 7 for TAB micro-order use considerations. |
| MEU | Meaning: DMS signal generation micro-order used in conjunction with Special field micro-order MESP and S-bus field micro-order MEU. Eight different functions are performed (designated Q0 through Q7 for reference) by combinations of MESP and MEU. The combinations of these signals and their functions are described in section 7.<br><br>Usage: The DMS must be installed for the MEU and MESP micro-orders to be used. The DMS installation includes availability of the "standard" DMS Assembly language instructions which invoke the HP-written DMS microroutines. The MEU and MESP micro-orders are available for you to write microprograms using your DMS facility. You should thoroughly understand the DMS before using these micro-orders. |
| MPPA and MPPB | Meaning: Generate the signals $\overline{\text{MPPAST}}$ and $\overline{\text{MPBST}}$ (use to be defined by user) to the MPP.<br><br>Usage: Refer to the *HP 21MX/21MX E-Series Computer I/O Interfacing Guide* for further information. Example microprogram use can be found in section 13 of this manual. |
| NOP | Meaning: No store operation is performed; this is the default micro-order when the Store field is left blank. |
| P | Meaning: Store the data on the T-bus in the P-register (Program Counter). |

B-20

| MICRO-ORDER | DEFINITION |
|---|---|
| WORD TYPE I AND II - STORE FIELD (CONT.) ||
| PNM | Meaning. Store the data on the T-bus in the P-register (Program Counter), and the data on the S-bus in the M-register.<br><br>Usage. Useful in microprograms which perform multiword READ operations from main memory, where the P-register points to the address in main memory to be read. In a single microinstruction, the microprogram can store P into the M-register via the S-bus and then increment P via the T-bus. An example of such an application is as follows:<br><br>| OP | SPECIAL | ALU | STORE | S-BUS |<br>|---|---|---|---|---|<br>| READ | | INC | PNM | P |<br><br>Refer to section 7 for the use of PNM in microinstructions with READ and WRTE micro-orders. If MPCK is used in the Special field, PNM cannot be used in the Store field. |
| S | Meaning. Store the data on the T-bus in the S-register. |
| SP | Meaning. Store the data on the T-bus in the SP-register. |
| S1 thru S11 | Meaning. Store the data on the T-bus in the indicated Scratch Register (S1 through S11). |
| TAB | Meaning. Store the data on the T-bus in the A-register if the AAF (A-Addressable flip-flop) is set; store the data on the T-bus in the B-register if the BAF (B-Addressable flip-flop) is set; store the data on the S-bus in the T-register (Memory Data Register) if neither AAF nor BAF is set. Data on the M-bus (as it loads the M-register) determines the setting of AAF or BAF as follows:<br><br>| M-bus address when M-register store is specified | FF States AAF | FF States BAF | Register referenced by TAB in store (or S-bus) field. |<br>|---|---|---|---|<br>| 0 | 1 | 0 | A |<br>| 1 | 0 | 1 | B |<br>| Any other value | 0 | 0 | T |<br><br>Note that the PRST micro-order clears the AAF and BAF flip-flops.<br><br>Usage. This micro-order must occur concurrently when a WRTE micro-order is used. The T-register is internal to the Main Memory section; it must not be used as a working register. TAB may not be in both the Store and S-bus fields. Refer to section 7 for microprogramming considerations and the use of TAB. |
| X | Meaning. Store the data on the T-bus in the X-register. |
| Y | Meaning. Store the data on the T-bus in the Y-register. |

B-21

| MICRO-ORDER | DEFINITION |
|---|---|
| WORD TYPE I - S-BUS FIELD | |
| A | Meaning: Place the contents of the A-register on the S-bus. |
| B | Meaning: Place the contents of the B-register on the S-bus. |
| CAB | Meaning: Place the contents of the A- or B-register on the S-bus according to the value of IR bit 11:<br><br>IR bit 11 zero means A-register.<br>IR bit 11 one means B-register. |
| CIR | Meaning: Place the contents of the CIR on the S-bus (bits 5 through 0). |
| CNTR | Meaning: Place the contents of the counter (lower 8 bits of the IR) on the lower 8 bits of the S-bus; the upper 8 bits are ones. See "NOTE" under IOI, below, and TAB "Usage", page 4-34 |
| DES | Meaning: Enable the Remote Program Load Configuration Switches onto the S-bus. These are a set of eight programmable switches that place data on the S-bus as follows:<br><br>NOTE<br><br>A closed switch represents a logical 1 on the S-bus.<br><br>| Switch No. | 8 | 7 | 6 | 5 | 4 | 3 | 2 | 1 |<br>\|---\|---\|---\|---\|---\|---\|---\|---\|---\|<br>\| S-Bus bit \| 15 \| 14 \| 10 \| 9 \| 8 \| 7 \| 6 \| 0 \|<br><br>Undriven S-bus bits are logical ones.<br><br>Usage: Used in the base set microprogrammed bootstrap routine. Refer to the *HP 21MX E-Series Operating and Reference Manual* operating procedures for additional loader information. Also refer to section 7 of this manual. See "NOTE" under IOI, below, and TAB "Usage", page 4-34. |
| DSPI | Meaning: Place the eight bits of the Operator Panel Display Indicator (complemented) on the S-bus. The upper eight bits of the S-bus are set to ones.<br><br>Usage: Refer to the DSPI Store field definition for Display Indicator bit significance. |
| DSPL | Meaning: Place the contents of the Operator Panel Display Register on the S-bus. |
| IOI | Meaning: Enable the I/O bus onto the S-bus.<br><br>Usage: This is used to transfer data from an I/O device to the S-bus. See section 7 for considerations in I/O microprogramming.<br><br>NOTE<br><br>When IOI is used in conjunction with select code 01, 02, 03, 04, or 05, the following microinstruction's S-bus field must not have CNTR, DES, or LDR if the unspecified (and assumed to be "1") S-bus bits must be in a known state; similarly, the microinstruction must not be word type II (IMM). |

B-22

| MICRO-ORDER | DEFINITION |
|---|---|
| | WORD TYPE I - S-BUS FIELD (CONT.) |
| LDR | Meaning: Place four bits from a Loader ROM on the S-bus. The address of these four bits in the ROM is contained in the counter. Determination of which of the four available Loader ROM's is specified by bits 15 and 14 in the Instruction Register. Example sequence:<br><br>*[Diagram showing Instruction Register bits 15-0, with bits 15,14 marked "n n" used to Select Loader ROM nn, where nn is between binary 00 and 11. Counter (bits 7-0) contains LOADED ROM ADDRESS a. ROM nn shown as grid with octal addresses 0,1,2,3 / 4,5,6,7 / 10,11,12,13... Note: "Octal addresses range from 0 to 377. Each addressed location contains a 4-bit byte of data." Output to S-BUS bits 15-0, with lower 4 bits showing "rrrr was contents of ROM nn, address a".]*<br><br>Usage: Refer to the base set microroutine (appendix G), Initial Binary Loader for an example of the LDR micro-order use. Guidelines for writing loaders appear in section 7. See "NOTE" under IOI, page 4-32, and TAB "Usage", page 4-34. |
| M | Meaning: Place the 15-bit contents of the M-register on the S-bus. Bit 15 of the S-bus is zero. |
| MEU | Meaning: DMS signal generation micro-order used in conjunction with Special field micro-order MESP and Store field micro-order MEU. Eight different functions are performed (designated $O_0$ through $O_7$ for reference) by combinations of MESP and MEU. The combinations of these signals and their functions are described in section 7.<br><br>Usage: The DMS must be installed for the MEU and MESP micro-orders to be used. The DMS installation includes availability of the "standard" DMS Assembly language instructions which invoke the HP-written DMS microroutines. The MEU and MESP micro-orders are available for you to write microprograms using your DMS facility. You should thoroughly understand DMS before using these micro-orders. |

B-23

| MICRO-ORDER | DEFINITION |
|---|---|
| WORD TYPE I - S-BUS FIELD (CONT.) ||
| MPPA and MPPB | Meaning: Generate signals MPAEN and MPBEN (use to be defined by the user). (MPAEN is not used.)<br><br>Usage: Refer to the *HP 21MX M-Series and E-Series Computers I/O Interfacing Guide* for further information. Example microprogram use can be found in section 13 of this manual. |
| NOP | Meaning: All ones are on the S-bus.<br><br>Usage: This is the default micro-order when the S-bus field is not specified in a microinstruction. |
| P | Meaning: Place the content of the P-register on the S-bus. |
| S | Meaning: Place the content of the S-register on the S-bus. |
| SP | Meaning: Place the contents of the SP-register on the S-bus. |
| S1 thru S11 | Meaning: Place the contents of the indicated Scratch Register (S1 through S11) on the S-bus. |
| TAB | Meaning: Place the contents of the T-register (Memory Data Register) on the S-bus if neither AAF (A-Addressable flip-flop) nor the BAF (B-Addressable flip-flop) is set; place the contents of the A-register on the S-bus if the AAF is set; place the contents of the B-register on the S-bus if the BAF is set. Data on the M-bus (as it loads the M-register) determines the setting of AAF or BAF. Refer to AAF, BAF flip-flop setting information under the Store field TAB micro-order.<br><br>Usage: TAB may not be used in the S-bus and Store fields simultaneously. Data in the T-register must be removed within three microinstructions after the READ micro-order is used. A microinstruction with a TAB micro-order in the S-bus field must not be followed by a microinstruction with a DES, CNTR, or LDR S-bus field micro-order where the unspecified (and therefore, assumed to be "1") S-bus bits are required to be in a known state. The S-bus field TAB also must not be followed by a word type II microinstruction where the byte that is not the Operand is required to be in a known state. Refer to section 7 for considerations when using TAB. |
| X | Meaning: Place the contents of the X-register on the S-bus. |
| Y | Meaning: Place the contents of the Y-register on the S-bus. |
| WORD TYPE II - OP FIELD ||
| IMM | Meaning: Place 16 bits on the S-bus consisting of the 8-bit binary Operand and 8 bits of ones. Determination of which 8 bits of the S-bus receive the Operand and which 8 bits receive all ones is made by the Modifier field.<br><br>Usage: Refer to the word type II Modifier field micro-orders for Operand examples. |
| WORD TYPE II - SPECIAL FIELD ||
| (All Special field micro-orders are the same as for word type I.) ||

| MICRO-ORDER | DEFINITION |
|---|---|
| | WORD TYPE II - MODIFIER FIELD |
| CMHI | Meaning: The 16 bits received by the S-bus consist of the following:<br><br>Bits 15 through 8 = Operand (Refer to the information on word type II Operand.)<br>Bits 7 through 0 = all ones<br><br>The S-bus data is then complemented as it passes through the ALU.<br><br>Usage: See below<br><br>MICROINSTRUCTION<br><br>| OP | SPECIAL | MODIFIER | STORE | OPERAND |<br>|----|---------|----------|-------|---------|<br>| IMM | | CMHI | L | 367B |<br><br>S-bus:<br>| BIT NO | 15 | 14 | 13 | 12 | 11 | 10 | 9 | 8 | 7 | 6 | 5 | 4 | 3 | 2 | 1 | 0 |<br>|--------|----|----|----|----|----|----|---|---|---|---|---|---|---|---|---|---|<br>| CONTENT | 1 | 1 | 1 | 1 | 0 | 1 | 1 | 1 | 1 | 1 | 1 | 1 | 1 | 1 | 1 | 1 |<br><br>OPERAND (367B)<br><br>Result Out of ALU:<br>| BIT NO | 15 | 14 | 13 | 12 | 11 | 10 | 9 | 8 | 7 | 6 | 5 | 4 | 3 | 2 | 1 | 0 |<br>|--------|----|----|----|----|----|----|---|---|---|---|---|---|---|---|---|---|<br>| CONTENT | 0 | 0 | 0 | 0 | 1 | 0 | 0 | 0 | 0 | 0 | 0 | 0 | 0 | 0 | 0 | 0 |<br><br>OPERAND Complemented |
| CMLO | Meaning: The 16 bits received by the S-bus consist of the following:<br><br>Bits 15 through 8 = all ones.<br>Bits 7 through 0 = Operand. (Refer to the information on word type II Operand.)<br><br>The S-bus data is then complemented as it passes through the ALU.<br><br>Usage: See below<br><br>MICROINSTRUCTION<br><br>| OP | SPECIAL | MODIFIER | STORE | OPERAND |<br>|----|---------|----------|-------|---------|<br>| IMM | | CMLO | S2 | 020B |<br><br>S-bus:<br>| BIT NO | 15 | 14 | 13 | 12 | 11 | 10 | 9 | 8 | 7 | 6 | 5 | 4 | 3 | 2 | 1 | 0 |<br>|--------|----|----|----|----|----|----|---|---|---|---|---|---|---|---|---|---|<br>| CONTENT | 1 | 1 | 1 | 1 | 1 | 1 | 1 | 1 | 0 | 0 | 0 | 1 | 0 | 0 | 0 | 0 |<br><br>OPERAND<br><br>Result Out of ALU:<br>| BIT NO | 15 | 14 | 13 | 12 | 11 | 10 | 9 | 8 | 7 | 6 | 5 | 4 | 3 | 2 | 1 | 0 |<br>|--------|----|----|----|----|----|----|---|---|---|---|---|---|---|---|---|---|<br>| CONTENT | 0 | 0 | 0 | 0 | 0 | 0 | 0 | 0 | 1 | 1 | 1 | 0 | 1 | 1 | 1 | 1 |<br><br>OPERAND Complemented |

| MICRO-ORDER | DEFINITION |
|---|---|
| | WORD TYPE II - MODIFIER FIELD (CONT.) |
| HIGH | Meaning: The 16 bits received by the S-bus consist of the following:<br><br>Bits 15 through 8 = Operand. (Refer to the information on word type II Operand.)<br>Bits 7 through 0 = all ones.<br><br>The S-bus data is then passed through the ALU without modification.<br><br>Usage: See below.<br><br>MICROINSTRUCTION:<br>| OP | SPECIAL | MODIFIER | STORE | OPERAND |<br>|---|---|---|---|---|<br>| IMM | | HIGH | S5 | 232B |<br><br>S-bus and Result Out of ALU:<br>| BIT NO. | 15 | 14 | 13 | 12 | 11 | 10 | 9 | 8 | 7 | 6 | 5 | 4 | 3 | 2 | 1 | 0 |<br>|---|---|---|---|---|---|---|---|---|---|---|---|---|---|---|---|---|<br>| CONTENT | 1 | 0 | 0 | 1 | 1 | 0 | 1 | 0 | 1 | 1 | 1 | 1 | 1 | 1 | 1 | 1 |<br><br>Bits 15–8 = OPERAND |
| LOW | Meaning: The 16 bits received by the S-bus consist of the following:<br><br>Bits 15 through 8 = all ones.<br>Bits 7 through 0 = Operand. (Refer to the information on the word type II Operand.)<br><br>The S-bus data is then passed through the ALU without modification.<br><br>Usage: See below.<br><br>MICROINSTRUCTION:<br>| OP | SPECIAL | MODIFIER | STORE | OPERAND |<br>|---|---|---|---|---|<br>| IMM | | LOW | S11 | 111B |<br><br>S-bus and Result Out of ALU:<br>| BIT NO. | 15 | 14 | 13 | 12 | 11 | 10 | 9 | 8 | 7 | 6 | 5 | 4 | 3 | 2 | 1 | 0 |<br>|---|---|---|---|---|---|---|---|---|---|---|---|---|---|---|---|---|<br>| CONTENT | 1 | 1 | 1 | 1 | 1 | 1 | 1 | 1 | 0 | 1 | 0 | 0 | 1 | 0 | 0 | 1 |<br><br>Bits 7–0 = OPERAND |

| MICRO-ORDER | DEFINITION |
|---|---|
| | WORD TYPE II - STORE FIELD |
| | (All Store field micro-orders are the same as for word type I.) |
| | WORD TYPE II - OPERAND FIELD |
| | The Operand (eight bits) must be an integer (used as a constant). The integer can be an octal or decimal number within the following constraints:<br><br>a. The decimal number must be in the range 0 to 255.<br><br>b. The octal number must be in the range 0 to 377, followed by "B".<br><br>Examples:<br><br>    117B.    117.    198.    5.    10B |
| | WORD TYPE III - BRANCH FIELD |
| JMP | Meaning: Branch to the CM address specified in the Address field of word type III if the condition in the Condition (and Branch Sense) field is met. If the Branch Sense field is blank (RJS not specified), make the microbranch if the condition specified in the Condition field is true. If RJS is specified in the Branch Sense field, make the microbranch if the condition specified in the Condition field is false.<br><br>Usage: Used in conjunction with Special field micro-order CNDX for word type III to branch in a microprogram if conditions are met as described in the Condition and Branch Sense fields. For example:<br><br>  BRANCH    SPECIAL    CONDITION    BRANCH SENSE    ADDRESS<br>  JMP    CNDX    AL15        *+2<br><br>A microbranch will occur if bit 15 of the ALU output was set during execution of the last word type I or II microinstruction.<br><br>  BRANCH    SPECIAL    CONDITION    BRANCH SENSE    ADDRESS<br>  JMP    CNDX    AL15    RJS    ADDRESS<br><br>Here, a microbranch will occur if bit 15 of the ALU output was not set. If bit 15 was set, the next sequential microinstruction will be executed (no microbranch takes place). |
| JSB | Meaning: Perform a branch to the CM address specified in the Address field of word type III if the condition in the Condition (and Branch Sense) field is met. If RJS is not specified in the Branch Sense field, the microbranch will be made if the condition specified in the Condition field is true. If RJS is specified, the microbranch will be made if the condition is false. If the branch is made, the current microinstruction address plus one is pushed onto the Save Stack to be used as the return address.<br><br>Usage: Three levels of microsubroutine branches can be made. |

| MICRO-ORDER | DEFINITION |
|---|---|
| WORD TYPE III - BRANCH FIELD (CONT.) ||
| RTN | Meaning: Branch to a return address, i.e., branch by "popping" the Save Stack into the CMAR using the address in the Save Stack. Note that there are three levels of microsubroutine branches (JSB's) so there can be three levels of RTN. |
| | Usage: For word type III, CNDX is always specified in the Special field and the "pop" operation is made *only* if the state in the Condition and Branch Sense fields is met. Otherwise, the next microinstruction is executed. |
| | Also of interest may be the discussions of JSB for word types I and III and special considerations about returns when the word type I Special field mnemonics ASG and SRG2 are used. |
| WORD TYPE III - SPECIAL FIELD ||
| CNDX | Meaning: This Special field micro-order specifies word type III - conditional branches and returns. |
| | Usage: Used in conjunction with JMP, JSB, or RTN in the Branch field. |
| WORD TYPE III - CONDITION FIELD ||
| ALZ | Meaning: The ALU output was equal to zero as a result of the last word type I or II microinstruction execution. |
| AL0 | Meaning: Bit zero of the last output from the ALU was set by the last word type I or II microinstruction execution. |
| AL15 | Meaning: Bit 15 of the last output from the ALU was set by the last word type I or II microinstruction execution. |
| CNT4 | Meaning: The last four bits of the counter are zeros. |
| CNT8 | Meaning: All eight bits of the counter (lower byte of the IR) are zeros. |
| COUT | Meaning: The ALU Carry Out flag bit was set by the last ALU operation in the last word type I or II microinstruction execution. |
| E | Meaning: The Extend (E) register bit is set. |
| FLAG | Meaning: The CPU flag bit is set. |
| HOI | Meaning: The Operator Panel RUN/HALT switch is not set to RUN or there is an interrupt pending (i.e., halt-or-interrupt). |
| | Usage: This micro-order is used to check for interrupts. Use is necessary because microprograms cannot be interrupted unless a check for interrupts is made. Refer to section 7 for considerations in using HOI. |
| IR8 | Meaning: Bit 8 of the IR is set. |
| IR11 | Meaning: Bit 11 of the IR is set. |
| L0 | Meaning: Bit zero of the L-register is set. |
| L15 | Meaning: Bit 15 of the L-register is set. |

B-28

| MICRO-ORDER | DEFINITION |
|---|---|
| WORD TYPE III - CONDITION FIELD (CONT.) ||
| MPP | Meaning: Test for a signal $\overline{MPP}$ (use to be defined by the user) received at the MPP.<br><br>Usage: Used in conjunction with the MPP1 and MPP2 Special field micro-orders and with MPPA and MPPB Store and S-bus field micor-orders of word type I microinstructions. Refer to the *HP 21MX M-Series and E-Series Computers I/O Interfacing Guide* for further information. Example microprogram use will be found in section 13 of this manual. |
| MRG | Meaning: A Memory Reference Group instruction is in the IR, i.e., IR bits 14, 13, and 12 are not all zero. |
| NDEC | Meaning: The Operator Panel DEC M m pushbutton is not actuated. |
| NINC | Meaning: The Operator Panel INC M m pushbutton is not actuated. |
| NINT | Meaning: An interrupt is not pending. |
| NLDR | Meaning: The Operator Panel IBL TEST pushbutton is not actuated. |
| NLT | Meaning: The Operator Panel Register Select (left) pushbutton is not actuated. |
| NMDE | Meaning: The Operator Panel MODE pushbutton is not actuated. |
| NMLS | Meaning: Memory was not lost as a result of the last power down or power failure. |
| NRT | Meaning: The Operator Panel Register Select (right) pushbutton is not actuated. |
| NSFP | Meaning: A standard Operator Panel is not installed on the computer. |
| NSNG | Meaning: The Operator Panel INSTR STEP pushbutton is not actuated. |
| NSTB | Meaning: None of the following Operator Panel pushbuttons are actuated:<br><br>INSTR STEP<br>Register Select right (→)<br>Register Select left (←)<br>MODE<br>IBL TEST<br>INC M m<br>DEC M m<br>STORE<br>RUN<br>PRESET |
| NSTR | Meaning: The Operator Panel STORE pushbutton is not actuated. |
| ONES | Meaning: All 16 bits of the last output from the ALU were set (tested before the Rotate Shifter) as a result of the last word type I or II microinstruction execution. |
| OVFL | Meaning: The Overflow register bit is set. |
| RUN | Meaning: The computer's Run flip-flop is set. |

B-29

| MICRO-ORDER | DEFINITION |
|---|---|
| \multicolumn{2}{c}{WORD TYPE III - CONDITION FIELD (CONT.)} ||
| RUNE | Meaning: The Operator Panel key operated switch is in the OPERATE position.<br><br>NOTE<br><br>In LOCK position, the RUN and HALT switches are disabled. Microroutines will not be executing while switch is in the R or STANDBY positions. |
| SKPF | Meaning: The I/O signal SFS is present (I/O time is T3 to T5) and the addressed I/O device flag is set; or, the I/O signal SFC is present (I/O time is T3 to T5) and the addressed I/O device flag is clear<br><br>Usage: Refer to section 7 for information on I/O microprogramming considerations for use of the SKPF micro-order. |
| \multicolumn{2}{c}{WORD TYPE III - BRANCH SENSE FIELD} ||
| RJS | Meaning: Perform the branch or return specified in the Branch field if the condition specified in the Condition field is *not* met. The Condition field micro-order specifies the condition under which a branch or return can take place; the RJS micro-order in effect reverses the sense of the condition. For example, if a conditional branch is specified if the Flag bit is set (jump if Flag bit set), the RJS micro-order will reverse the condition so that the branch occurs if the Flag bit is not set.<br><br>If the Branch Sense field is blank (NOP), the condition sense is not reversed (i.e., is the same as described in each of the Condition field micro-orders). |

B-30

| MICRO-ORDER | DEFINITION |
|---|---|
| | WORD TYPE III - ADDRESS FIELD |

A branch may be made to any address in the current or next $512_{10}$ word control memory block for word type III. The entry for the microassembler format can be an octal, decimal, or a computed address.

A decimal address (d) must be in the range 0 to 511. An octal address (kB) must be in the range 0B to 777B, where the "B" signifies octal. If the word type III is located in the last address in a $512_{10}$ word block (i.e., address is $xx777_8$), the range is defined as the next $512_{10}$ word block. A computed address which is within the decimal or octal range must be in one of the following forms:

```
*+d
*-d
LABEL+d
LABEL-d
*+kB
*-kB
LABEL+kB
LABEL-kB
LABEL
``` where

*     means "this address"

d     means a decimal number k     means an octal number (followed by B).

LABEL     means a microinstruction or pseudo-instruction label that is defined elsewhere in the microprogram.

Examples

| BRANCH | SPECIAL | CONDITION | BRANCH SENSE | ADDRESS |
|---|---|---|---|---|
| JMP | CNDX | NSNG | | *+2 |
| JMP | CNDX | FLAG | | *-4 |
| JSB | CNDX | CNT4 | RJS | FETCH+1 |
| JSB | CNDX | IR8 | | TIME-4 |
| JMP | CNDX | IR11 | RJS | *+7B |
| JMP | CNDX | LO | | *-2B |
| JMP | CNDX | ALZ | | LOOP |
| RTN | CNDX | ALZ | RJS | |

NOTE

When RTN is encoded in the Branch field, no address should be encoded. The address in the Save Stack is used to load the CMAR.

Except as noted above, the target address of the branch must be within the current 1000 octal (512 decimal) locations (two modules). The complete absolute address must be specified. For example, if a conditional branch microinstruction is within CM addresses 03000 and 03777, no target address may be outside the range 03000 to 03777.

Refer to section 6 for additional information on CM addressing. Refer to section 8 for information on using the RTE Microassembly language.

B-31

| MICRO-ORDER | DEFINITION |
|---|---|
| | WORD TYPE IV - BRANCH FIELD |
| JMP | Meaning: Branch unconditionally to the address (may be modified by a Modifier Special field micro-order) specified in the Address field. The address may be anywhere in the 16K word CM.<br><br>Usage: Refer to the Modifier/Special field micro-orders and the Address field discussions. |
| JSB | Meaning: Branch unconditionally to the microsubroutine located at the CM address (may be modified by a Modifier/Special field micro-order) specified in the Address field. The return address is stored on top of the Save Stack and recalled by the RTN micro-order.<br><br>Usage: Refer to information in the word type III Branch field JSB description. Also refer to the RTN micro-order discussion for the word type I Special field for additional information. |
| | WORD TYPE IV - MODIFIER/SPECIAL FIELD |
| IOFF | Meaning: Turn off the Interrupt Enable flag to disable recognition of normal interrupts. (Does not disable power fail, Memory Protect, or parity interrupts.)<br><br>Usage: No modification is made to the microbranch address when this micro-order is used in a word type IV microinstruction. After three occurrences of INCI, IAK, or FTCH in the Special field of a word type I microinstruction, interrupts are again recognized if Memory Protect is installed. IOFF should be used with caution since holding off interrupts could cause the loss of input or output data. Refer to section 7 for interrupt handling. |
| IOG | Meaning: Freeze the CPU until time period T2. Then enable the generation of I/O timing signals dependent upon the instruction in the IR. Perform the JMP or JSB in the word type IV Branch field while modifying the fourth and third bits (bits 8 and 7, figure 4-2) of the Address field (according to the I/O instruction jump table) for the final address. Bits 8, 7, and 6 of the IR determine the microbranch address modification as follows:<br><br>| ASSEMBLY LANGUAGE INSTRUCTION IN IR | IR BITS 8, 7, 6 | ADDRESS FIELD BITS 8 AND 7 REPLACED BY: |<br>|---|---|---|<br>| MIA or MIB | 1 0 0 | 0 0 |<br>| LIA or LIB | 1 0 1 | 0 1 |<br>| OTA or OTB | 1 1 0 | 1 0 |<br>| HLT | 0 0 0 | 1 1 |<br>| CLO or CLF | 0 0 1 | 1 1 |<br>| STO or STF | 0 0 1 | 1 1 |<br>| SFC or SOC | 0 1 0 | 1 1 |<br>| SFS or SOS | 0 1 1 | 1 1 |<br>| STC or CLC | 1 1 1 | 1 1 |<br><br>Usage: IOG can also be used in the Special field of word type I, but there is no microbranch address modification since the JMP or JSB is not present. Familiarity with the I/O system is mandatory to properly use this micro-order. Refer to section 7 for more information about forming and executing I/O microinstructions. |

| MICRO-ORDER | DEFINITION |
|---|---|
| WORD TYPE IV - MODIFIER/SPECIAL FIELD (CONT.) ||
| ION | Meaning: Turn the Interrupt Enable flag on and allow the CPU to recognize standard device interrupts until the micro-order IOFF is executed. Modify the first and second bits (bits 6 and 5, figure 4-2) of the Address field two least significant bits according to bits 1 and 0 of the IR (i.e., IR bits 1 and 0 replace bits 6 and 5 in the Address field). |
| | Usage: An interrupt from any I/O device can be detected in two ways: |
| | a  If a JTAB is executed and an interrupt is pending or the Run flip-flop is clear, execution is forced to location 6 in CM. |
| | b  A test for interrupt pending or Run flip-flop clear can be performed by the executing microprogram by having an HOI encoded in the Condition field of a word type III microinstruction. Or a test for interrupt pending can be made by having NINT encoded in the Condition field. The micro-order ION allows interrupts to be recognized. However, interrupts are not generated by the interrupt system unless a STF 01 O control command has been executed. Refer to the discussion of the interrupt system in the *HP 21MX E-Series Computer Reference Manual*. Refer to section 7 for considerations for interrupt handling. |
| J74 | Meaning: Modify the four least significant bits of the Address field (bits 8, 7, 6 and 5, figure 4-2) with bits 7 through 4 of the IR, i.e., IR bits 7 through 4 replace bits 8 through 5 in the microbranch Address field to determine the actual JMP or JSB address. |
| NOP | Meaning: No operation. This is the default operation if no other micro-order is specified in the Special field for word type IV. No modification is made to the JMP or JSB address. |
| RJ30 | Meaning: Modify the four least significant bits of the Address field (bits 8, 7, 6 and 5, figure 4-2) with bits 3 through 0 of the IR and begin a READ operation of main memory; i.e., IR bits 3 through 0 replace bits 8 through 5 in the branch Address field to determine the actual JMP or JSB address. The READ operation is the same as described for the word type I OP field. |
| | Usage: Refer to the word type I OP field READ micro-order definition for M-register considerations. |
| RPT | Meaning: Repeat the next microinstruction for the number of times specified by the positive number in the least significant four bits of the (IR) counter. No modification to the microbranch Address field is made. |
| | Usage: Same as for the word type I and II Special field RPT micro-order. |
| STFL | Meaning: Set the CPU flag and then perform the JMP or JSB to the address specified in the Address field. No modification is made to the address. |

| MICRO-ORDER | DEFINITION |
|---|---|
| | WORD TYPE IV - ADDRESS FIELD |

A branch may be made to any address in CM. The entry for the microassembler format can be an octal, decimal, or computed address. Same as requirements for the Address field in word type III.

A decimal address (d) must be in the range 0 to 16383. An octal address (kB) must be in the range 0B to 37777B, where the "B" signifies octal. A computed address which is within the decimal or octal range must be in one of the following forms:

*+d

+-d

LABEL +d

LABEL -d

*+kB

*-kB

LABEL +kB

LABEL -kB
LABEL where:

*    means "this address"

d    means a decimal number.

k    means an octal number (followed by B).

LABEL    means a microinstruction or pseudo-instruction label that is defined elsewhere in the microprogram.

Examples:

| BRANCH | MODIFIER/ SPECIAL | (NO ENTRY) | (NO ENTRY) | ADDRESS |
|---|---|---|---|---|
| JSB | IOFF | | | *+11 |
| JMP | | | | FETCH |

(Refer to the word type III Address field examples.)

Refer to section 6 for additional information on CM addressing. Refer to section 8 for information on using the RTE Microassembly language.

B-34

APPENDIX C

| ABBREVIATION | DEFINITION |
|---|---|
| AAF | A-Addressable Flip-flop |
| ACM | Association of Computer Manufacturers |
| ALU | Arithmetic Logic Unit or ALU field (word type I microinstruction) |
| ASG | Alter-Skip Group (machine instruction category) |
| BAF | B-Addressable Flip-flop |
| BKTBL | Breakpoint table (MDE) |
| BRCH | Branch micro-order field, word type III or IV microinstruction |
| BSM | Batch Spool Monitor (RTE subsystem software module) |
| CIR | Central Interrupt Register |
| CM | Control memory |
| CMAR | Control Memory Address Register |
| CNDX | Condition field, word type II microinstruction |
| CNTL | Control |
| CNTR | Counter, either the lower eight bits of the Instruction Register or a micro-order. |
| COND | Condition field, word type III microinstruction |
| CPU | Central Processor Unit |
| CRT | Cathode ray tube (console device) |
| DCPC | Dual Channel Port Controller (computer accessory) |
| DMS | Dynamic Mapping System |
| DSPI | Display indicator register or a micro-order |
| DSPL | Display register or a micro-order |
| EAG | Extended Arithmetic Group (machine instruction category) |
| EAU | Extended Arithmetic Unit (machine category) |
| EDITR | RTE System Interactive Editor software module |
| EIG | Extended Instruction Group (machine instruction category) |
| EOF | End of file |
| EQT | RTE system equipment table |
| ESP | Engineering supplement package |
| EXEC | RTE system call to operating system |
| FF | Flip-flop (single-bit storage element) |
| FFP | Fast FORTRAN Processor (computer accessory) |
| FFT | Fast Fourier Transform |
| FMGR | File Manager (RTE system) |
| IO | Input Output |
| IBL | Initial Binary Loader |
| IC | Integrated circuit |
| IOG | Input-Output Group (machine instruction category) |
| IR | Instruction Register |
| KBS | Kilobytes per second |
| KPS | Kilopairs per second |
| KWS | Kilowords per second |

| ABBREVIATION | DEFINITION |
|---|---|
| LED | Light-Emitting Diode (indicators on the computer) |
| LG | Load and Go (tracks in RTE system) |
| LOADR | RTE system loader (program name) |
| LS | Logical Source (tracks in RTE system) |
| LU | RTE system Logical Unit designator |
| M | M-register |
| MDE | Microdebug Editor (microprogramming support software) |
| MDEP | Name for MDE user scheduled (stand-alone) program |
| MDES | Name for MDE callable (subroutine) program |
| MEAR | Memory Address Register (DMS) |
| MEM | Memory Expansion Module (part of DMS) |
| MICRO | Program name for RTE Microassembler (microprogramming support software) |
| MIR | Microinstruction Register |
| MJL | Microjump Logic |
| MOD | Modifier field, word type II microinstruction |
| MP | Memory Protect |
| MPP | Multiprogrammable Processor Port |
| MRG | Memory Reference Group (machine instruction category) |
| MXREF | Name for RTE Microassembler Cross-Reference Generator (microprogramming support software) |
| OP | Operation field, word type I and II microinstructions |
| P | P-register |
| pROM | Programmable Read-Only Memory (integrated circuits) |
| PTGEN | Program name for pROM Tape Generator (microprogramming support software) |
| R-S | Rotate/shift (logic) |
| RAM | Random Access Memory |
| ROM | Read-Only Memory (used in control memory, map logic, etc.) |
| RPL | Remote Program Load Configuration switches |
| RTE | Real Time Executive (operating system) |
| RU | RTE system command designation |
| SC | Select code |
| SRG | Shift-Rotate Group (machine instruction category) |
| STR | Store field, word type I and II microinstructions |
| SYS | System |
| TTY | Teleprinter (console device) |
| UCS | User Control Store |
| UIG | User Instruction Group (machine instruction category) |
| USR | User |
| WCS | Writable Control Store |
| WCSLT | WCS logical unit table |
| WLOAD | WCS I/O Utility (library) routine (microprogramming support software) |
| XFER | Transfer |

APPENDIX D

Remote Program Load Microroutine

```
*
HALT      JMP  CNDX FLAG      *+2
               DEC  S1        P
               PASS M         S1
          JSB  CNDX NMLS RJS  MEMLOST    TEST FOR COLD POWER UP
               CLFL CMPS S    DES        S := DESCRIPTOR BLOCK
          JMP  CNDX ALD  RJS  *+3        TEST FOR SWITCH 1
          JMP  CNDX NSFP      RPL        TEST FOR NO FRONT PANEL
          JMP  CNDX RUNE RJS  RPL        TEST FOR LOCK POSTION OF POWER SWITCH
          JMP  CNDX NSFP      USER       USER FRONT PANEL MODULE
               PASS S         DSPL       S := DISPLAY REGISTER
               ZERO S3                   CLEAR DMS MAP POINTER
          JMP  CNDX NSNG RJS  WAIT       TEST FOR INSTRUCTION STEP
          IMM       LOW  DSPI 3678       PLACE T-POINTER IN DISPLAY INDICATOR
*
WAIT      JSB                 DSPICODE   BINARY ENCODE OF DISPLAY INDICATOR
          JSB  RJ30           UPDATES    UPDATE DISPLAY REGISTER
          JMP  CNDX NSTB RJS  *          WAIT FOR BUTTON TO BE RELEASED
               INCI ZERO
               JTAB DBLS                 INITIALIZE SAVE STACK
          JMP  CNDX RUN       RUN
          JMP  CNDX NSTB      *-1        WAIT FOR BUTTON TO BE PRESSED
*
JSBSCAN   JSB                 SCAN       GO TO SCAN SUBROUTINE
          JMP                 WAIT

SCAN           INC  S2        M          S2 := M+1
          JMP  CNDX NLT  RJS  LEFT       LEFT
          JMP  CNDX NRT  RJS  RIGHT      RIGHT
          JMP  CNDX NINC RJS  INCM       INC M
          JMP  CNDX NDEC RJS  DECM       DEC M
          JMP  CNDX NLOD RJS  LOADER     IBL/TEST
          JMP  CNDX NSTR RJS  STORE      STORE
          JMP  CNDX NMDE RJS  MODE       MODE
          JMP  CNDX NSNG RJS  INSTP      INSTRUCTION STEP
          JMP  CNDX RUN  RJS  WAIT+2     PRESET
*
RUN       IMM  CLFL LOW  DSPI 3378       PLACE S-POINTER INTO DISPLAY INDICATOR
INSTP     JSB  CNDX FLAG      MODE       TEST FOR INVERSE VIDEO
          READ SPUN INC  PNH  P          M := P; P := P+1; READ
               PASS DSPL      S          PLACE S IN DISPLAY REGISTER
               PASS S1        TAB        S1 := T/A/B
          READ FTCH PASS IRCM S1         IR := S1; M := OPERAND ADDRESS; READ
          JMP  CNDX NSNG      FETCH+1    TEST FOR NOT SINGLE INSTRUCTION
               SHLT PASS      S1
          JMP                 FETCH+1    COMPLETE FETCH
*
MODE           CMPS S1        DSPI       S1 := COMPLEMENTED INDICATOR BITS
          JMP  CNDX FLAG      *+2
          RTN  STFL PASS DSPI S1         REVERSE INDICATOR BITS; COMPLEMENT FLAG
          RTN  CLFL PASS DSPI S1         REVERSE INDICATOR BITS; COMPLEMENT FLAG
```

D-1

```
LEFT            R1    PASS S      DSPI      SHIFT DISPLAY   ICATOR
        JMP     CNDX  FLAG        *+4       TEST FOR REVER   DISPLAY MODE
        JMP     CNDX  ALO   RJS   *+2       TEST FOR WRAP-AROUND
        RTN           PASS  DSPI  S1
        IMM     RTN   LOW   DSPI  337B      PLACE S-POINTER IN DISPLAY INDICATOR
        JMP     CNDX  ALO   RJS   *+2       TEST FOR WRAP-AROUND
        IMM     RTN   LOW   DSPI  040B      PLACE S-POINTER IN DISPLAY INDICATOR
        IMM           LOW   L     077B      L := 77
                      AND   S1    S1        MASK DISPLAY INDICATOR
        RTN           PASS  DSPI  S1
RIGHT   JMP     CNDX  FLAG        *+6       TEST FOR REVERSE DISPLAY MODE
        IMM     STFL  LOW   L     277B      L := 177677
        LWF     LI    PASS  S1    DSPI      SHIFT DISPLAY INDICATOR LEFT ONE PLACE
        CLFL    IOR   DSPI  S1
        RTN     CNDX  ONES                  TEST FOR NO WRAP-AROUND
        IMM     RTN   LOW   DSPI  376B      PLACE A-POINTER IN DISPLAY INDICATOR
                LI    PASS  S1    DSPI
        IMM           CMLO  L     277B      L := 100
                      AND   DSPI  S1        MASK DISPLAY INDICATOR
        RTN     CNDX  ALZ                   TEST FOR NO WRAP-AROUND
        IMM     RTN   LOW   DSPI  001B      PLACE X-POINTER IN DISPLAY INDICATOR
*
DECM    JMP     CNDX  FLAG        DECDMS    TEST FOR REVERSE DISPLAY MODE
                DEC   S2          M         DECREMENT M
INCM    JMP     CNDX  FLAG        INCDMS    TEST FOR REVERSE DISPLAY MODE
        RTN           PASS  M     S2
*
DECDMS  RTN           DEC   S3    S3        DECREMENT DMS MAP POINTER
INCDMS  RTN           INC   S3    S3        INCREMENT DMS MAP POINTER
*
STORE   JSB                       DSPICODE  BINARY ENCODE OF DISPLAY INDICATOR
        JSB     RJ30              STORES    STORE DISPLAY REGISTER
        JMP                       WAIT
*

ALGN
STORES  RTN           PASS  S     DSPL      S := DISPLAY REGISTER
STOREP  RTN           PASS  P     DSPL      P := DISPLAY REGISTER
        JMP                       STORET
STOREM  RTN           PASS  M     DSPL      M := DISPLAY REGISTER
STOREB  RTN           PASS  B     DSPL      B := DISPLAY REGISTER
STOREA  RTN           PASS  A     DSPL      A := DISPLAY REGISTER
STOREST JMP                       STCPUS
STOREF  JMP                       STFENCE
STOREMM RTN     RESP  PASS  NEW   DSPL      DMS MAP DATA := DISPLAY REGISTER
STOREMN RTN           PASS  S2    DSPL      DMS MAP NUMBER := DISPLAY REGISTER
STOREY  RTN           PASS  Y     DSPL      Y := DISPLAY REGISTER
STOREX  RTN           PASS  X     DSPL      X := DISPLAY REGISTER
STFENCE IMM           HIGH  L     007B      L := 003777
                      AND   S1    DSPL      MASK DISPLAY REGISTER
                      PASS  NEW   NEW
        RTN           PASS  NEW   S1        STORE INTO DMS FENCE
STCPUS          COV   PASS  S4    M         SAVE M
                LI    PASS  S1    DSPL
        JMP     CNDX  AL15  RJS   *+2       TEST FOR DISPLAY 14
        SOV
        IMM           LOW   IRCM  200B      SET UP ELB INSTRUCTION
                SRG1  PASS  S1    S1        STORE DISPLAY 14 INTO EXTEND
        IMM           CMLO  S2    277B      S2 := STF 0 INSTRUCTION
                      PASS        S1
        JMP     CNDX  AL15        *+2       TEST FOR INTERRUPT SYSTEM
        IMM           CMMI  S2    375B      S2 := CLF 0 INSTRUCTION
                IOG   PASS  IRCM  S2
        RTN           PASS  M     S4        RESTORE M
STORET  WRTE          PASS  TAB   DSPL      T := DISPLAY REGISTER
                      PASS  M     S2        INCREMENT M
        JMP                       WAIT+2    DO NOT UPDATE DISPLAY
*
USER    JMP                       33000B    JUMP TO USER FRONT PANEL ROUTINE
```

D-2

```
UPDATES    RTN          PASS DSPL S        DISPLAY REGISTER := S
UPDATEP    RTN          PASS DSPL P        DISPLAY REGISTER := P
UPDATET    RTN          PASS DSPL TAB      DISPLAY REGISTER := T
UPDATEM    RTN          PASS DSPL M        DISPLAY REGISTER := M
UPDATEB    RTN          PASS DSPL B        DISPLAY REGISTER := B
UPDATEA    RTN          PASS DSPL A        DISPLAY REGISTER := A
UPDATEST   JMP               UPDCPUS
UPDATEF    JMP               UPDFENCE
UPDATEMM   RTN   MESP PASS DSPL MEU        DISPLAY REGISTER := DMS MAP DATA
UPDATEMN   RTN        PASS DSPL S2         DISPLAY REGISTER := DMS MAP NUMBER
UPDATEY    RTN        PASS DSPL Y          DISPLAY REGISTER := Y
UPDATEX    RTN        PASS DSPL X          DISPLAY REGISTER := X
UPDFENCE              PASS MEU  MEU
           RTN        PASS DSPL MEU        DISPLAY REGISTER := DMS STATUS/FENCE REG
UPDCPUS    IMM        CMWI L    177B       L := 100000
                      PASS S2   M          SAVE M
           IMM        CMLO S1   077B       S1 := 000300   SFS 0
                IOG   PASS IRCM S1         IR := SFS 0
                      ZERO S1              INITIALIZE CPU STATUS WORD
           JMP   CNDX SKPF RJS  *+2        TEST FOR INTERRUPT SYSTEM ON
                 R1   ADD  S1   S1         S1 := 040000
           JMP   CNDX E    RJS  *+2        TEST FOR EXTEND SET
                      ADD  S1   S1
                 R1   PASS S1   S1
           JMP   CNDX OVFL RJS  *+2        TEST FOR OVERFLOW SET
                      ADD  S1   S1
                      PASS L    CIR        L := CIR
                      IOR  S1   S1         MERGE IN CIR
                      PASS M    S2         RESTORE M
           RTN        PASS DSPL S1         DISPLAY := E,O,I, AND CIR

DSPICODE   IMM        LOW  CNTR 372B       CNTR := 000372
                 L4   CMPS S1   DSP1       S1 := NDSP1 SHIFTED LEFT FOUR
           JMP   CNDX FLAG RJS  *+4        TEST FOR NO REVERSE DISPLAY MODE
           IMM        LOW  CNTR 000B       CNTR := 000
           IMM        HIGH L    000B       L := 000377
                 L4   XWOR S1   DSP1
                 ICNT DBLS S1   S1         LEFT SHIFT S1; INCREMENT COUNTER
           JMP   CNDX AL15 RJS  *-1        TEST FOR INDICATOR BIT
           IMM        CMLO L    200B       L := 177
                      AND  S3   S3         MASK DMS MAP POINTER
           IMM        CMWI L    337B       L := 020000
                      IOR  S1   S3         MERGE DMS CONTROL BIT
           READ RTN   PASS MEU  S1         LOAD DMS MAP ADDRESS REGISTER
*
RPL        JSB                  LOADER     GO TO LOADER SUBROUTINE
           JMP                  RUN        REMOTE PROGRAM LOAD
```

```
*
*       INITIAL BINARY LOADER
*       ---------------------
*
LOADER   IMM   SOV   HIGH  S1    177B       S1 := 077777
                     PASS  IRCM  S          IR := S TO SET UP LOADER SELECTION
MEMSIZE  IMM         LOW   L     300B       L  := 177700
               AND   PHM   S1               M  := S1; P := S1 AND L
         RTN   CNDX  AL15                   TEST FOR NO READ/WRITE CAPABILITY
         WRTE        PASS  TAB   P          WRITE INTO MEMORY
         IMM         CMHI  L     357B       L  := 010000
         READ        SUB   S1    S1         READ BACK FROM MEMORY
                     PASS  L     P          L  := WRITTEN DATA
                     XOR         TAB        COMPARE
         JMP   CNDX  ALZ   RJS   MEMSIZE    TEST FOR PRESENT MEMORY
                     PASS  S1    P          S1 := P
*
SELCODE  IMM   L4    CMLO  S2    003B       S2 := 007700
                     PASS  L     S2
         IMM         LOW   CNTR  006B       COUNTER := 6
               RPT   PMD   S2    S          MASK SELECT CODE
               R1    PASS  S2    S2         SHIFT SELECT CODE SIX PLACES RIGHT
         IMM         CMLO  L     367B       L  := 000010
                     SUB   S2    S2         S2 := SELECT CODE -10
         RTN   CNDX  AL15                   TEST FOR SELECT CODE LESS THAN 10
*
LOOP                 PASS  M     S1
               L4    PASS  S1    LDR
               ICNT  PASS  L     S1         THE FIRST PART OF THIS LOOP
               L4    AND   S1    LDR        ROUTINE PACKS EACH FOUR BIT
               ICNT  PASS  L     S1         SEGMENT FROM THE SPECIFIED
               L4    AND   S1    LDR        LOADER ROM INTO A 16-BIT WORD
               ICNT  PASS  L     S1
               COV   HAND  S1    LDR

IMM   ICNT  CMHI  L     043B       L := 172000
                     AND   S3    S1
         IMM         HIGH  L     173B       L := 075777
                     XMOR        S3
         JMP   CNDX  ALZ   RJS   STWORD     TEST FOR I/O INSTRUCTION
         IMM   L1    CMLO  S3    037B       S3 := 000700
                     PASS  L     S3
                     AND         S1
         JMP   CNDX  ALZ         STWORD     TEST FOR HALT INSTRUCTION
         IMM         CMLO  L     307B       L := 000070
                     AND         S1
         JMP   CNDX  ALZ         STWORD     TEST FOR SELECT CODE LESS THAN 10
                     PASS  L     S2
                     ADD   S1    S1         PATCH IN CONFIGURING SELECT CODE
STWORD   WRTE        PASS  TAB   S1         WRITE WORD INTO MEMORY
                     INC   S1    M
         JMP   CNDX  CNT8  RJS   LOOP       TEST FOR LOADER COMPLETION
                     CMPS  S1    P          TWOS COMPLEMENT LAST AVAILABLE
                     INC   S1    S1         WORD OF PROGRAM MEMORY AND
         WRTE        PASS  TAB   S1         STORE INTO LAST LOADER ADDRESS
                     DEC   S1    M
         READ        PASS  M     S1
                     PASS  L     S2         PATCH SELECT CODE INTO
                     ADD   S1    TAB        PORT CONTROLLER WORD 1
         WRTE        PASS  TAB   S1         STORE PORT CONTROLLER  WORD 1
         JSB                     CPTEST     PERFORM QUICK PROCESSOR TEST
```

D-4

```
*
*       FIRMWARE DIAGNOSTICS
*       --------------------
*
TEST32K  READ          DEC   S1    M              S1 := M - 1; READ MEMORY WORD
         RTN   CNDX    ALZ                        CHECK FOR TEST COMPLETION
                       CMPS  S2    TAB            S2 := COMPLEMENTED DATA
         WRTE          PASS  TAB   S2             T/A/B := COMPLEMENTED DATA; WRITE
         READ          PASS  L     S2             L := COMPLEMENTED DATA
                       CMPS  S2    S2             S2 := ORIGINAL DATA
                       XOR         TAB            COMPARE
         JMP   CNDX    ALZ   RJS   FAILURE        TEST FOR MEMORY FAILURE
         WRTE          PASS  TAB   S2             T/A/B := ORIGINAL DATA; RESTORE MEMORY
                       PASS  M     S1
         JMP                       TEST32K
*
CPTEST   IMM   LI      LOW   S1    325B           S1 := 177652
         IMM           HIGH  L     252B           L  := 125377
               CLFL    AND   S1    S1             S1 := 125252
         JSB                       REGTEST
               STFL    PASS  S1    S2             S1 := 052525
*
REGTEST        SOV     CMPS  S2    S1             S2  := NS1      THIS ROUTINE LOADS
                       PASS  S3    S2             S3  := S2       THE SCRATCH REGISTERS
         LWF   L1      PASS  S4    S3             S4  := NS3      WITH ONE OF TWO
         LWF   R1      PASS  S5    S4             S5  := NS4      COMPLEMENTARY DATA
               L4      CMPS  S6    S5             S6  := NS5      PATTERNS. REGISTERS
         LWF   L1      CMPS  S7    S6             S7  :=  S6      WITH ONE BIT DIFFERENCE
         LWF   R1      PASS  S8    S7             S8  := NS7      IN ADDRESS ARE FILLED
               L4      PASS  S9    S8             S9  :=  S8      WITH UNLIKE PATTERNS.
                       CMPS  S10   S9             S10 := NS9      THE ROTATE/SHIFT AND
                       PASS  S11   S10            S11 := S10      FLAG LOGIC IS CHECKED.
                       PASS  L     S5             L   := OTHER TEST PATTERN
               CLFL    XOR         S8             XOR SAME PATTERN
         JMP   CNDX    ALZ   RJS   FAILURE+2      TEST FOR NON-ZEROS
                       XNOR        S9             XNOR SAME PATTERN
         JMP   CNDX    ONES  RJS   FAILURE+2      TEST FOR NON-ONES
                       XOR         S7             XOR DIFFERENT PATTERN
         JMP   CNDX    ONES  RJS   FAILURE+2      TEST FOR NON-ONES
                       XNOR        S10            XNOR DIFFERENT PATTERN
         JMP   CNDX    ALZ   RJS   FAILURE+2      TEST FOR NON-ZEROS
                       ADD         S11            ADD UNLIKE PATTERNS
         JMP   CNDX    COUT        FAILURE+2      TEST FOR CARRY OUT
         JMP   CNDX    ONES        ASR+1          TEST FOR NON-ONES
         JMP                       FAILURE+2
```

D-5

```
MEMLOST  JSB              CPTEST    TEST CENTRAL PROCESSOR
         SHLT ZERO S                CLEAR S; HALT COMPUTER
*
RIPPIMY  COV  ZERO S6                CLEAR S6
              PASS S5   S            SAVE S
              PASS DSPL S6           CLEAR DISPLAY REGISTER
              PASS S7   P            SAVE P
DMSLOAD  IMM  LOW  CNTR 040B         COUNTER := 40
         IMM  CMHI S2   337B         S2 := 020000
         IMM  HIGH MEU  102B         ENABLE SYSTEM MAP
              PASS MEU  S2           CLEAR DMS ADDRESS REGISTER
         MESP PASS MEU  S6           LOAD MAP
         DCNT INC  S6   S6           INCREMENT MAP ADDRESS
         JMP  CNDX CNT8 RJS  *-2     TEST FOR ALL MAPS LOADED
              ZERO S                 PASS LOADER AN INVALID SELECT CODE
         JSB              LOADER     DETERMINE HOW MUCH MEMORY AVAILABLE
              PASS S3   M            S3 := TOP OF ENABLED MEMORY
         JMP  CNDX L15   TESTDMS     TEST FOR PRESENT MEMORY
         IMM  LOW  S2   377B         BACKGROUND PATTERN := 177777
         IMM  CMLO A    377B         TEST PATTERN := 000000
         JSB              RIPP32K
         IMM  CMLO S2   377B         BACKGROUND PATTERN := 000000
         IMM  LOW  A    377B         TEST PATTERN := 177777
         JSB              RIPP32K
         IMM  CMLO S2   376B         BACKGROUND PATTERN := 000001
         JSB              RIPP32K
         IMM  CMLO S2   374B         BACKGROUND PATTERN := 000003
         IMM  LOW  A    376B         TEST PATTERN := 177776
         JSB              RIPP32K
              PASS S2   S5           BACKGROUND PATTERN := S5
         JSB              RIPP32K
TESTDMS       PASS MEU  MEU
              PASS      MEU          ENABLE MEM STATUS REGISTER
         JMP  CNDX ONES *+6          TEST IF DMS IS PRESENT
              INC  S    DSPL         S := DISPLAY REGISTER
         IMM  CMLO L    337B         L := 40
              XOR  DSPL S            DISPLAY REGISTER := S
         JMP  CNDX ALZ  RJS  DMSLOAD TEST FOR ALL MEMORY TESTED
         IMM  HIGH MEU  100B         DISABLE DMS MAPS
              PASS S    S5           RESTORE S
              PASS DSPL S5
         RTN  DEC  P    S7           RESTORE P AND EXIT
```

```
RIPP32K      SHLT DEC  PNM  S3
             WRTE PASS TAB  S2            T/A/B := BACKGROUND PATTERN
                  DEC  PNM  P             M := P; P := P-1
        JMP  CNDX AL15 RJS  *-2           TEST FOR COMPLETE 32K
        IMM       CMLO S4   276B          S4 := 000101
                  PASS PNM  S4            P := S4; M := S4
RIPLOOP      WRTE PASS TAB  A             T/A/. := TEST PATTERN; WRITE
        IMM       CMLO L    276B          L := 000101
        READ      ADD  P    P             P := P + 101
                  PASS L    A             L := TEST PATTERN
                  XOR       TAB           COMPARE
        JMP  CNDX AL2  RJS  FAILURE+1     TEST FOR SUCCESSFUL COMPARE
             WRTE PASS TAB  S2            T/A/B := BACKGROUND PATTERN; RESTORE
                  PASS L    S3            L := TOP OF ENABLED MEMORY
                  SUB  M    P             TEST FOR NON-EXISTENT MEMORY
        JMP  CNDX COUT RJS  RIPLOOP       TEST FOR RIPPLE PASS COMPLETE
                  DEC  S4   S4            DECREMENT 32K COUNTER
        JMP  CNDX AL2  RJS  RIPLOOP-1     TEST FOR ENTIRE 32K TESTED
                  PASS L    S2            L := BACKGROUND PATTERN
                  PASS PNM  S3            P := TOP OF ENABLED MEMORY
BKGNDCK      READ DEC  PNM  P             M := P; P := P-1; READ
             RTN  CNDX AL15                TEST FOR ENTIRE 32K READ
                  XOR       TAB           TEST AGAINST EXPECTED BACKGROUND PATTERN
        JMP  CNDX AL2       BKGNDCK       TEST FOR EXPECTED BACKGROUND PATTERN
*
FAILURE           PASS A    S2            A := EXPECTED DATA
             CDV  PASS B    TAB           B := ACTUAL DATA
        IMM  SHLT LOW  DSPL 3778          SET ALL DISPLAY REGISTER BITS
        IMM       LOW  DSPI 000B          SET ALL DISPLAY INDICATOR BITS
        JMP                 WAIT+2        SUSPEND TEST
*
```

I claim:

1. Computer apparatus comprising:
   memory means having instructions stored in addressable locations therein for outputting said instructions in response to address and timing signals;
   control means coupled to said memory means for providing said address signals thereto and for causing instructions to be read therefrom in response to timing signals;
   instruction register means coupled to said memory means for storing electrical representations of instructions read from said addressable locations of said memory means;
   instruction decoding means coupled to said instruction register means for generating control signals in response to the contents of said instruction register means and said timing signals;
   data means coupled to said instruction decoding means for performing preselected logical and arithmetic operations in response to said control signals and for providing state signals indicating the result of said logical and arithmetic operations during the execution of the instruction contained in the instruction register;
   timing means coupled to said control means, said instruction decoding means and said data means for providing a plurality of selectable instruction execution timing intervals and for providing timing signals corresponding to one of said execution timing intervals to said control means, said instruction decoding means, and said data means in response to an execution control signal;
   timing control means coupled to said instruction register means, said data means and said timing means for causing variations in the basic instruction timing interval;
   said timing control means further including means for selecting one of said instruction execution timing intervals and means for providing said execution control signal in response to both the contents of said instruction register means and said state signals.

2. The computer apparatus as in claim 1 wherein said timing means includes means for providing a basic instruction timing interval comprising a plurality of sub-intervals and said timing control means comprises means for causing the number of timing sub-intervals to vary in response to said state signals, thereby varying the basic instruction timing interval.

3. The computer apparatus as in claim 2 wherein said timing control means further comprises means for suspending the providing of said basic instruction timing interval in response to said state signals.

4. The computer apparatus as in claim 3 and further comprising a master memory means coupled to said data means and having a plurality of different memory types having different operating parameters; said timing control means further comprising means for detecting these different memory types and for varying the number of timing sub-intervals in response thereto.

* * * * *